(12) United States Patent
Kim et al.

(10) Patent No.: US 11,589,352 B2
(45) Date of Patent: *Feb. 21, 2023

(54) METHOD AND APPARATUS FOR TRANSMITTING SIGNAL IN WIRELESS COMMUNICATION

(71) Applicant: Samsung Electronics Co., Ltd., Suwon-si (KR)

(72) Inventors: Soenghun Kim, Suwon-si (KR); Jaehyuk Jang, Suwon-si (KR); Donggun Kim, Seoul (KR); Seungri Jin, Suwon-si (KR); Sangbum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 126 days.

This patent is subject to a terminal disclaimer.

(21) Appl. No.: 16/947,436

(22) Filed: Jul. 31, 2020

(65) Prior Publication Data

US 2020/0367247 A1    Nov. 19, 2020

Related U.S. Application Data

(63) Continuation of application No. 15/475,057, filed on Mar. 30, 2017, now Pat. No. 10,736,103.

(30) Foreign Application Priority Data

Mar. 30, 2016    (KR) .......................... 10-2016-0038337

(51) Int. Cl.
*H04B 7/00*    (2006.01)
*H04L 12/00*    (2006.01)
(Continued)

(52) U.S. Cl.
CPC ......... *H04W 72/0453* (2013.01); *H04W 4/06* (2013.01); *H04W 48/12* (2013.01); *H04W 72/005* (2013.01); *H04W 76/40* (2018.02)

(58) Field of Classification Search
None
See application file for complete search history.

(56) References Cited

U.S. PATENT DOCUMENTS 7,917,150 B2    3/2011    Kim et al.
8,811,253 B2    8/2014    Damnjanovic et al.
(Continued)

FOREIGN PATENT DOCUMENTS

KR    10-2010-0025518 A    3/2010
KR    10-2014-0107273 A    9/2014
WO    2015199491 A1    12/2015

OTHER PUBLICATIONS

International Search Report for International Application No. PCT/KR2017/003488, dated Jul. 20, 2017. (3 pages).

(Continued)

*Primary Examiner* — Sithu Ko

(57) ABSTRACT

A communication method and system for supporting a high data transmission rate is provided. The method and system fuses 5G communication systems with IoT technology to transmit data at a higher rate than 4G systems. The communication method and system is applied to intelligent services, based on 5G communication technology and IoT related technology, for example, smart homes, smart buildings, smart cities, smart cars or connected cars, health care, digital education, retail business, security, safety-related services, etc. A method and apparatus is provided that increases the amount of MBMS, according to the demand increase in MBMS, using an MBMS dedicated carrier, in a mobile communication system.

16 Claims, 55 Drawing Sheets

(51) Int. Cl.
  *H04W 72/0453* (2023.01)
  *H04W 72/00* (2023.01)
  *H04W 76/40* (2018.01)
  *H04W 48/12* (2009.01)
  *H04W 4/06* (2009.01)

(56) References Cited

U.S. PATENT DOCUMENTS

| | | | |
|---|---|---|---|
| 9,025,520 B2 | 5/2015 | Kim et al. | |
| 9,137,779 B2 | 9/2015 | Wang et al. | |
| 9,294,989 B2 | 3/2016 | Amerga et al. | |
| 9,680,582 B2 | 6/2017 | Lee et al. | |
| 9,769,628 B2 | 9/2017 | Kim et al. | |
| 2008/0192675 A1 | 8/2008 | Kim et al. | |
| 2010/0284319 A1 | 11/2010 | Wang et al. | |
| 2012/0039233 A1 | 2/2012 | Kim et al. | |
| 2012/0044826 A1 | 2/2012 | Wang et al. | |
| 2012/0093051 A1 | 4/2012 | Xu | |
| 2012/0213130 A1 | 8/2012 | Zhang et al. | |
| 2014/0119264 A1* | 5/2014 | Shauh | H04L 5/001 370/312 |
| 2015/0334637 A1* | 11/2015 | Kim | H04W 52/365 370/312 |
| 2015/0381378 A1 | 12/2015 | Zhang et al. | |
| 2016/0007319 A1 | 1/2016 | He et al. | |
| 2016/0249266 A1* | 8/2016 | Kim | H04W 4/06 |
| 2016/0261384 A1 | 9/2016 | Djukic et al. | |
| 2016/0337817 A1* | 11/2016 | Malladi | H04W 72/005 |
| 2017/0164407 A1 | 6/2017 | Yang et al. | |
| 2017/0207925 A1* | 7/2017 | Kim | H04W 72/005 |
| 2017/0245121 A1* | 8/2017 | Jung | H04W 48/20 |

OTHER PUBLICATIONS

Alcatel-Lucent, "MCCH channel design", #3GPP RAN WG2#59, R2-073132, Athens, Greece, Aug. 20-24, 2007. (4 pages).

Office Action dated Apr. 4, 2022, in connection with Korean Application No. 10-2016-0038337, 10 pages.

* cited by examiner

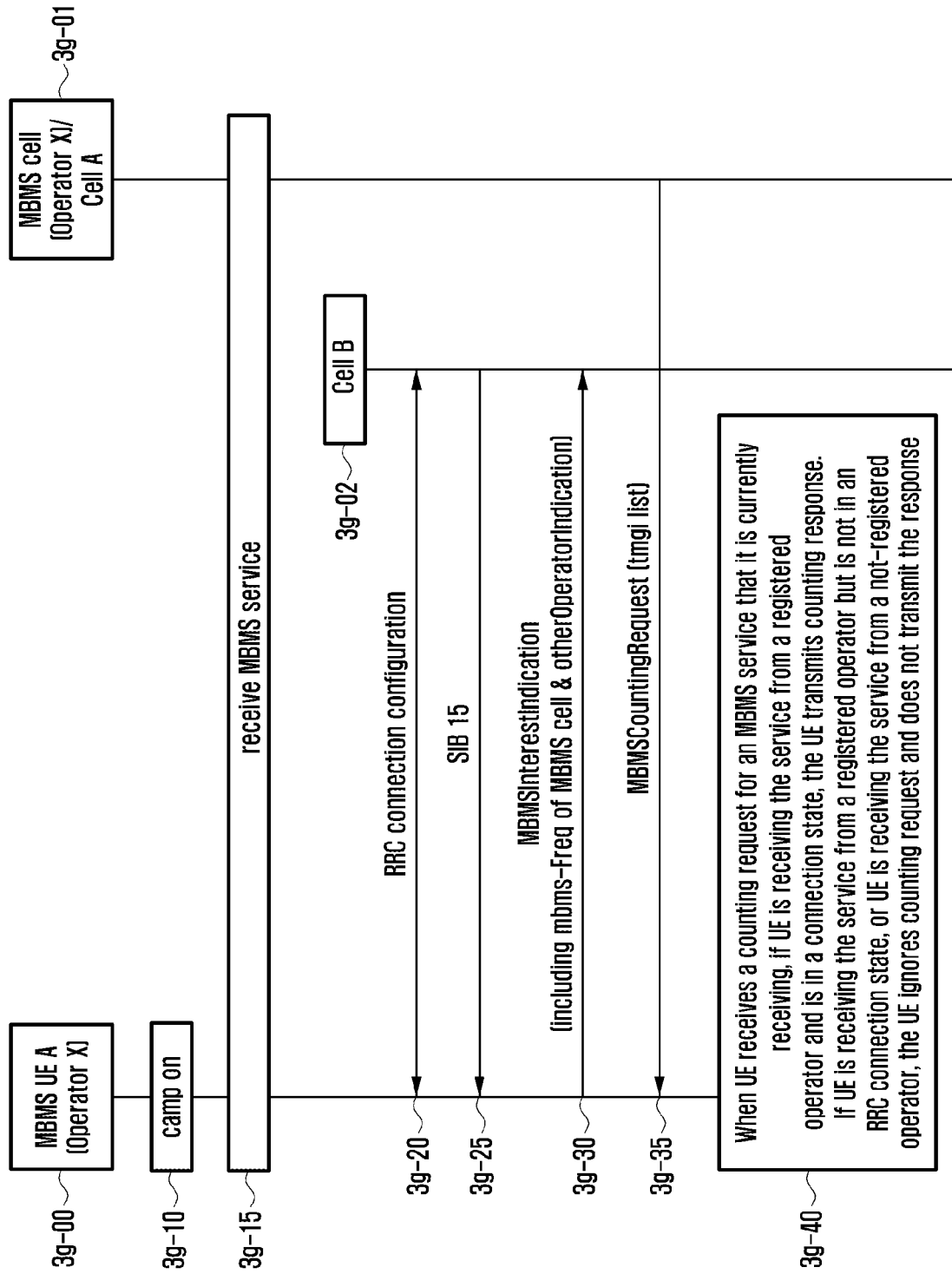

METHOD AND APPARATUS FOR TRANSMITTING SIGNAL IN WIRELESS COMMUNICATION

CROSS-REFERENCE TO RELATED APPLICATIONS

This application is a continuation of application Ser. No. 15/475,057, filed Mar. 30, 2017, which claims priority to Korean Patent Application No. 10-2016-0038337, filed Mar. 30, 2016, the entire disclosures of which are hereby incorporated by reference.

BACKGROUND

1. Field

The present disclosure relates to a method and apparatus for increasing the amount of Multimedia Broadcast Multicast Services (MBMS) according to the increasing demand in MBMS, using an MBMS dedicated carrier, in a mobile communication system.

2. Description of Related Art

In order to meet the increase in the demand for wireless data traffic after the commercialization of 4G communication systems, considerable effort has been made to develop pre-5G communication systems or improved 5G communication systems. This is one reason why '5G communication systems' or 'pre-5G communication systems' are called 'beyond 4G network communication systems' or 'post LTE systems.' In order to achieve a high data transmission rate, 5G communication systems are being developed to be implemented in a band of extremely high frequency, or millimeter wave (mmWave), e.g., a band of 60 GHz. In order to reduce the occurrence of stray electric waves in a band of extremely high frequency energy and to increase the transmission distance of electric waves in 5G communication systems, various technologies being explored, for example: beamforming, massive MIMO, full Dimensional MIMO (FD-MIMO), array antennas, analog beam-forming, large scale antennas, etc. In order to improve system networks for 5G communication systems, various technologies have been developed, e.g.: evolved small cell, advanced small cell, cloud radio access network (cloud RAN), ultra-dense network, device to device (D2D) communication, wireless backhaul, moving network, cooperative communication, coordinated Multi-Points (CoMP), interference cancellation, etc. In addition, for 5G communication systems, other technologies have been developed, e.g., hybrid fSK and QAM modulation (FQAM) and sliding window superposition coding (SWSC), as advanced coding modulation (ACM), filter bank multi carrier (FBMC), non-orthogonal multiple access (NOMA), sparse code multiple access (SCMA), etc.

The Internet has evolved from a human-based connection network, where humans create and consume information to the Internet of Things (IoT) where distributed configurations, such as objects, etc., exchange information with each other to process the information. The technology related to the IoT is starting to be combined with, for example, a technology for processing big data through connection with a cloud server, etc., and this is called an internet of everything (IoE) technology. In order to manifest the IoT, various technical components are required, such as, a sensing technology, wired/wireless communication and network infra technology, a service interfacing technology, a security technology, etc. In recent years, a sensor network for connecting objects, machine to machine (M2M), machine type communication (MTC), etc. have been researched. Under the IoT environment, intelligent Internet Technology (IT) services may be provided to collect and analyze data obtained from objects connected to each other and thus to create new value for human life. As existing information technologies are fused and combined with various industries, the IoT may also be applied within various fields, such as: smart homes, smart buildings, smart cities, smart cars or connected cars, smart grids, health care, smart home appliances, high quality medical services, etc.

Various attempts have been made to apply 5G communication systems to the IoT network. For example, various technologies related to sensor networks, machine to machine (M2M), machine type communication (MTC), etc., have been implemented by beam-forming, MIMO, array antenna, etc., as 5G communication technology. The application of the cloud RAN as a big data processing technology described above may be an example of a hybrid of 5G technology and IoT technology.

Cellular mobile communication networks have been developed to provide point-to-point transmission services. Broadband wireless transmission technology has also been developed. User equipment (terminal) has been equipped with various functions. Under these environments, the demand for various services arises. In particular, multimedia broadcast multicast services (MBMS) is a specification, or a technology, for mobile broadcast services via a cellular mobile communication network, and has recently evolved to enhanced-MBMS (eMBMS). Various discussions have been made to provide long term evolution (LTE)-based public safety services and various broadcast multi-content services using eMBMS.

SUMMARY

To address the above-discussed deficiencies, it is a primary object to provide a method, a procedure, and a system which are capable of supporting a multimedia broadcast multicast services (MBMS) dedicated carrier along with existing normal carriers in a mobile communication system, to increase the amount of MBMS according to the increasing demand in MBMS.

The present disclosure further provides a method, a procedure and a system which are capable of performing a signaling to selectively use two types of sub-carrier spacing and three cyclic prefix lengths in one cell/carrier, in order to support the demand increasing in MBMS and the enlarged MBMS service area in a mobile communication system.

The present disclosure further provides: a method of performing the transmission of new information which enables a UE to receive, from a cell of one service provider which has been registered, an MBMS service of another service provider, via SIB15; and a method and apparatus for: determining whether an MBSB service that the UE needs to receive is transmitted from a service provider which is currently registered; switching the reception operation based on the determination; and changing the counting response.

The present disclosure further provides a method and apparatus for setting a timing advance value for uplink transmission in a cell where a UE uses an unlicensed band if LAA technology is used in a wireless/mobile communication system.

The present disclosure further provides a method and apparatus for setting a timing advance value for uplink transmission in a cell where a UE uses an unlicensed band if LAA technology is used in a wireless/mobile communication system.

The present disclosure further provides a method and apparatus for calculating and reporting power headroom for a cell where a UE uses an unlicensed band if LAA technology is used in a wireless/mobile communication system.

In accordance with an aspect of the present disclosure, a method for a base station to perform communication in a wireless communication system is provided. The method includes: determining whether a carrier is a dedicated carrier for multimedia broadcast multicast services (MBMS); creating system information containing information as to a condition as to whether a carrier is a dedicated carrier for multimedia broadcast multicast services (MBMS); and transmitting the created system information to a terminal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3G illustrates a flowchart of a second MBMS service reception of receiving an MBMS service via a not-registered PLMN according to various embodiments of the present disclosure;

DETAILED DESCRIPTION

Figure 1A:
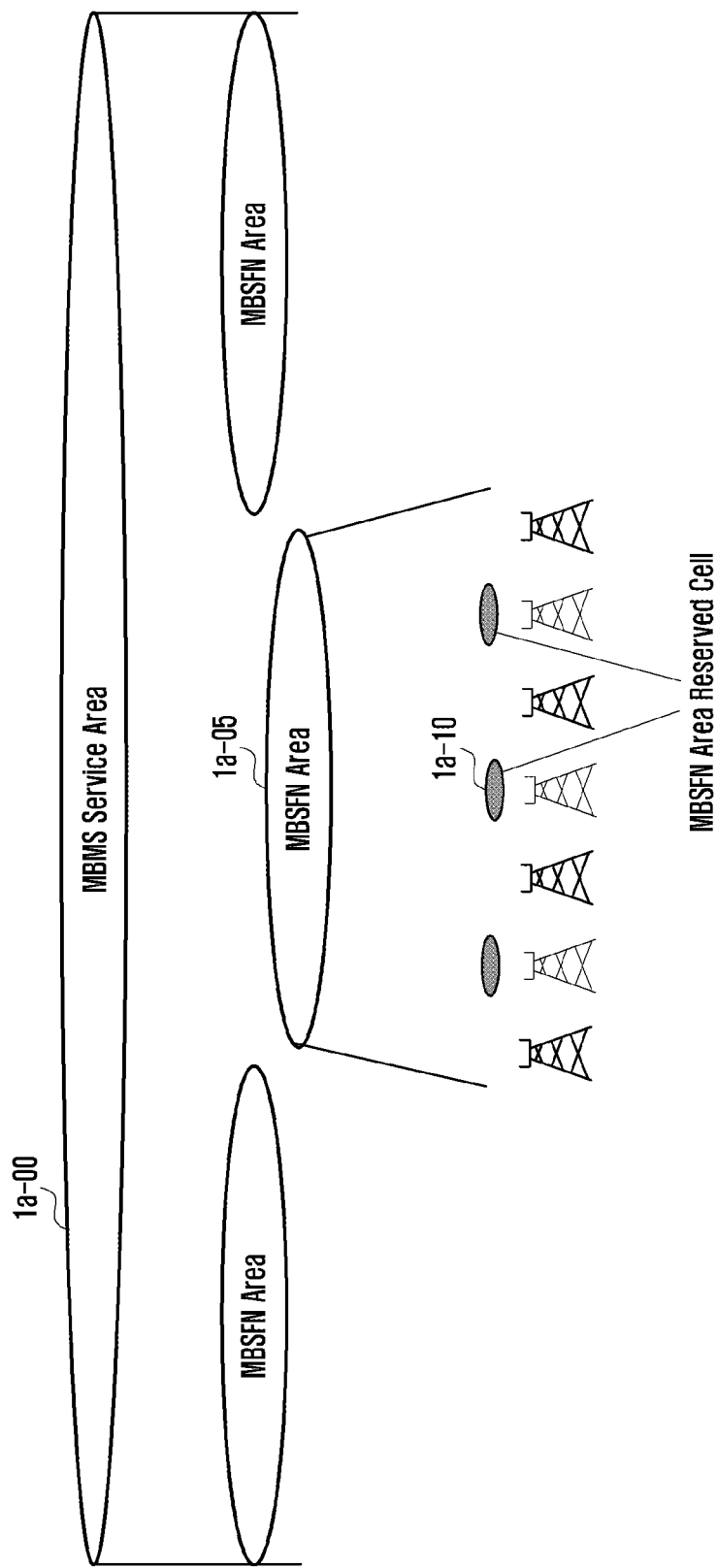
FIG. 1A illustrates an example multimedia broadcast multicast service (MBMS) according to various embodiments of the present disclosure.

FIGS. 1A through 6F, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, embodiments of the disclosure are described in detail with reference to the accompanying drawings. Detailed descriptions of well-known functions and structures incorporated herein may be omitted to avoid obscuring the subject matter of the disclosure. The following terms are defined considering functions of the disclosure, and may be changed by users or operators according to their needs. Therefore, the terms will be defined throughout the content of this description.

The features and advantages of the disclosure and the methods to accomplish the objectives of the disclosure will become more apparent from the following detailed description and the accompanying drawings. The embodiments of the present disclosure described in the description and drawings are merely provided to assist in a comprehensive understanding of the disclosure and are not suggestive of limitation. Although embodiments of the disclosure have been described in detail above, it should be understood that many variations and modifications of the basic inventive concept herein described, which may be apparent to those skilled in the art, will still fall within the spirit and scope of the embodiments of the disclosure as defined in the appended claims. In the following description with reference to the accompanying drawings, the same elements are denoted by the same reference numbers.

In the following description, terms used to identify an access node, terms referred to as network entities, terms expressing messages, terms representing interfaces between network objects, terms used for various types of identification information, etc. are used for the sake of convenient description. Therefore, the present disclosure is not limited by the terms and may use other terms with the meanings equivalent to the terms described in the present disclosure, representing the corresponding components.

For the sake of convenient description, the present disclosure uses terms and names defined in the specifications of the 3rd generation partnership project long term evolution (3GPP LTE). However, it should be understood that the present disclosure is not limited to the terms and names and may also be applied to systems following the other standards.

Unlike the point-to-point transmission service, MBMS serves as a point-to-multipoint transmission service, and is advantageous because the MBMS service allows an eNB to transmit the same packet to a number of UEs in one cell and thus increases the use efficiency of wireless resources. LTE-based MBMS employs a multi-cell transmission scheme that enables a number of eNBs to simultaneously transmit the same packet. The multi-cell transmission scheme allows a UE receiving a service to obtain a diversity gain in a physical layer, thereby increasing the transmission efficiency.

In the current LTE standard technology, specific subframes may not be used as an MBSFN subframe containing fixed MBMS data in one radio frame. More specifically, an MBSFN subframe uses only part of the 1st, 2nd, 3rd, 6th, 7th, and 8th subframes from a total of 10 subframes in one radio frame. Since the 0th, 4th, 5th, and 9th subframes are used to transmit a paging message or required system information such as master information block (MIB), system information block 1 (SIB1), etc., Those information blocks have difficulty being used as an MBSFN subframe. Therefore, it is restricted to allocate resources for transmission of MBMS data. In order to resolve this problem, more resources need to be allocated for MBMS in order to meet the demand increasing in MBMS data.

The present disclosure provides a method, a procedure and a system which are capable of supporting multimedia broadcast multicast services (MBMS) dedicated carrier along with existing normal carriers in a mobile communication system, to increase the amount of MBMS according to the increasing demand in MBMS. That is, a frequency of a dedicated carrier and information related to the provided services and a frequency of a normal carrier providing MBMS and information related to the provided MBMS are provided to a terminal (UE) via system information regarding a normal carrier/normal cell. The terminal (UE) selects a normal carrier or an MBMS dedicated carrier depending on a service that the UE needs to receive, and receives the MBMS service via the selected carrier.

The present disclosure has the following features. The present disclosure allows an eNB to transmit information regarding a carrier providing MBMS to a UE via a common signal (e.g., system information) transmitted to a number of UEs. The information regarding a carrier contains information specifying that the carrier is a normal carrier or a dedicated carrier. In order to receive an MBMS service, the UE receives a signal related to the MBMS from a carrier, via a subframe, referring to the control information. In this case, the UE receives an MBMS service by applying a subframe type and a procedure corresponding to a type of carrier.

In the following description, technology related to MBMS in an LTE standard is explained in detail with reference to the accompanying drawings.

FIG. 1A illustrates an example MBMS.

If multicast and broadcast services can be simultaneously provided to one user, it may be easily performed by the MBMS of LTE. MBMS is introduced as a component for E-UTRAN to support the transmission of broadcast services, such as transmission of a television service and transmission of multimedia content (e.g., audio, video, image, text, etc.).

MBMS is referred to as a user service using a broadcast mechanism in a wireless interface, and provides secure functions allowing only specific users (i.e., users belonging to a multicast group) to receive the service. The area to which data of a specific MBMS service is transmitted is called an MBMS service area 1a-00. A single MBMS service area corresponds to a collection of one or more separated geographical areas. Alternatively, the MBMS service area 1a-00 is a network area including a number of eNBs capable of preforming the transmission of Multimedia Broadcast multicast service Single Frequency Network (MBSFN).

MBMS introduces an MBMS service via a single frequency network to allow for the synchronization of the transmission of a multicast user service across a number of cells, which is called MBSFN. MBSFN means that the data streams can be transmitted across one or more cells, using the same radio frequency. MBSFN depends on the synchronization between MBMS services and individual eNBs providing cells, respectively. The group of eNBs may be synchronized to define an MBSFN synchronization area. Each MBSFN synchronization area may support one or more MBSFN Areas 1a-05. That is, an MBSFN area is referred to as a group of cells in an MBSFN synchronization area, providing a preset MBMS service, along with the MBSFN transmission.

All cells except for MBSFN area reserved Cells 1a-10 in an MBSFN Area are used for the MBSFN transmission. MBSFN area reserved Cells 1a-10 are referred to as cells which are not used for the MBSFN transmission. MBSFN area reserved Cells 1a-10 may be used for the transmission for other objectives; however, MBSFN Area Reserved Cells 1a-10 may be allowed for limited transmission power for radio resources assigned to perform the MBSFN transmission.

Figure 1B:
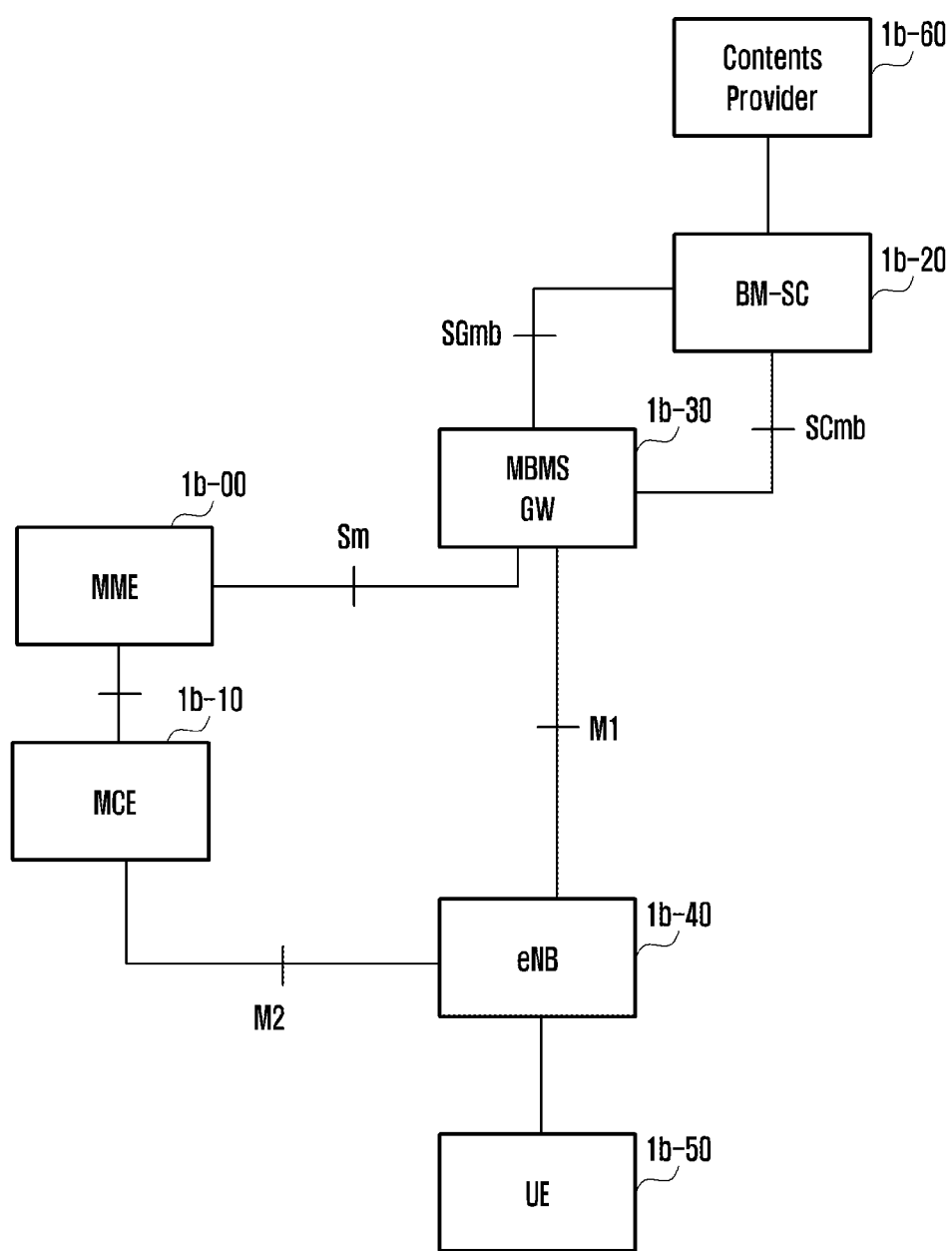
FIG. 1B illustrates an example network architecture for MBMS in a long term evolution (LTE) system according to various embodiments of the present disclosure.

FIG. 1B illustrates an example network architecture for MBMS service in an LTE system.

With reference to FIG. 1B, mobility management entity (MME) 1b-00 controls MBMS session. MME 1b-00 is connected to MBMS coordination entity (MCE) 1b-10 via an M3 interface. MCE 1b-10 performs the management and allocation of radio resources for the eNBs 1b-40 (also called enhanced Node Bs, eNB, base stations, etc.) that belonged to MCE, and performs acceptance control for MBMS service. MCE determines a modulation and coding scheme (MCS) for MBMS services and controls an MBMS session. MCE is a logical node physically separated from an eNB and manages radio resources. MCE may form a configuration in such a way that it is separated into individual eNBs, so that one MCE separated into one eNB is a master and the other MCEs separated to the eNBs are a slave.

Broadcast/multicast service center (BM-SC) 1b-20 performs the authority verification of MBMS bearer services and the service start. BM-SC also performs scheduling and transmission of MBMS content, considering the service quality. BM-SC is capable of transmitting, to an LTE network, broadcast content of the BM-SC. The BM-SC is also capable of forwarding broadcast content in association with an external content provider 1b-60. BM-SC is connected to an MBMS gateway (MBMS-GW) 1b-30 via an SCmb interface in order to transmit control messages, and also via an SGi-mb interface in order to transmit content (user traffic). MBMS-GW 1b-30 performs the control of MBMS session (e.g., service start and service end), and transmits content to an eNB in IP multicast transmission. MBMS-GW is connected to the MME via an Sm interface in order to transmit control messages for session, and to an eNB via an M1 interface in order to transmit content.

The eNB 1b-40: receives information regarding radio resource assigned by MCE; allocates radio resources to transmit broadcast services, scheduled by MCE, to user equipment (UE) 1b-50 (which is also called a terminal, a mobile device, etc.); and performs the synchronization transmission for MBMS services. The eNB is connected to the MCE via an M2 interface in order to transmit control signals. The UE 1b-50 received synchronized MBMS data.

Figure 1C:
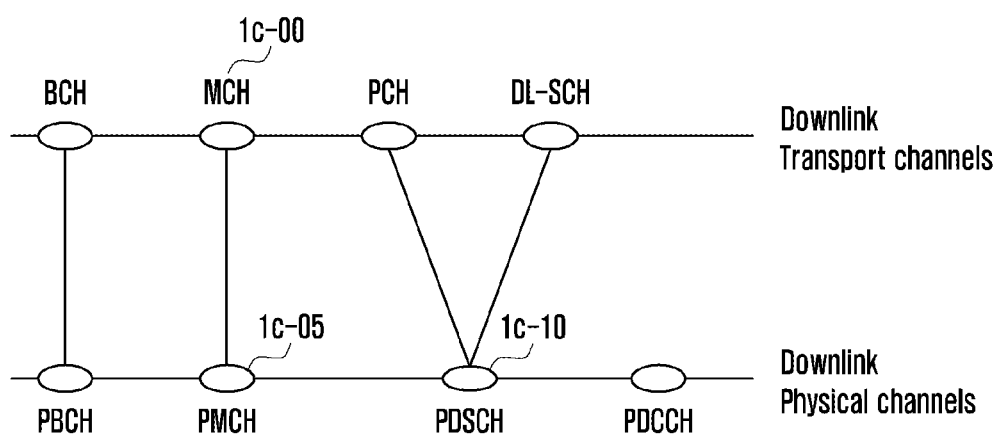
FIG. 1C illustrates an example mapping relationship of downlink channels used for the MBSFN transmission according to various embodiments of the present disclosure.

FIG. 1C illustrates an example mapping relationship of downlink channels used for the MBSFN transmission.

As shown in FIG. 1C, MCH 1c-00 is used between an MAC layer and a physical layer. MCH is mapped to PMCH 1c-05 of a physical layer. In general, unicast scheme transmitting data to only a specific UE uses physical downlink shared channel (PDSCH) 1c-10.

Figure 1D:
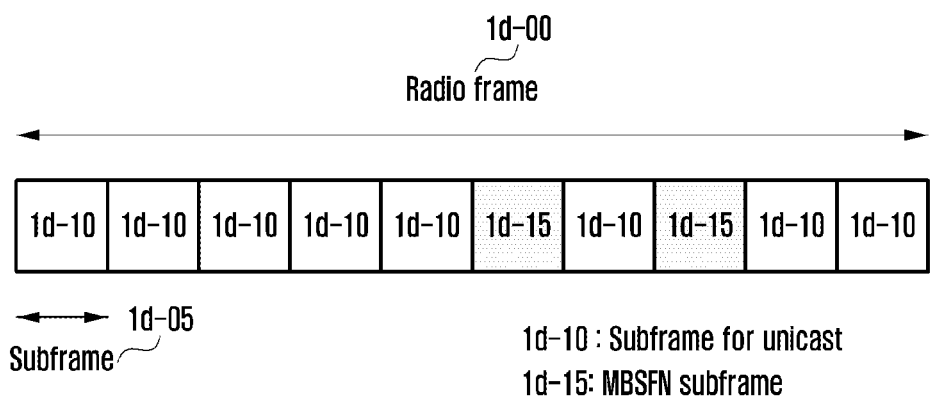
FIG. 1D illustrates an example structure of a downlink frame used in LTE systems according to various embodiments of the present disclosure.

FIG. 1D illustrates an example structure of a downlink frame used in LTE systems.

As shown in FIG. 1D, a radio frame 1d-00 includes 10 subframes 1d-05. Each subframe may be a 'normal subframe 1d-10' used for the transmission/reception of general data or 'multimedia broadcast multicast service single frequency network (MBSFN) subframe 1d-15' used for multicast and broadcast user services.

Normal subframe and MBSFN subframe differ from each other, in terms of number and structure, with respect to orthogonal frequency division multiplexing (OFDM) symbols, cyclic prefix (CP) length, cell-specific reference signals (CRS), etc.

Figure 1E:
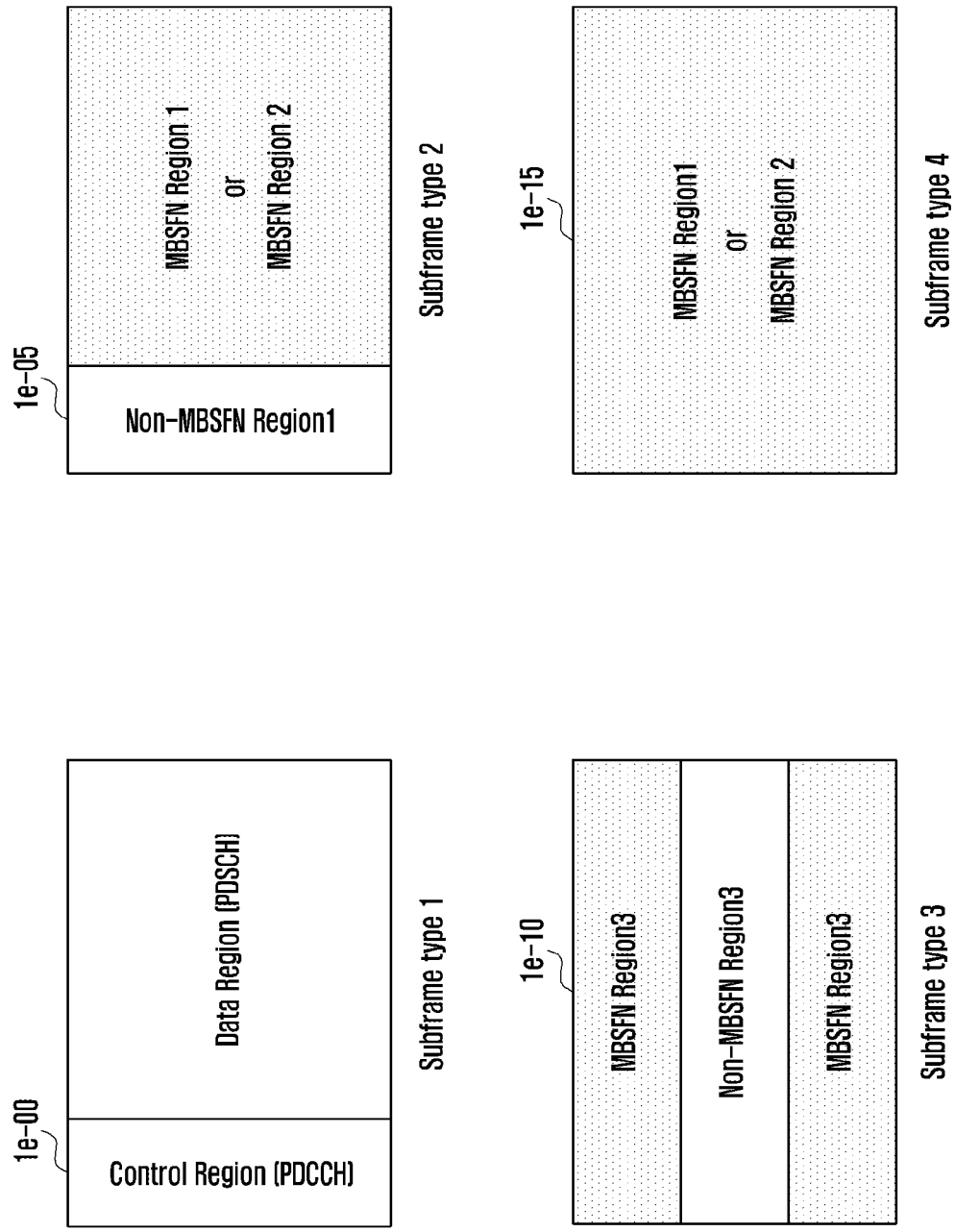
FIG. 1E illustrates an example structures of normal subframes and various MBSFN subframes according to various embodiments of the present disclosure.

FIG. 1E illustrates an example structure of normal subframes and various MBSFN subframes.

Subframe type 1 (1e-00) is a normal subframe used for the transmission/reception of unicast data in an LTE system. The control region (PDCCH) of the Subframe type 1 indicates a location where data is actually transmitted and/or received. Actual data is transmitted via the data region (PDSCH) of Subframe type 1. Before a UE receives real data, the UE needs to determine whether the control region has information regarding a resource assigned to the UE.

The normal carrier provides an MBMS service via an MBSFN subframe of a preset structure, which is called a subframe type 2 (1e-05) in the following description. One or two first symbols of the subframe are non-MBSFN Areas. In this case, CRS is transmitted, using a normal cyclic prefix. The length of time of a non-MBSFN region of the subframe may be specified by a non-MBSFNregionLength of MBSFN-RegionInfo (refer to TS36.331). The remaining symbols of the subframe transmit, to an MBSFN region, an MBSFN reference signal (refer to TS36.211, TS36.212, and TS 36.213), employing an extended cyclic prefix.

Subframe type 2 (1e-05) has an extended MBSFN subframe whose structure is identical to those of the subframe type 3 (1e-10) and subframe type 4 (1e-15). MBSFN region is divided into MBSFN region 1, MBSFN region 2, and MBSFN region 3. In order to apply a cyclic prefix of the same length, MBSFN regions are divided in one time interval. MBSFN region 1 uses an extended cyclic prefix, and is a region transmitting an MBMS reference signal. MBSFN region 2 uses a normal cyclic prefix and transmits MBMS reference signal 2 (MBMS reference signal type 2). The MBMS reference signal 2 may be an MBMS reference signal designed to be suitable for a normal cyclic prefix. MBSFN region 3 uses a cyclic prefix which has been previously specified via system information or MCCH, and transmits MBMS reference signal 3. The MBMS reference signal 3 may be an MBMS reference signal designed to be suitable for a previously specified cyclic prefix.

A non-MBSFN region is divided into non-MBSFN region 1, non-MBSFN region 2, and non-MBSFN region 3. The non-MBSFN region 1 corresponds to the entire frequency resource area of a time interval corresponding to n first symbols of a corresponding subframe, and is specified by non-MBSFNregionLength2 of MBSFN-RegionInfo. The information is broadcast via common control information (e.g., SIB 2 or MCCH) transmitted to a number of UEs. The UE, which needs to receive an MBMS service, obtains the information via a preset procedure. Non-MBSFN region 2 is a specific frequency band resource area of a time interval from a symbol right after a non-MBSFN region 1 to the last symbol. Non-MBSFN region 2 is used to transmit primary synchronization sequence (PSS), secondary synchronization sequence (SSS), master information block (MIB), system information (SI), etc. non-MBSFN region 3 is a specific frequency band resource area of an entire time interval. Non-MBSFN region 3 is used to transmit PSS, SSS, etc. non-MBSFN region 3 uses the same cyclic prefix as the MBSFN region 3.

In Rel-8 and Rel-9 systems, MBSFN subframes were used to perform the transmission of broadcast or multicast data, etc. With the development of systems, MBSFN subframes are used to perform unicast since LTE Rel-10, as well as broadcast or multicast. In particular, The UEs before Rel-10 do not attempt to perform a decoding operation in MBSFN subframes. Therefore, requiring all UEs to attempt to perform a decoding operation in MBSFN subframes leads UEs of the previous release to upgrade their versions.

Obtaining resource assignment information in a MBSFN is performed through complicated processes, unlike the unicast data transmission/reception including a process of detecting a control region (PDCCH) informing a location where data is actually transmitted/receive and a process of detecting information regarding resource assignment for data.

More specifically, the process of obtaining resource assignment information in a MBSFN is performed as follows. An eNB informs a UE of transmission locations of multicast control channels (MCCHs) by MBSFN Areas provided by a cell, via System Information Block 13 (SIB13) as broadcast information. MCCH contains resource assignment information for MBSFN. The UE decodes MCCH, and thus detects a transmission location of MBSFN subframes.

As described above, MBMS provides resource assignment information via a mode that differs from a conventional unicast, and this is because MBMS can be provided to the UE in an idle mode. Therefore, the transmission location of MCCH as a control channel is provided via SIB13 as broadcast information. The reception of MBMS service is explained, below, with reference to FIG. 1F.

Figure 1F:
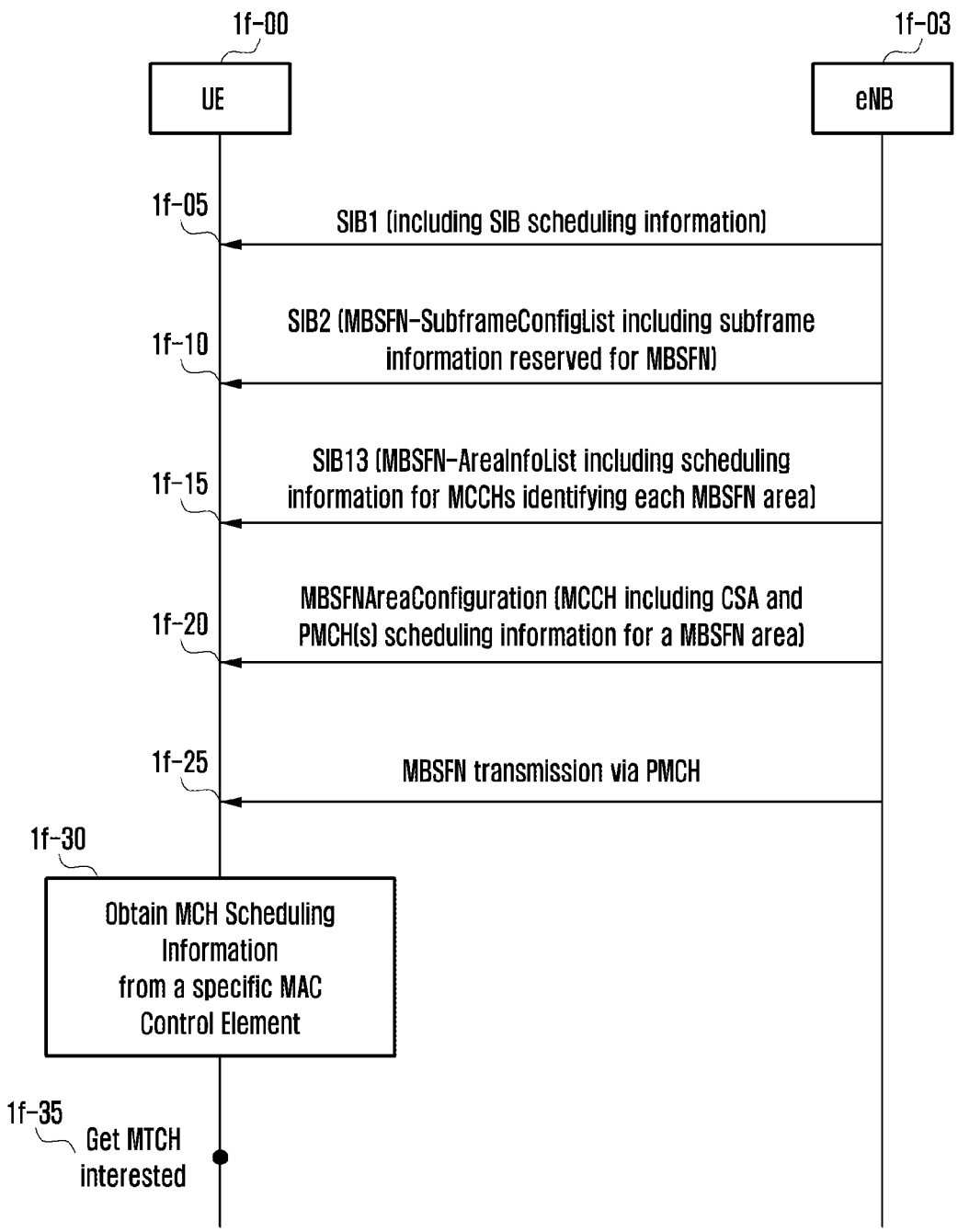
FIG. 1F is illustrates a flowchart of a method for a UE to receive MBMS via MBSFN according to various embodiments of the present disclosure.

FIG. 1F illustrates a flowchart of a method for UE to receive MBMS via MBSFN.

In operation 1f-05, the UE 1f-00 receives SIB1 from the eNB 1f-03. The SIB1 includes scheduling information regarding other SIBs. Therefore, in order to receive other SIBs, SIB1 needs to have been received previously. In operation 1f-10, the UE 1f-00 receives SIB2 from the eNB 1f-03. An MBSFN subframe configuration list of SIB2 (MBSFN-SubframeConfigList IE) indicates subframes which can be used for MBSFN transmission. The MBSFN subframe configuration list includes MBSFN-SubframeConfig IE, and indicates a subframe of a radio frame which can be an MBSFN subframe. If the UE 1f-00 needs to receive MBSFN, the UE 1f-00 receives SIB13 from the eNB 1f-03 in operation 1f-15. MBSFN area information list of SIB13 (MBSFN-AreaInfoList IE) includes location information regarding the transmission of MCCHs by MBSFN areas, provided by a cell, and the UE receives MCCH using the information in operation 1f-20. Every MBSFN area has corresponding MCCH. The MBSFN area information list includes MCCH scheduling information regarding all MBSFN areas. MBSFN area configuration information of MCCH (MBSFNAreaConfiguration IE) indicates a location of a resource used for MBSFN transmission, and the UE receives an MBSFN subframe using the information in operation 1f-25. The UE obtains a location of MBSFN subframe, transmitting an MTCH of interest, from MCH scheduling information MAC CE, as one of the MAC control elements (MAC CEs) of received MAC PDU, in operation 1f-30. The UE decodes an MTCH of interest, using MCH scheduling information, and receives MBMS data of interest in operation 1f-35.

The present disclosure provides a method, a procedure, and a system which are capable of supporting a multimedia broadcast multicast services (MBMS) dedicated carrier/dedicated cell along with existing normal carriers/normal cells, to increase the amount of MBMS according to the increasing demand in MBMS. The normal carrier/normal cell is referred to as a carrier/cell that provides an MBMS service along with general user data. The dedicated carrier/dedicated cell is referred to as a carrier/cell that provides an MBMS service and only control information required to provide the MBMS service. The normal carrier provides an MBMS service via a second frequency-time resource of a second subframe indicated by preset information described above referring to FIG. 1F. An example of the second subframe may be subframe type 2 (1e-05) shown in FIG. 1E. An example of the second frequency-time resource may be MBSFN Area 1 or MBSFN Area 2 of subframe type 2 (1e-05) shown in FIG. 1E. The dedicated carrier provides an MBMS service via a third frequency-time resource of the third subframe and a fourth frequency-time resource of the fourth subframe, indicated by preset information, through a procedure similar to that of FIG. 1F. An example of the third subframe may be subframe type 3 (1e-10) shown in FIG. 1E. An example of the third frequency-time resource may be MBSFN area 3 of subframe type 3 (1e-10) shown in FIG. 1E. That is, the third frequency-time resource of the third subframe may be defined as frequency bands except for a specific frequency band and the entire time interval of a corresponding subframe. The specific frequency band is referred to as a range of continuous frequencies with respect to the center frequency and may set a range based on separate control information. An example of the fourth subframe may be subframe type 4 (1e-15) shown in FIG. 1E. An example of the fourth frequency-time resource may be MBSFN Area 1 or MBSFN Area 2 of subframe type 4 (1e-15) shown in FIG. 1E. That is, the fourth frequency-time resource of the fourth subframe may be the entire frequency band and the entire time interval of a corresponding subframe. If one of the subframes of the dedicated carrier is not a third subframe, the subframes of the dedicated carrier may be the fourth subframe.

Figure 1G:
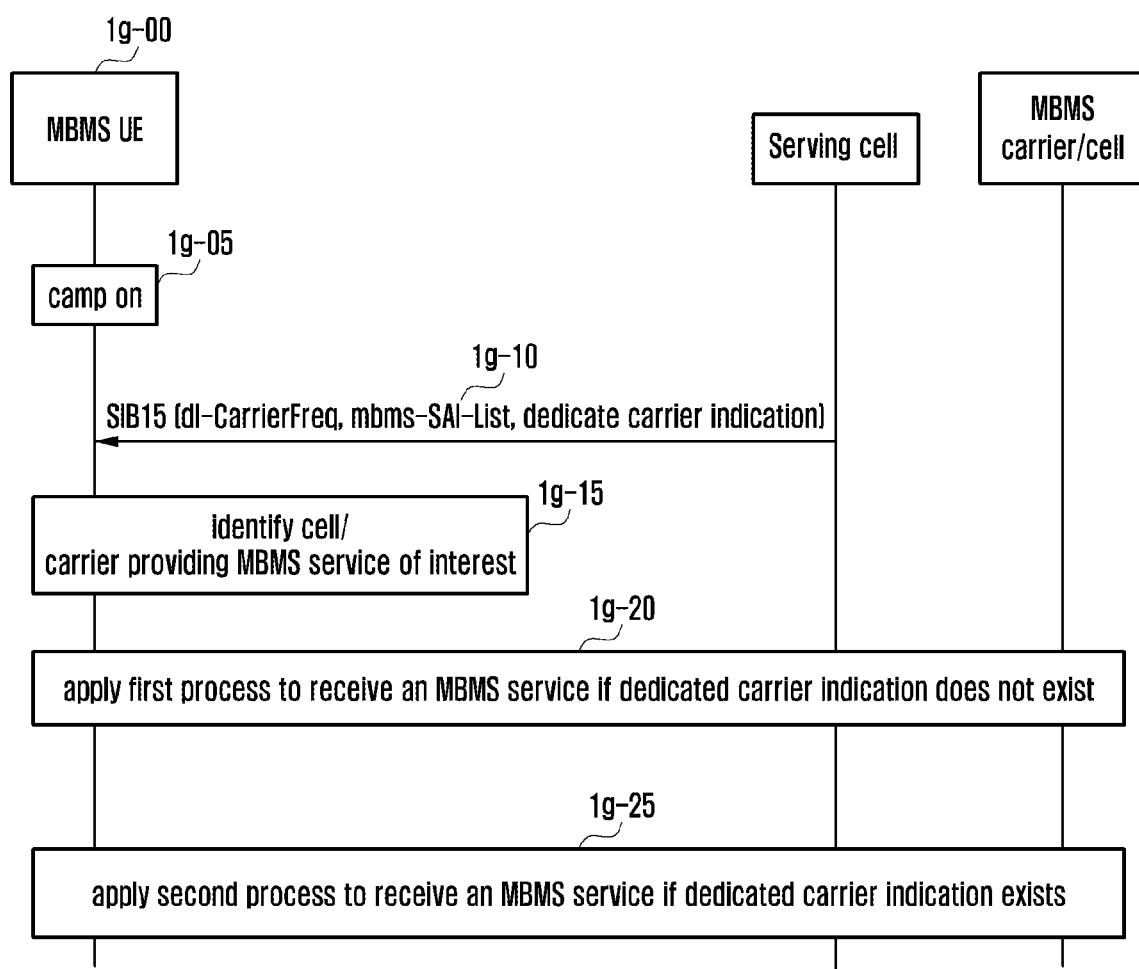
FIG. 1G illustrates a flow diagram of a procedure for transmitting information and selectively using the MBMS dedicated carrier and the normal carrier according to various embodiments of the present disclosure.

FIG. 1G illustrates a flow diagram of a procedure for: transmitting, to a UE, information regarding an MBMS dedicated carrier along with Information regarding a normal carrier; and selectively using the MBMS dedicated carrier and the normal carrier according to a service that the UE needs to receive according to the present disclosure.

The UE 1g-00, which needs to receive an MBMS service, camps on a cell in operation 1g-05. The UE 1g-00 receives necessary system information (scheduling information regarding SIBs, etc.) from an eNB as in the procedure referring to FIG. 1F, and receives system information to select a normal carrier or a dedicated carrier via SIB15 in operation 1g-10. The system information may include normal carrier frequency information (dl-carrierFreq) providing an MBMS service and service area Id (SAI) list of a corresponding carrier; and carrier frequency information regarding a dedicated carrier and information regarding a service area Id list of a corresponding dedicated carrier. The system information may also include a dedicated carrier indication (dedicateCarrierIndication) informing that parts of the carriers are a dedicated carrier. The UE may have previously identified a service area (SA) which provides a service that the UE needs to receive. Therefore, the UE determines whether a service area Id (SAI) of a service area providing a service of interest is a service area Id of a normal carrier or a dedicated carrier in operation 1g-15. If the UE ascertains that a service area Id (SAI) of a service area providing a service of interest is a service area Id of a normal carrier in operation 1g-15, the UE performs a first process to receive an MBMS service via a normal carrier in operation 1g-20. If the UE ascertains that a service area Id (SAI) of a service area providing a service of interest is a service area Id of a dedicated carrier in operation 1g-15, the UE performs a second process to receive an MBMS service via a dedicated carrier in operation 1g-25.

Figure 1H:
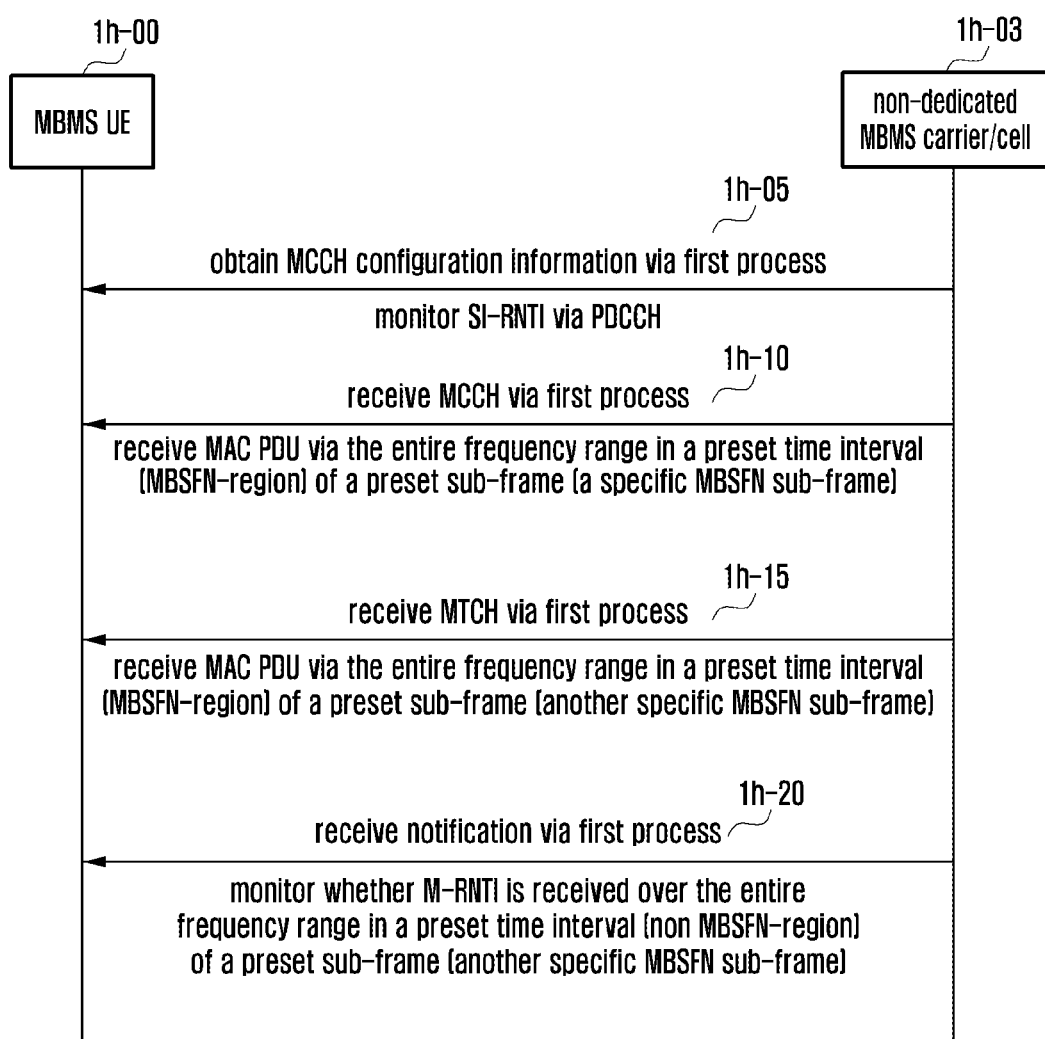
FIG. 1H is a flow diagram that describes the first process of the procedure shown in FIG. 1G where a UE selects a normal carrier and receives an MBMS service according to various embodiments of the present disclosure.

FIG. 1H illustrates a flow diagram of a first process of the procedure shown in FIG. 1G where a UE selects a normal carrier and receives an MBMS service according to the present disclosure.

The first process is performed as follows. The UE 1h-00 ascertains a radio frame and a subframe of the radio frame to be an MBSFN subframe, based on preset system information. The system information may be an MBSFN subframe configuration list (MBSFN-SubframeConfigList IE) indicating subframes which can be used for MBSFN transmission in SIB2. The UE monitors whether a control area of a first subframe receives an SI-RNTI in order to receive MCCH configuration information regarding an MBSFN area from a cell providing an MBMS service that the UE needs to receive, in operation 1h-05. The MCCH configuration information may be an MBSFN area information list (MBSFN-AreaInfoList IE) including information regarding a location where MCCHs according to MBSFN areas are transmitted via SIB13. The first subframe is not a second subframe of the subframes of a normal cell, but a normal subframe. An example of the first subframe is subframe type 1 (1e-00) shown in FIG. 1E. If the UE detects an SI-RNTI in operation 1h-05, the UE obtains MCCH configuration information using the information. In order to receive MCCH, UE receives MAC PDU, via a second frequency-time resource of the second subframe, using MCCH configuration information received as in 1h-05, in operation 1h-10. The second subframe may be specified by the MCCH configuration information. An example of the second subframe may be subframe type 2 (1e-05) shown in FIG. 1E. An example of the second frequency-time resource may be MBSFN Area 1 or MBSFN Area 2 of subframe type 2 (1e-05) shown in FIG. 1E. In order to receive PMCH and MTCH, the UE receives MAC PDU via a second frequency-time resource of another preset second subframe, decodes MTCH of interest, and receives an MBMS service of interest in operation 1h-15. The other preset second subframe may be specified in the MCCH. In order to monitor whether the MCCH information is changed, the UE monitors whether the UE receives an M-RNTI from a preset second frequency-time resource of a preset second subframe in operation 1h-20. The preset second subframe may be specified in the MCCH configuration information (e.g., MCCH repetition period). The preset second frequency-time resource is referred to frequency-time resources except for second frequency-time resources in the second subframe. An example of the preset second frequency-time resource may be non-MBSFN Area 1 of subframe type 2 (1e-05) shown in FIG. 1E.

Figure 1I:
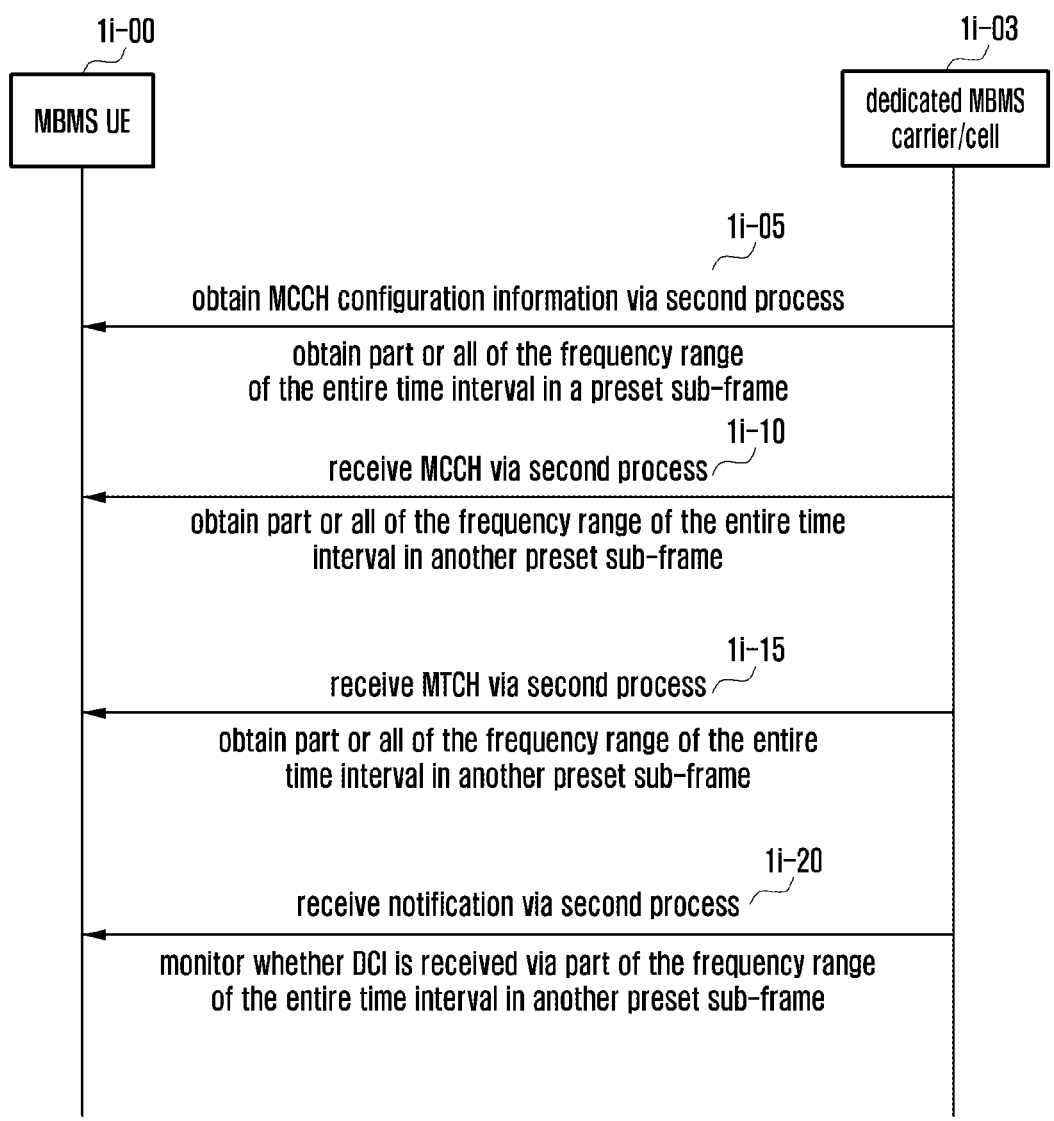
FIG. 1I illustrates a flow diagram of a second process of the procedure shown in FIG. 1G according to various embodiments of the present disclosure.

FIG. 1I illustrates a flow diagram of a second process of the procedure shown in FIG. 1G where a UE selects a dedicated carrier and receives an MBMS service according to the present disclosure.

The second process is performed as follows. The UE 1i-00 receives MCCH configuration information via a preset third frequency-time resource of a preset third subframe in operation 1i-05. The third subframe transmitting the MCCH configuration information may be notified by system information of a nearby normal cell or may be specified by control information broadcast via a preset frequency/time resource of a corresponding dedicated carrier/cell. An example of the third subframe is subframe type 3 (1e-10) shown in FIG. 1E. An example of the third frequency-time resource may be MBSFN Area 3 of subframe type 3 (1e-10) shown FIG. 1E. The UE receives MCCH information and identifies MTCH and PMCH providing an MBMS service of interest that the UE needs to receive in operation 1i-10. The UE receives MAC PDU via a third frequency-time resource of another preset third subframe or a fourth frequency-time resource of a fourth subframe in operation 1i-15. The other preset third subframe or the fourth subframe may be specified in the MCCH. An example of the fourth subframe may be subframe type 4 (1e-15) shown in FIG. 1E. An example of the fourth frequency-time resource may be MBSFN Area 1 or MBSFN Area 2 of subframe type 4 (1e-15) shown in FIG. 1E. That is, the fourth frequency-time resource of the fourth subframe may be the entire frequency band and the entire time interval of a corresponding subframe. If one of the subframes of the dedicated carrier is not a third subframe, the subframes of the dedicated carrier may be the fourth subframe. In order to monitor whether MCCH information is changed, the UE monitors whether the UE receives a preset RNTI via a preset third frequency-time resource of a preset third subframe operation 1i-20. The preset third subframe may be specified by the MCCH configuration information (e.g., MCCH repetition period). The preset third frequency-time resource may be configured in the MCCH configuration information or may be previously configured via the middle 6 PRBs (Physical Resource Blocks), etc. The preset RNTIs may be specified by the downlink control information (DCI). The preset RNTI may be an M-RNTI.

Figure 1J:
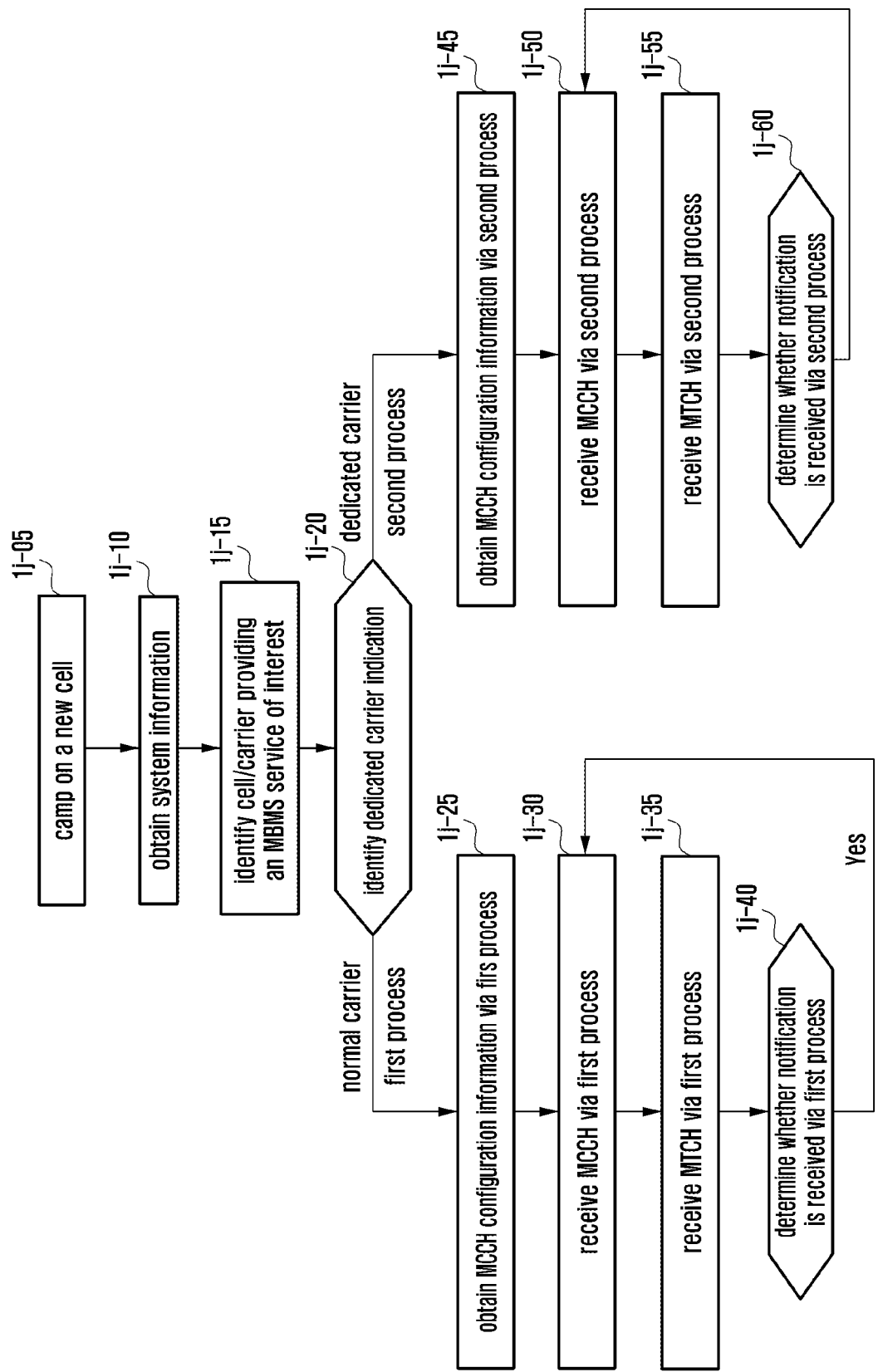
FIG. 1J illustrates a flowchart of a method for a UE to detect a common signal transmitted from an eNB and perform operations depending on a condition as to whether a carrier providing an MBMS service is a normal carrier or a dedicated carrier according to various embodiments of the present disclosure.

FIG. 1J illustrates a flowchart of a method for a UE to detect a common signal (e.g., system information) transmitted from an eNB and perform operations depending on a condition as to whether a carrier providing an MBMS service is a normal carrier or a dedicated carrier, according to the present disclosure.

The UE, which needs to receive an MBMS service, camps on a cell in operation 1j-05. The UE receives necessary system information (scheduling information regarding SIBs, etc.) from an eNB, and receives system information to select a normal carrier or a dedicated carrier via SIB15 in operation 1j-10. The system information may include normal carrier frequency information (dl-carrierFreq) providing an MBMS service and service area Id (SAI) list of a corresponding carrier; and carrier frequency information regarding a dedicated carrier and information regarding a service area Id list of a corresponding dedicated carrier. The system information may also include a dedicated carrier indication (dedicateCarrierIndication) informing that parts of the carriers are a dedicated carrier.

The UE has previously identified a service area (SA) which provides a service that the UE needs to receive, and determines whether a service area Id (SAI) of a service area providing a service of interest is a service area Id of a normal carrier or a dedicated carrier in operation 1j-15. If the UE ascertains that a service area Id (SAI) of a service area providing a service of interest is a service area Id of a normal carrier in operation 1j-15, the UE performs a first process to receive an MBMS service via a normal carrier (1j-25, 1j-30, 1j-35, and 1j-40). If the UE ascertains that a service area Id (SAI) of a service area providing a service of interest is a service area Id of a dedicated carrier in operation 1j-15, the UE performs a second process to receive an MBMS service via a dedicated carrier (1j-45, 1j-50, 1j-55, and 1j-60).

The first process is performed as follows. The UE: monitors whether a control area of a first subframe receives an SI-RNTI in order to receive MCCH configuration information regarding an MBSFN area from a cell providing an MBMS service that the UE needs to receive; and obtains the MCCH configuration information in operation 1j-25. The UE receives MAC PDU, via a second frequency-time resource of the second subframe, using the received MCCH configuration information, in operation 1j-30. The preset second subframe may be specified by the MCCH configuration information. In order to receive PMCH and MTCH, the UE receives MAC PDU via a second frequency-time resource of another preset second subframe, decodes MTCH of interest, and receives an MBMS service of interest in operation 1j-35. In order to monitor whether the MCCH information is changed, the UE monitors whether the UE receives an M-RNTI from a preset second frequency-time resource of a preset second subframe in operation 1j-40. If the UE receives an M-RNTI and ascertains that the MCCH information has been changed, the UE returns to operation 1j-30. After that, the UE receives MCCH again, checks the changed content, and receives MTCH.

The second process is performed as follows. The UE receives MCCH configuration information via a preset third frequency-time resource of a preset third subframe in operation 1j-45. The third subframe transmitting the MCCH configuration information may be notified by system information of a nearby normal cell or may be specified by control information broadcast via a preset frequency/time resource of a corresponding dedicated carrier/cell. The UE receives MCCH information and identifies MTCH and PMCH providing an MBMS service of interest that the UE needs to receive in operation 1j-50. The UE: receives MAC PDU via a third frequency-time resource of another preset third subframe or a fourth frequency-time resource of a fourth subframe; decodes MTCH of interest; and receives an MBMS service of interest in operation 1j-55. In order to monitor whether MCCH information is changed, the UE monitors whether the UE receives a preset RNTI via a preset third frequency-time resource of a preset third subframe operation 1j-60. The preset third subframe may be specified by the MCCH configuration information (e.g., MCCH repetition period). The preset third frequency-time resource may be configured in the MCCH configuration information or may be previously configured via the middle 6 PRBs (Physical Resource Blocks), etc. The preset RNTIs may be specified by the Downlink Control Information (DCI). The preset RNTI may be an M-RNTI. If the UE receives a preset RNTI and ascertains that the MCCH information has been changed, the UE returns to operation 1*j*-50. After that, the UE receives MCCH again, checks the changed content, and receives MTCH.

As described above, the present disclosure is capable of: transmitting, to the UE, information regarding an MBMS dedicated carrier along with information regarding a normal carrier as in the procedures refereeing to FIGS. 1G, 1H, 1I and 1J; and enabling the UE to selectively use the MBMS dedicated carrier or the normal carrier according to an MBMS service that the UE needs to receive, thereby increasing the amount of MBMS and supporting the demand increasing in MBMS.

Figure 1K:
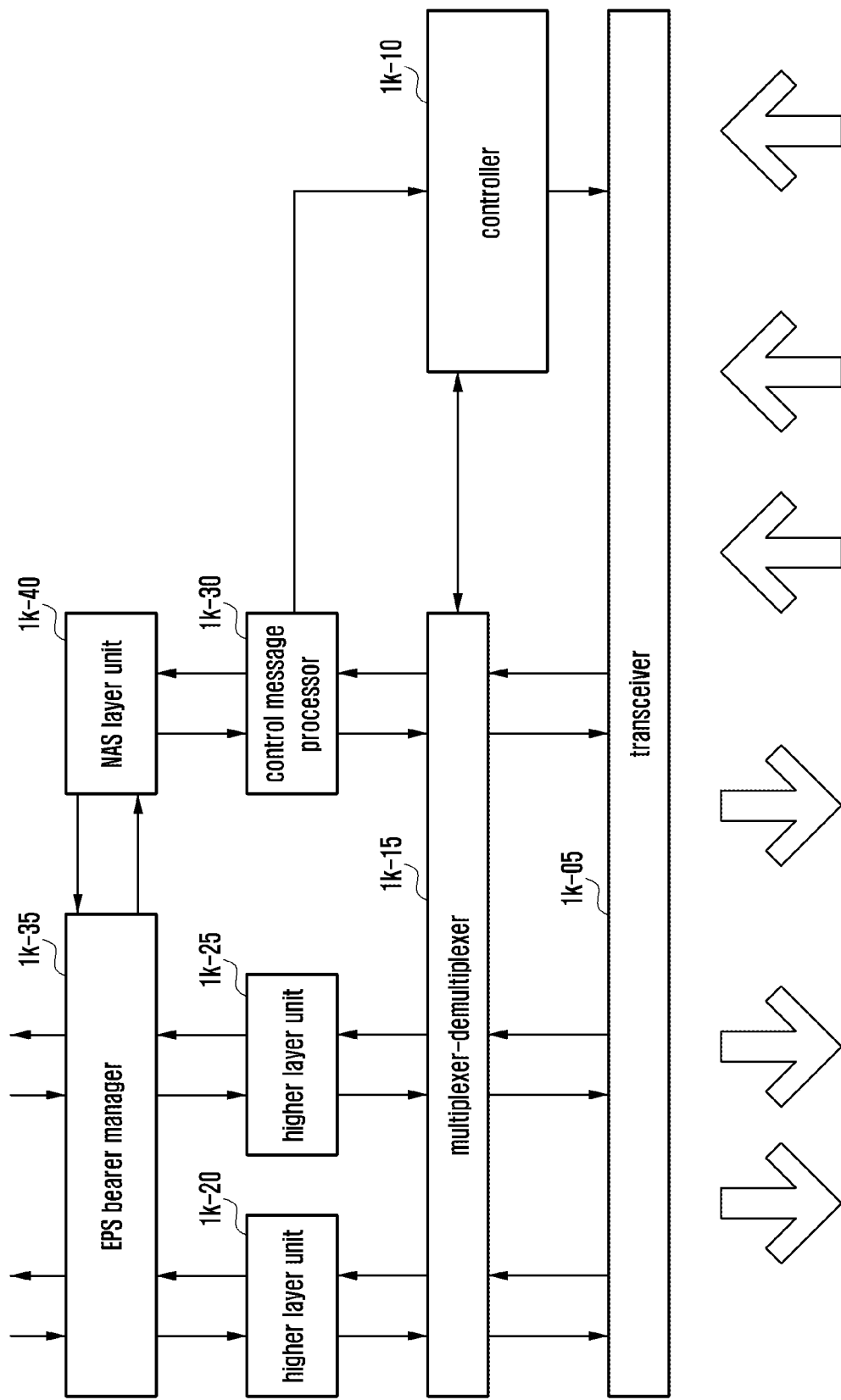
FIG. 1K illustrates an example UE according to various embodiments of the present disclosure.

With reference to FIG. 1K, The UE according to an embodiment of the present disclosure includes a transceiver 1*k*-05, a controller 1*k*-10, a multiplexer-demultiplexer 1*k*-15, a control message processor 1*k*-30, various higher layer processors 1*k*-20 and 1*k*-25, an EPS bearer manager 1*k*-35 and an NAS layer processor 1*k*-40.

The transceiver 1*k*-05 receives data and preset control signals via a forward channel of a serving cell, and transmits data and preset control signals via a reverse channel. If a number of serving cells are configured, the transceiver 1*k*-05 transmits/receives data and controls signals to/from the serving cells.

The multiplexer-demultiplexer 1*k*-15: multiplexes data, created in the higher layer processors 1*k*-20 and 1*k*-25 or the control message processor 1*k*-30; or demultiplexes data received from the transceiver 1*k*-05, and transfers the result to the corresponding higher layer processor 1*k*-20 or 1*k*-25 or the control message processor 1*k*-30.

The control message processor 1*k*-30 serves as an RRC layer unit which processes control messages received from an eNB and performs a corresponding operation. For example, if the control message processor 1*k*-30 receives a message, RRC CONNECTION SETUP, the control message processor establishes a temporary DRB with an SRB.

The higher layer processors 1*k*-20 and 1*k*-25 are referred to as a DRB device, and may be configured according to types of services. The higher layer processors 1*k*-20 and 1*k*-25 process data, created by user services, such as file transfer protocol (FTP) or Voice over Internet Protocol (VoIP), etc., and transfer the result to the multiplexer-demultiplexer 1*k*-15. The higher layer processors 1*k*-20 and 1*k*-25 process data transferred from the multiplexer-demultiplexer 1*k*-15, and transfer the result to higher layer service applications. One service may have a one-to-one mapping with one EPS bearer and one higher layer processor.

The controllers 1*k*-10 identify scheduling commands received via the transceiver 1*k*-05, e.g., reverse grants, and controls the transceiver 1*k*-05 and the multiplexer-demultiplexer 1*k*-15 to perform the reverse transmission via a corresponding transmission resource at an appropriate timing.

Figure 1L:
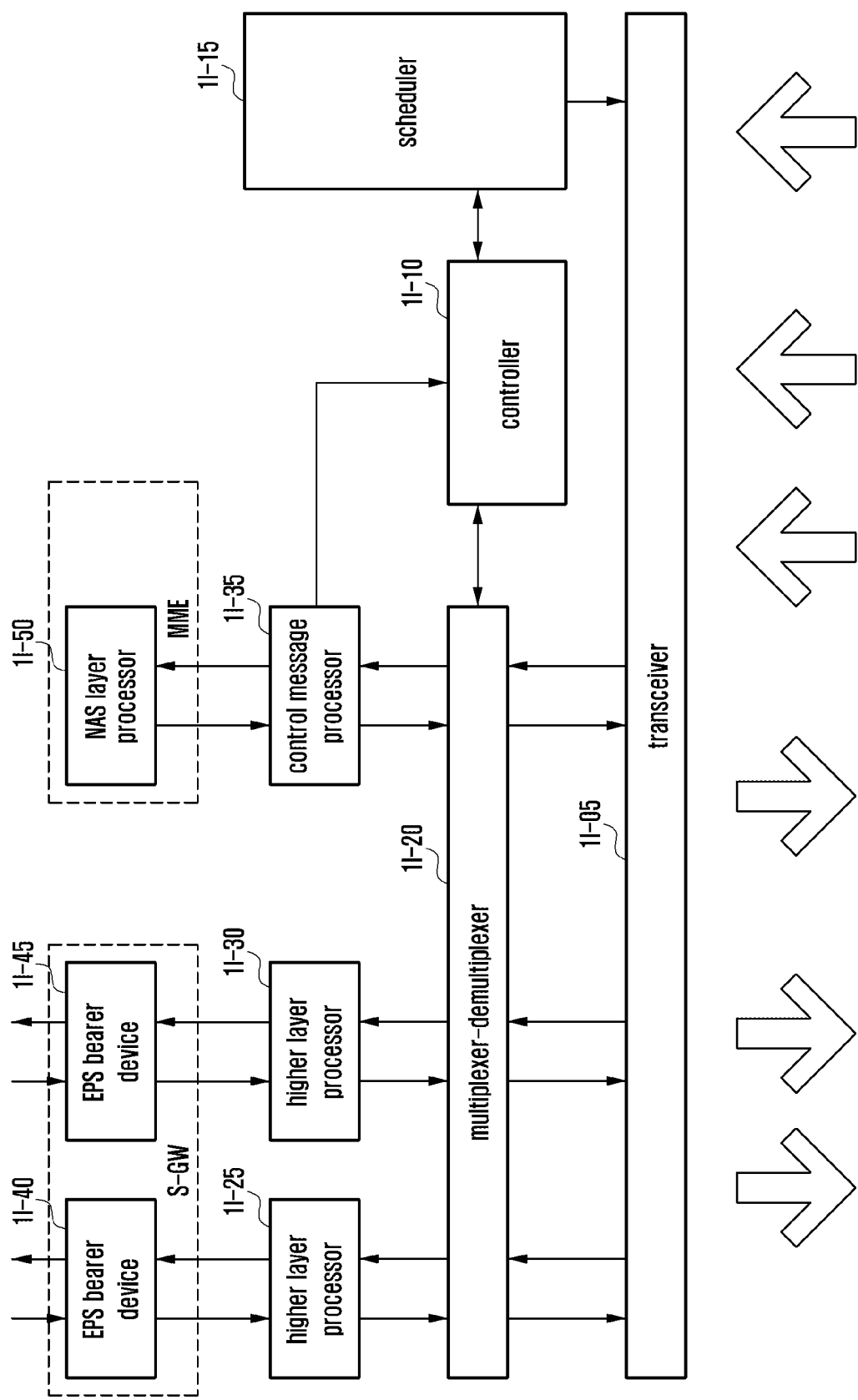
FIG. 1L illustrates an example eNB, an MME and an S-GW according to various embodiments of the present disclosure.

FIG. 1L illustrates an example eNB, an MME and an S-GW according to an embodiment of the present disclosure.

As shown in FIG. 1L, the eNB includes a transceiver 1*l*-05, a controller 1*l*-10, a multiplexer-demultiplexer 1*l*-20, a control message processor 1*l*-35, various higher layer processors 1*l*-25 and 1*l*-30, a scheduler 1*l*-15, and EPS bearer devices 1*l*-40 and 1*l*-45, and an NAS layer processor 1*l*-50. The EPS bearer devices are located in an S-GW, and the NAS layer processor is located in an MME.

The transceiver 1*l*-05 transmits data and a preset control signal via a forward carrier, and receives data and a preset control signal via a reverse carrier. If a number of carriers are configured, the transceiver 1*l*-05 performs the transmission/reception of data and controls signals via the carriers.

The multiplexer-demultiplexer 1*l*-20: multiplexes data, created in the higher layer processors 1*l*-25 and 1*l*-30 or the control message processor 1*l*-35; or demultiplexes data received from the transceiver 1*l*-05, and transfers the result to the higher layer processors 1*l*-25 and 1*l*-30, the control message processor 1*l*-35, or the controller 1*l*-10. The control message processor 1*l*-35: processes a control message transmitted from the UE and performs a corresponding operation; or creates a control message to be transmitted to the UE and transfers the result to a lower layer.

The higher layer processors 1*l*-25 and 1*l*-30 may be configured according to EPS bearers. The higher layer processors 1*l*-25 and 1*l*-30 configure data transferred from the EPS bearer devices into RLC PDUs and transfers the RLC PDUs to the multiplexer-demultiplexer 1*l*-20. The higher layer processors 1*l*-25 and 1*l*-30 also configure RLC PDUs transferred from the multiplexer-demultiplexer 1*l*-20 into PDCP SDUs, and transfer the PDCP SDUs to the EPS bearer devices.

The scheduler allocates a transmission resource to the UE at an appropriate timing point, considering the state of the UE, such as a buffer state, a channel state, etc., thereby enabling the transceiver to: process signals received from the UE; or transmit signals to the UE.

The EPS bearer device is configured according to EPS bearers. The EPS bearer device processes data transferred from higher layer processors and transmits the result to the next network node.

The higher layer processor and the EPS bearer device are connected to each other via an S1-U bearer. The higher layer processor corresponding to a common DRB is connected to an EPS bearer for the common DRB via a common S1-U bearer.

The NAS layer processor processes an IP packet included in an NAS message, and transmits the result to the S-GW.

The present disclosure enables an eNB to provide the UE with information regarding a carrier providing an MBMS service via preset common signals (e.g., preset system information) transmitted to a number of UEs. The information includes information as to whether a corresponding carrier specifies a normal carrier or a dedicated carrier. In order to receive an MBMS service, the UE receives a preset signal related to MBMS from a preset carrier, via a preset subframe, referring to the control information. In this case, the UE receives MBMS service, by using a subframe type and a procedure corresponding to a type of carrier. That is, the present disclosure is capable of: transmitting, to the UE, information regarding an MBMS dedicated carrier along with information regarding a normal carrier; and enabling the UE to selectively use the MBMS dedicated carrier or the normal carrier according to a service that the UE needs to receive, thereby increasing the amount of MBMS and supporting the demand increasing in MBMS.

The present disclosure provides a method, a procedure and a system which are capable of supporting the demand increasing in MBMS and the enlarged MBMS service area in a mobile communication system, by using a relatively long length of cyclic prefix (CP).

In the current LTE standard technology, for one radio frame, specific subframes may not be used as fixed MBSFN subframes containing MBMS data. More specifically, an MBSFN subframe uses only part of the subframe #1, #2, #3, #6, #7, and #8 from a total of 10 subframes in one radio frame (hereafter, #n is referred to as subframe number, and subframe number is referred to as a chronological order of subframe in one radio frame, i.e., integers 0~9). Since subframes #0, #4, #5, and #9 are used to transmit a paging message or required system information such as master information block (MIB), system information block 1 (SIB1), etc., Those information blocks have difficulty being used as an MBSFN subframe. Therefore, subframes #0, #4, #5, and #9 may be used as extended MBSFN subframes via only a preset procedure. An area transmitting specific MBMS service data is called an MBMS service area. In order to allow for the synchronization of the transmission of a multicast user service across a number of cells, a single frequency network service, i.e., Multimedia broadcast multicast service single frequency network (MBSFN), is employed. Therefore, an MBSFN area may be referred to as a group of cells in an MBSFN synchronization area, which provides a corresponding MBMS service along with the MBSFN transmission service, and the MBSFN area may increase in size. In order to use an MBMS service based on LTE system employing an orthogonal frequency division multiplexing (OFDM) transmission mode, when the UE receives signals from an eNB, the UE has a limitation condition that the UE needs to receive the signals within a cyclic prefix (CP) length. However, if a synchronized MBSFN area is increased, signals synchronized and transmitted by eNBs are received by the UE near the edge of an MBSFN area as signals exceeding the cyclic prefix length which is caused by a time delay or a multiple path. In this case, the UE may not normally receive the signals. Therefore, a cyclic prefix length needs to be increased so that the cyclic prefix length is greater than the existing CP length.

The present disclosure provides a method, a procedure and a system which are capable of performing a signaling to selectively use two types of sub-carrier spacing and three cyclic prefix lengths in one cell/carrier, in order to support the demand increasing in MBMS and the enlarged MBMS service area in a mobile communication system.

In the following description, an operation principle of embodiments of the disclosure is described in detail with reference to the accompanying drawings. Detailed descriptions of well-known functions and structures incorporated herein may be omitted to avoid obscuring the subject matter of the disclosure. The following terms are defined considering functions of the disclosure, and may be changed by users or operators according to their needs. Therefore, the terms will be defined throughout the content of this description.

In the following description, terms used to identify an access node, terms referred to as network entities, terms expressing messages, terms representing interfaces between network objects, terms used for various types of identification information, etc. are used for the sake of convenient description. Therefore, the present disclosure is not limited by the terms and may use other terms with the meanings equivalent to the terms described in the present disclosure, representing the corresponding components.

For the sake of convenient description, the present disclosure uses terms and names defined in the specifications of the 3rd generation partnership project long term evolution (3GPP LTE). However, it should be understood that the present disclosure is not limited to the terms and names and may also be applied to systems following the other standards.

The present disclosure provides a method, a procedure and a system which are capable of performing a signaling to selectively use two types of sub-carrier spacing and three cyclic prefix lengths in one cell/carrier, in order to support the demand increasing in MBMS and the enlarged MBMS service area in a mobile communication system.

In the following description, technology related to MBMS in an LTE standard is explained in detail with reference to the accompanying drawings.

Figure 2A:
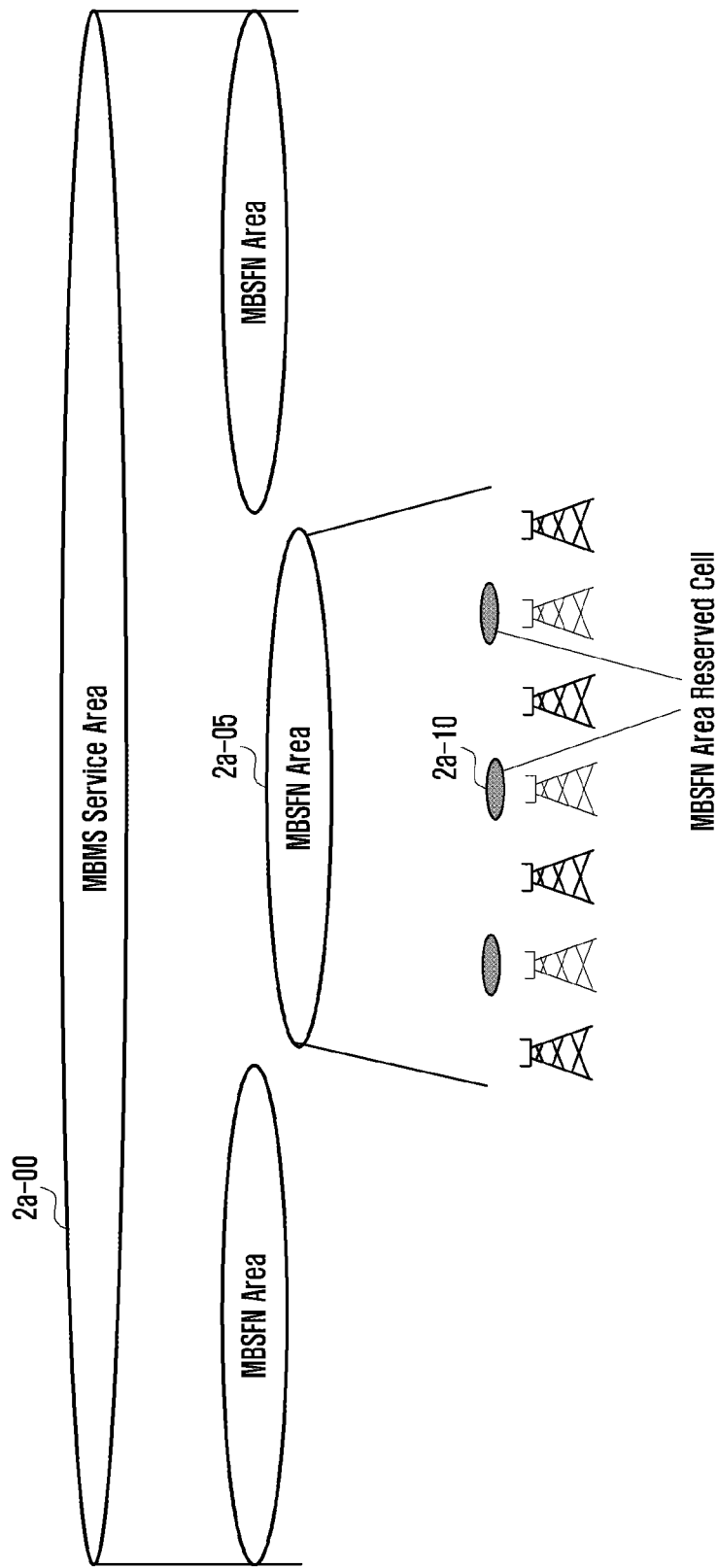
FIG. 2A illustrates an example MBMS according to various embodiments of the present disclosure.

FIG. 2A illustrates an example MBMS.

If multicast and broadcast services can be simultaneously provided to one user, it may be easily performed by the MBMS of LTE. MBMS is introduced as a component for E-UTRAN to support the transmission of broadcast services, such as transmission of a television service and transmission of multimedia content (e.g., audio, video, image, text, etc.). MBMS is referred to as a user service using a broadcast mechanism in a wireless interface, and provides secure functions allowing only specific users (i.e., users belonging to a multicast group) to receive the service. The area to which data of a specific MBMS service is transmitted is called an MBMS service area 2a-00. A single MBMS service area corresponds to a collection of one or more separated geographical areas. Alternatively, the MBMS service area 2a-00 is a network area including a number of eNBs capable of preforming the transmission of Multimedia Broadcast multicast service Single Frequency Network (MBSFN).

MBMS introduces an MBMS service via a single frequency network to allow for the synchronization of the transmission of a multicast user service across a number of cells, which is called MBSFN. MBSFN means that the data streams can be transmitted across one or more cells, using the same radio frequency. MBSFN depends on the synchronization between MBMS services and individual eNBs providing cells, respectively. The group of eNBs may be synchronized to define an MBSFN synchronization area. Each MBSFN synchronization area may support one or more MBSFN Areas 2a-05. That is, an MBSFN area is referred to as a group of cells in an MBSFN synchronization area, providing a preset MBMS service, along with the MBSFN transmission.

All cells except for MBSFN area reserved Cells 2a-10 in an MBSFN Area are used for the MBSFN transmission. MBSFN area reserved Cells 2a-10 are referred to as cells which are not used for the MBSFN transmission. MBSFN area reserved Cells 2a-10 may be used for the transmission for other objectives; however, MBSFN Area Reserved Cells 2a-10 may be allowed for limited transmission power for radio resources assigned to perform the MBSFN transmission.

Figure 2B:
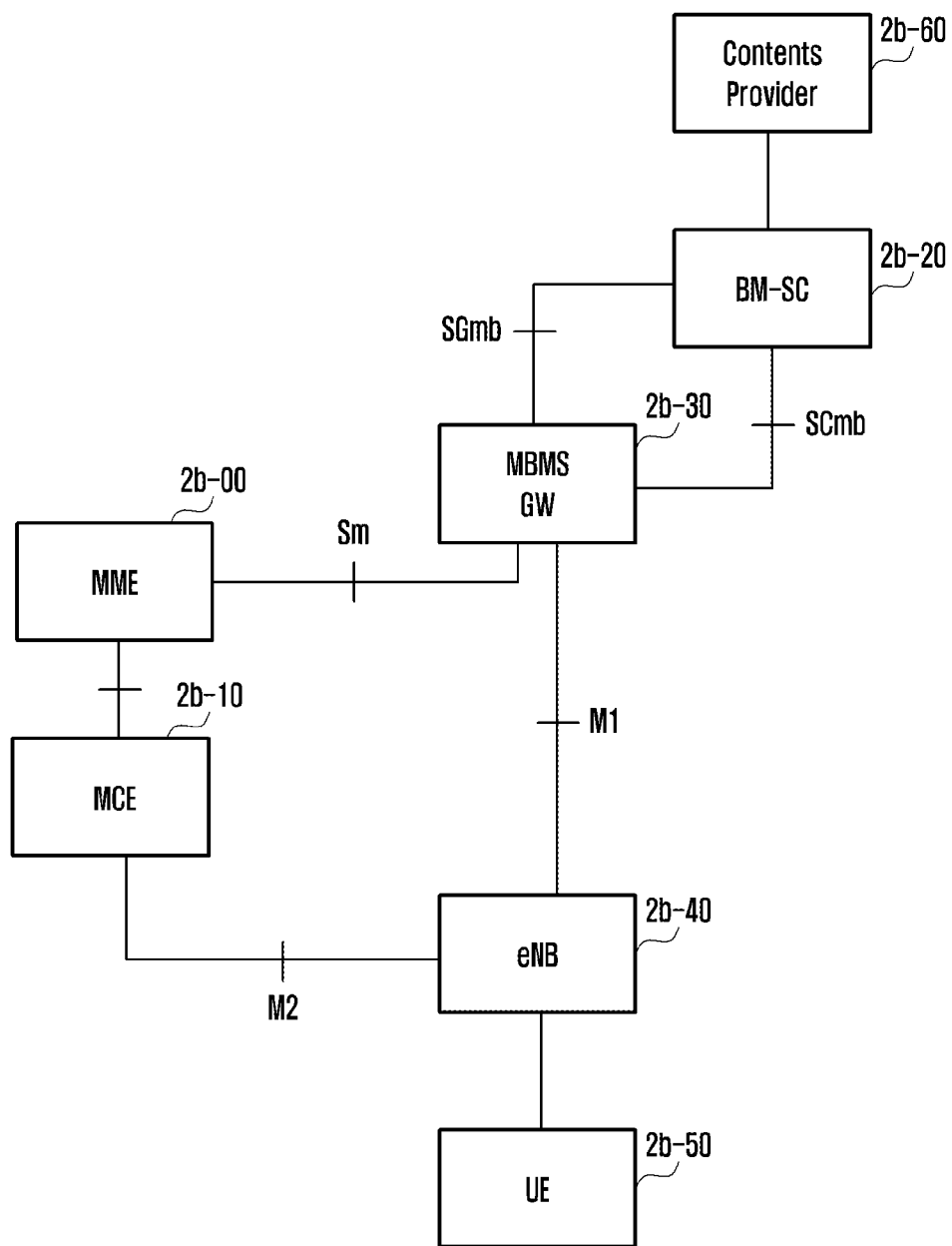
FIG. 2B illustrates an example network architecture for MBMS service in an LTE system according to various embodiments of the present disclosure.

FIG. 2B illustrates an example network architecture for MBMS service in an LTE system.

With reference to FIG. 2B, mobility management entity (MME) 2b-00 controls MBMS session. MME 2b-00 is connected to MBMS coordination entity (MCE) 2b-10 via an M3 interface. MCE 2b-10 performs the management and allocation of radio resources for eNBs 2b-40 (also called enhanced Node Bs, eNB, base stations, etc.) that belonged to MCE, and performs acceptance control for MBMS service. MCE determines a modulation and coding scheme (MCS) for MBMS services and controls an MBMS session. MCE is a logical node physically separated from an eNB and manages radio resources. MCE may form a configuration in such a way that it is separated into individual eNBs, so that one MCE separated into one eNB is a master and the other MCEs separated to the eNBs are a slave.

Broadcast/multicast service center (BM-SC) 2b-20 performs the authority verification of MBMS bearer services and the service start. BM-SC also performs scheduling and transmission of MBMS content, considering the service quality. BM-SC is capable of transmitting, to an LTE network, broadcast content of BM-SC. BM-SC is also capable of forwarding broadcast content in association with an external content provider 2b-60. BM-SC is connected to an MBMS gateway (MBMS-GW) 2b-30 via an SCmb interface in order to transmit control messages, and also via an SGi-mb interface in order to transmit content (user traffic). MBMS-GW 2b-30 performs the control of MBMS session (e.g., service start and service end), and transmits content to an eNB in IP multicast transmission. MBMS-GW 2b-30 is connected to the MME via an Sm interface in order to transmit control messages for session, and to an eNB via an M1 interface in order to transmit content.

The eNB 2b-40: receives information regarding radio resource assigned by MCE; allocates radio resources to transmit broadcast services, scheduled by MCE, to user equipment (UE) 2b-50 (which is also called a terminal, a mobile device, etc.); and performs the synchronization transmission for MBMS services. The eNB is connected to the MCE via an M2 interface in order to transmit control signals. The UE 2b-50 received synchronized MBMS data.

Figure 2C:
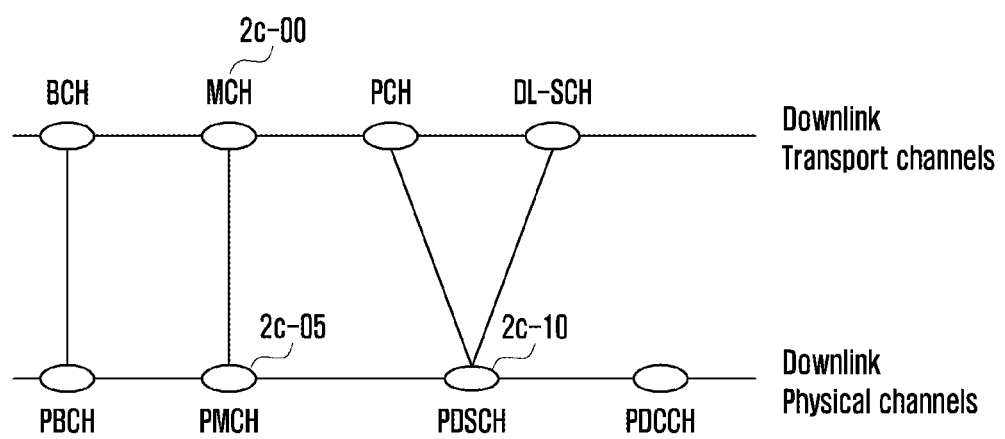
FIG. 2C illustrates an example mapping relationship of downlink channels used for the MBSFN transmission according to various embodiments of the present disclosure.

FIG. 2C illustrates an example mapping relationship of downlink channels used for the MBSFN transmission.

As shown in FIG. 2C, MCH 2c-00 is used between an MAC layer and a physical layer. MCH is mapped to PMCH 2c-05 of a physical layer. In general, unicast scheme transmitting data to only a specific UE uses physical downlink shared channel (PDSCH) 2c-10.

Figure 2D:
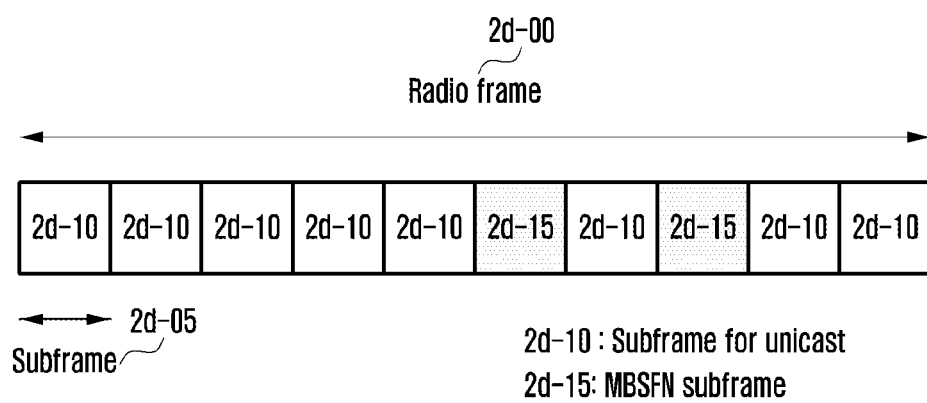
FIG. 2D illustrates an example structure of a downlink frame used in LTE systems according to various embodiments of the present disclosure.

FIG. 2D illustrates an example structure of a downlink frame used in LTE systems.

As shown in FIG. 2D, a radio frame 2d-00 includes 10 subframes 2d-05. Each subframe may be a 'normal subframe 2d-10' used for the transmission/reception of general data or 'Multimedia Broadcast multicast service Single Frequency Network (MBSFN) subframe 2d-15' used for multicast and broadcast user services.

Normal subframe and MBSFN subframe differ from each other, in terms of number and structure, with respect to orthogonal frequency division multiplexing (OFDM) symbols, cyclic prefix (CP) length, cell-specific reference signals (CRS), etc.

Figure 2E:
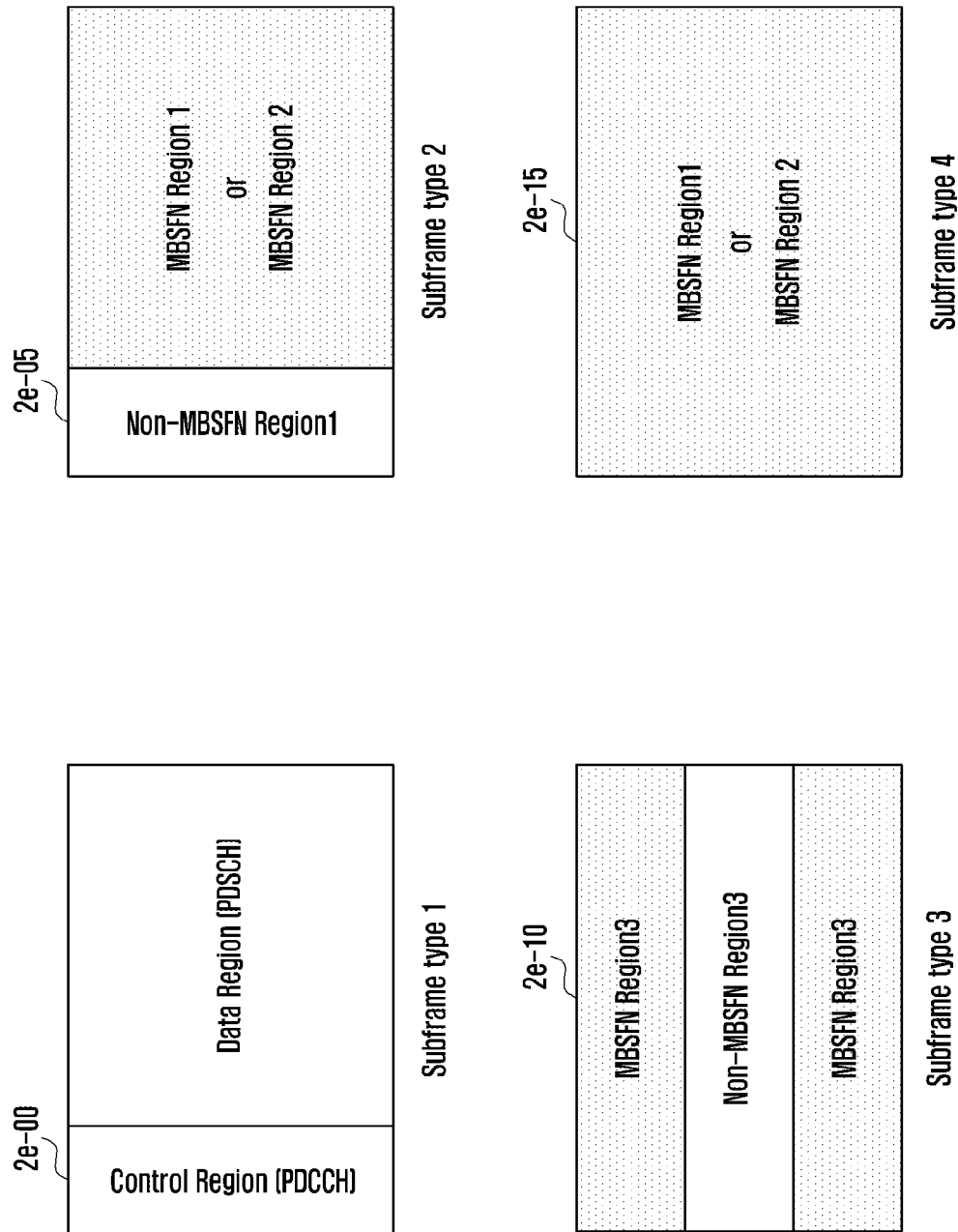
FIG. 2E illustrates an example structures of normal subframes and various MBSFN subframes according to various embodiments of the present disclosure.

FIG. 2E illustrates an example structure of normal subframes and various MBSFN subframes.

Subframe type 1 (2e-00) is a normal subframe used for the transmission/reception of unicast data in an LTE system. The control region (PDCCH) of the subframe type 1 indicates a location where data is actually transmitted and/or received. Actual data is transmitted via the data region (PDSCH) of Subframe type 1. Before a UE receives real data, the UE needs to determine whether the control region has information regarding a resource assigned to the UE.

The normal carrier provides an MBMS service via an MBSFN subframe of a preset structure, which is called a subframe type 2 (2e-05) in the following description. One or two first symbols of the subframe are non-MBSFN Areas. In this case, CRS is transmitted, using a normal cyclic prefix. The length of time of a non-MBSFN region of the subframe may be specified by a non-MBSFNregionLength of MBSFN-RegionInfo (refer to TS36.331). The remaining symbols of the subframe transmit, to an MBSFN region, an MBSFN reference signal (refer to TS36.211, TS36.212, and TS 36.213), employing an extended cyclic prefix.

Subframe type 2 (2e-05) has an extended MBSFN subframe whose structure is identical to those of the subframe type 3 (2e-10) and subframe type 4 (2e-15). MBSFN region is divided into MBSFN region 1, MBSFN region 2, and MBSFN region 3. In order to apply a cyclic prefix of the same length, MBSFN regions are divided in one time interval. MBSFN region 1 uses an extended cyclic prefix, and is a region transmitting an MBMS reference signal. MBSFN region 2 uses a normal cyclic prefix and transmits MBMS reference signal 2 (MBMS reference signal type 2). The MBMS reference signal 2 may be an MBMS reference signal designed to be suitable for a normal cyclic prefix. MBSFN region 3 uses a cyclic prefix which has been previously specified via system information or MCCH, and transmits MBMS reference signal 3. The MBMS reference signal 3 may be an MBMS reference signal designed to be suitable for a previously specified cyclic prefix.

A non-MBSFN region is divided into non-MBSFN region 1, non-MBSFN region 2, and non-MBSFN region 3. The non-MBSFN region 1 corresponds to the entire frequency resource area of a time interval corresponding to n first symbols of a corresponding subframe, and is specified by non-MBSFNregionLength2 of MBSFN-RegionInfo. The information is broadcast via common control information (e.g., SIB 2 or MCCH) transmitted to a number of UEs. The UE, which needs to receive an MBMS service, obtains the information via a preset procedure. Non-MBSFN region 2 is a specific frequency band resource area of a time interval from a symbol right after a non-MBSFN region 1 to the last symbol. Non-MBSFN region 2 is used to transmit primary synchronization sequence (PSS), secondary synchronization sequence (SSS), master information block (MIB), system information (SI), etc. non-MBSFN region 3 is a specific frequency band resource area of an entire time interval. Non-MBSFN region 3 is used to transmit PSS, SSS, etc. non-MBSFN region 3 uses the same cyclic prefix as the MBSFN region 3.

In Rel-8 and Rel-9 systems, MBSFN subframes were used to perform the transmission of broadcast or multicast data, etc. With the development of systems, MBSFN subframes are used to perform unicast since LTE Rel-10, as well as broadcast or multicast. In particular, The UEs before Rel-10 do not attempt to perform a decoding operation in MBSFN subframes. Therefore, requiring all UEs to attempt to perform a decoding operation in MBSFN subframes leads UEs of the previous release to upgrade their versions.

Obtaining resource assignment information in a MBSFN is performed through complicated processes, unlike the unicast data transmission/reception including a process of detecting a control region (PDCCH) informing a location where data is actually transmitted/receive and a process of detecting information regarding resource assignment for data.

More specifically, the process of obtaining resource assignment information in a MBSFN is performed as follows. An eNB informs the UE of transmission locations of multicast control channels (MCCHs) by MBSFN Areas provided by a cell, via system information block 13 (SIB13) as broadcast information. MCCH contains resource assignment information for MBSFN. The UE decodes MCCH, and thus detects a transmission location of MBSFN subframes.

As described above, MBMS provides resource assignment information via a mode that differs from a conventional unicast, and this is because MBMS can be provided to the UE in an idle mode. Therefore, the transmission location of MCCH as a control channel is provided via SIB13 as broadcast information. The reception of MBMS service is explained, below, with reference to FIG. 2F.

Figure 2F:
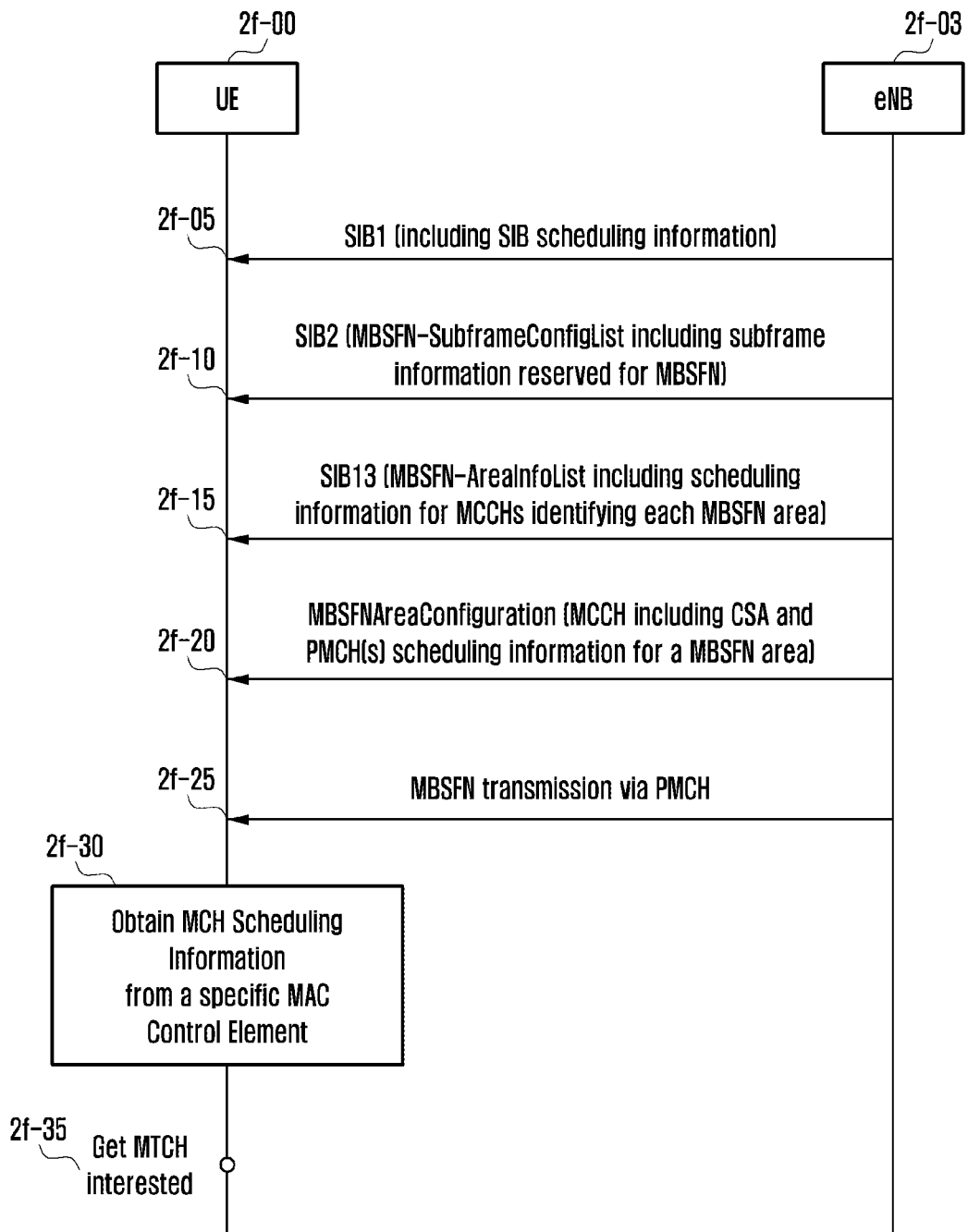
FIG. 2F illustrates a flowchart of method for a UE to receive MBMS via MBSFN according to various embodiments of the present disclosure.

FIG. 2F illustrates a flowchart of a method for a UE to receive MBMS via MBSFN.

In operation 2f-05, the UE 2f-00 receives SIB1 from the eNB 2f-03. The SIB1 includes scheduling information for other SIBs. Therefore, in order to receive other SIBs, SIB1 needs to have been received previously. In operation 2f-10, the UE 2f-00 receives SIB2 from the eNB 2f-03. An MBSFN subframe configuration list of SIB2 (MBSFN-SubframeConfigList IE) indicates subframes which can be used for MBSFN transmission. The MBSFN subframe configuration list includes MBSFN-SubframeConfig IE, and indicates a subframe of a radio frame which can be an MBSFN subframe. If the UE 2f-00 needs to receive MBSFN, the UE 2f-00 receives SIB13 from the eNB 2f-03 in operation 2f-15. MBSFN area information list of SIB13 (MBSFN-AreaInfoList IE) includes location information regarding the transmission of MCCHs by MBSFN areas, provided by a cell, and the UE receives MCCH using the information in operation 2f-20. Every MBSFN area has corresponding MCCH. The MBSFN area information list includes MCCH scheduling information regarding all MBSFN areas. MBSFN area configuration information of MCCH (MBSFNAreaConfiguration IE) indicates a location of a resource used for MBSFN transmission, and the UE receives an MBSFN subframe using the information in operation 2f-25. The UE obtains a location of MBSFN subframe, transmitting an MTCH of interest, from MCH scheduling information MAC CE as one of the MAC control elements (MAC CEs) of received MAC PDU in operation 2f-30. The UE decodes an MTCH of interest, using MCH scheduling information, and receives MBMS data of interest in operation 2f-35.

In the procedure with reference to 2F, specific subframes may not be used as fixed MBSFN subframes. That is, an MBSFN frame may be only one of a total of 10 subframes in one radio frame, i.e., subframe #1, #2, #3, #6, #7, or #8. This is because subframes #0, #4, #5 and #9 are used to transmit required information or paging messages, such as MIB, SIB, primary synchronization sequence (PSS), secondary synchronization sequence (SSS), etc. MIB is transmitted via subframe #0 of every radio frame. SIB1 is transmitted via subframe #5 of the even radio frames. The transmission of a paging message is determined in such a way that a radio frame and a subframe transmitting a paging message is determined as according to corresponding information configured by a network. Therefore, the UE calculates a radio frame and a subframe transmitting a paging message via a preset method according to corresponding information configured by a network, and uses subframes #0, #4, #5, and #9, not transmitting a paging message or system information, as extended MBSFN subframes.

Figure 2G:
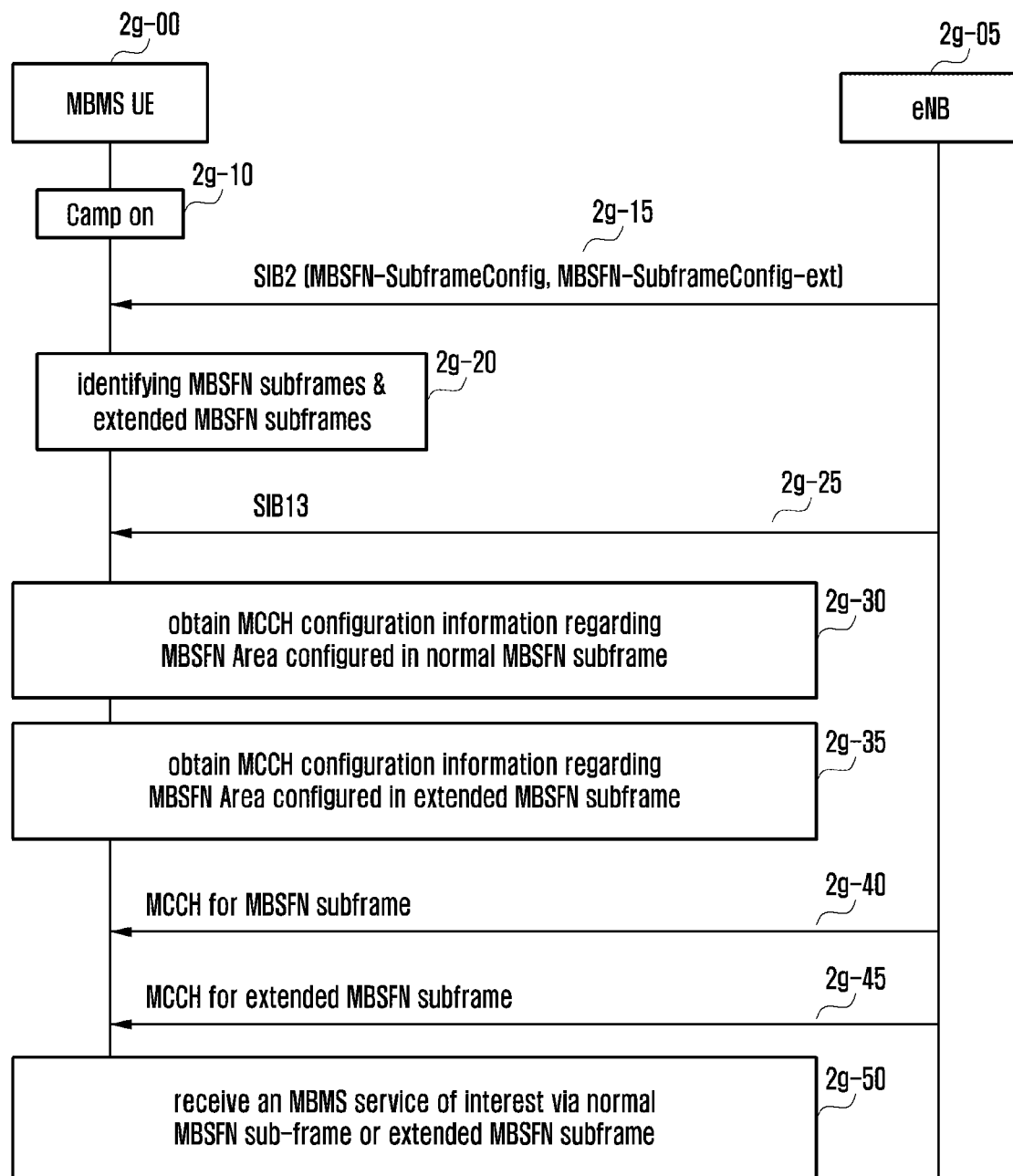
FIG. 2G illustrates a flow diagram of a method for a UE using an MBMS service to receive an extended MBSFN subframe according to various embodiments of the present disclosure.

FIG. 2G illustrates a flow diagram of a method for a UE using an MBMS service to receive an extended MBSFN subframe.

The UE 2g-00 using an MBMS service camps on the eNB 2g-05 in operation 2g-10. The UE receives SIB2 broadcast by the eNB in operation 2g-15. The SIB2 includes MBSFN-SubframeConfig-ext as well as Existing MBSFN-SubframeConfig. The UE identifies an MBSFN subframe and an extended MBSFN subframe, based on the two types of information, in operation 2g-20. Although the specific subframe indicates the extended MBSFN subframe via the MBSFN-SubframeConfig-ext, the UE determines whether the UE conflicts with a paging message. If the UE conflicts with a paging message, the extended MBSFN subframe is not considered as an MBSFN subframe transmitting broadcast data. The UE receives SIB13 in operation 2g-25. The SIB13 includes scheduling information regarding MCCH corresponding to each MBSFN area supported by the eNB. The UE obtains MCCH configuration information regarding MBSFN area configured in a normal MBSFN subframe and an extended MBSFN subframe in operations 2g-30 and 2g-35. The UE receives MCCHs related to the MBSFN subframe and the extended MBSFN subframe in operations 2g-40 and 2g-45. The UE receives an MBMS service of interest via the normal MBSFN subframe or extended MBSFN subframe in operation 2g-50.

As described above referring to FIG. 2G, the procedure is conducted to receive extended MBSFN subframes to provide more MBMS services. In order to increase the amount of MBMS, MBMS dedicated carriers/dedicated cells may also be used. The normal carrier/normal cell is referred to as a carrier/cell that provides MBMS services used as in the procedures referring to FIGS. 2F and 2G, along with normal user data. The dedicated carrier/dedicated cell is referred to as a carrier/cell that provides an MBMS service and control information required to provide the MBMS service. That is, the dedicated carrier/dedicated cell may use subframes #1, #2, #3, #4, #6, #7, #8, and #9 as MBSFN subframes in one radio frame, except for subframe #0 and #5 transmitting MIB, SIB1, PSS, SSS, etc.

The present disclosure provides a method, a procedure and a system which are capable of performing a signaling to selectively use two types of sub-carrier spacing and three cyclic prefix lengths in one cell/carrier, in order to support the demand increasing in MBMS and the enlarged MBMS service area in a mobile communication system.

An MBSFN area may be referred to as a group of cells in an MBSFN synchronization area, which provides a corresponding MBMS service along with the MBSFN transmission service, and the MBSFN area may increase in size. In order to use an MBMS service based on LTE system employing an OFDM transmission mode, when a UE receives signals from an eNB, the UE has a limitation condition that the UE needs to receive the signals within a cyclic prefix (CP) length. However, if a synchronized MBSFN area is increased, signals synchronized and transmitted by the eNBs are received by the UE near the edge of an MBSFN area as signals exceeding the cyclic prefix length which is caused by a time delay or a multiple path. In this case, the UE may not normally receive the signals. Therefore, a cyclic prefix length needs to be increased so that the cyclic prefix length is greater than the existing CP length. In the current LTE standard specification (36.211), available sub-carrier spacing and CP length is defined in the table 1.

TABLE 1

| OFDM parameters | | |
| --- | --- | --- |
| Configuration | | Cyclic prefix length $N_{CP, l}$ |
| Normal cyclic prefix | $\Delta f$ = 15 kHz | 160 for l = 0 |
| | | 144 for l = 1, 2, . . . , 6 |
| Extended cyclic prefix | $\Delta f$ = 15 kHz | 512 for l = 0, 1, . . . , 5 |
| | $\Delta f$ = 7.5 kHz | 1024 for l = 0, 1, 2 |

However, 7.5 kHz sub-carrier spacing and the corresponding cyclic prefix length 1024 in the current standard specification is not used. Therefore, the present disclosure provides an apparatus and method that: defines three types of combinations with 7.5 kHz sub-carrier spacing, sub-carrier spacing and cyclic prefix, as in the table 2; and configures combinations to use according to subframes, thereby supporting an MBMS service area which may increase in size.

TABLE 2

Three combinations of sub-carrier spacing and cyclic prefix

| | CP types | subcarrier spacing(Δf) | CP length ($N_{CP}$) |
|---|---|---|---|
| CP_SCS combination 1 | Normal | 15 KHz | 160 or 144 |
| CP_SCS combination 2 | Extended | 15 KHz | 512 |
| CP_SCS combination 3 | Extended | 7.5 KHz | 1024 |

Figure 2H:
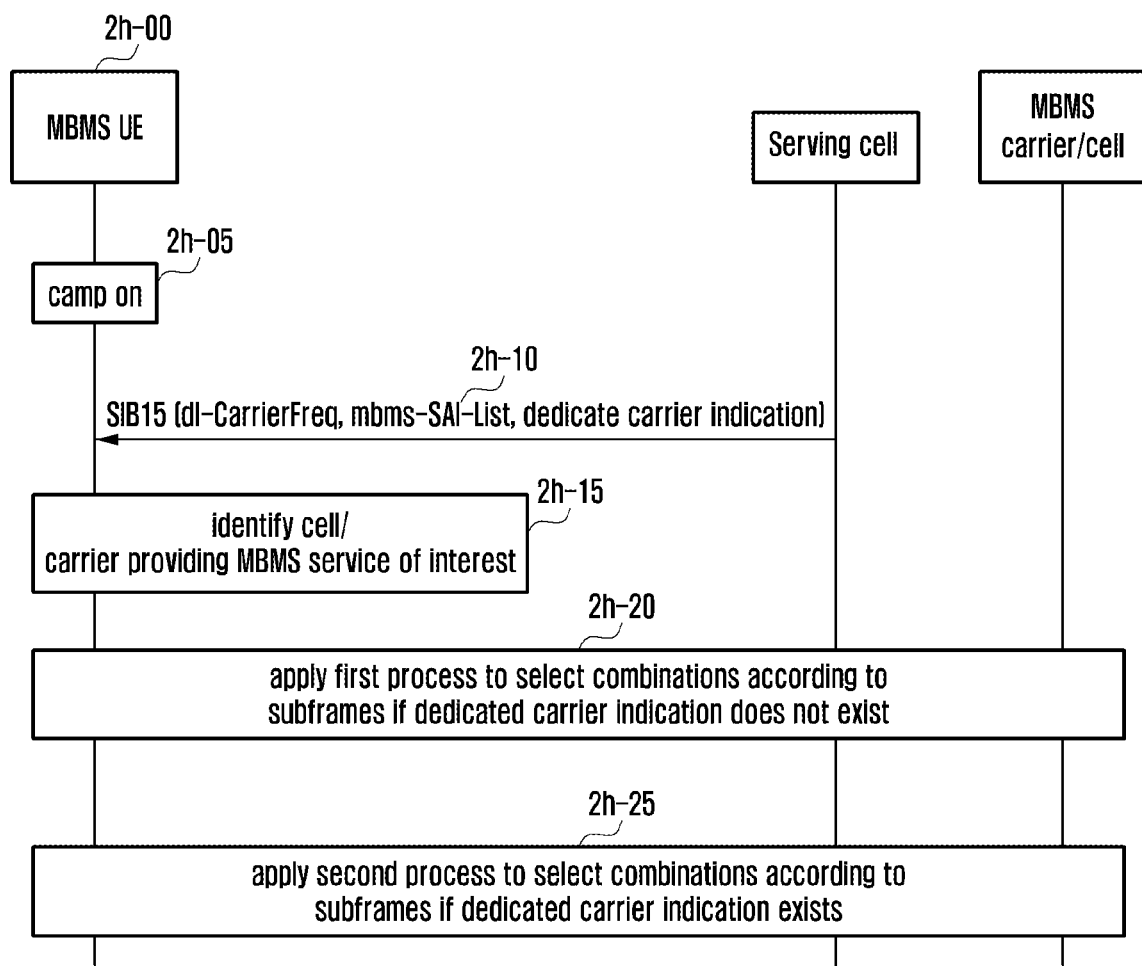
FIG. 2H illustrates a flow diagram of a procedure for identifying a carrier/cell to apply a combination of a sub-carrier and a cyclic prefix length according to various embodiments of the present disclosure.

FIG. 2H illustrates a flow diagram of a procedure for identifying a carrier/cell, to apply a combination of a sub-carrier and a cyclic prefix length according to subframes in a normal cell/normal carrier or dedicated cell/dedicated carrier, according to the present disclosure.

The UE 2h-00, which needs to receive an MBMS service, camps on a cell in operation 2h-05. The UE 2h-00 receives necessary system information (scheduling information regarding SIBs, etc.) from an eNB as in the procedures referring to FIGS. 2F and 2G, and receives system information to select a normal carrier or a dedicated carrier via SIB15 in operation 2h-10. The system information may include normal carrier frequency information (dl-carrier-Freq) providing an MBMS service and service area Id (SAI) list of a corresponding carrier; and carrier frequency information regarding a dedicated carrier and information regarding a service area Id list of a corresponding dedicated carrier. The system information may also include a dedicated carrier indication (dedicateCarrierIndication) informing that parts of the carriers are a dedicated carrier. The UE may have previously identified a service area (SA) which provides a service that the UE needs to receive. Therefore, The UE determines whether a service area Id (SAI) of a service area providing a service of interest is a service area Id of a normal carrier or a dedicated carrier in operation 2h-15. If the UE ascertains that a service area Id (SAI) of a service area providing a service of interest is a service area Id of a normal carrier in operation 2h-15, the UE performs a first process to receive an MBMS service via a normal carrier in operation 2h-20. If the UE ascertains that a service area Id (SAI) of a service area providing a service of interest is a service area Id of a dedicated carrier in operation 2h-15, the UE performs a second process to receive an MBMS service via a dedicated carrier in operation 2h-25.

Figure 2I:
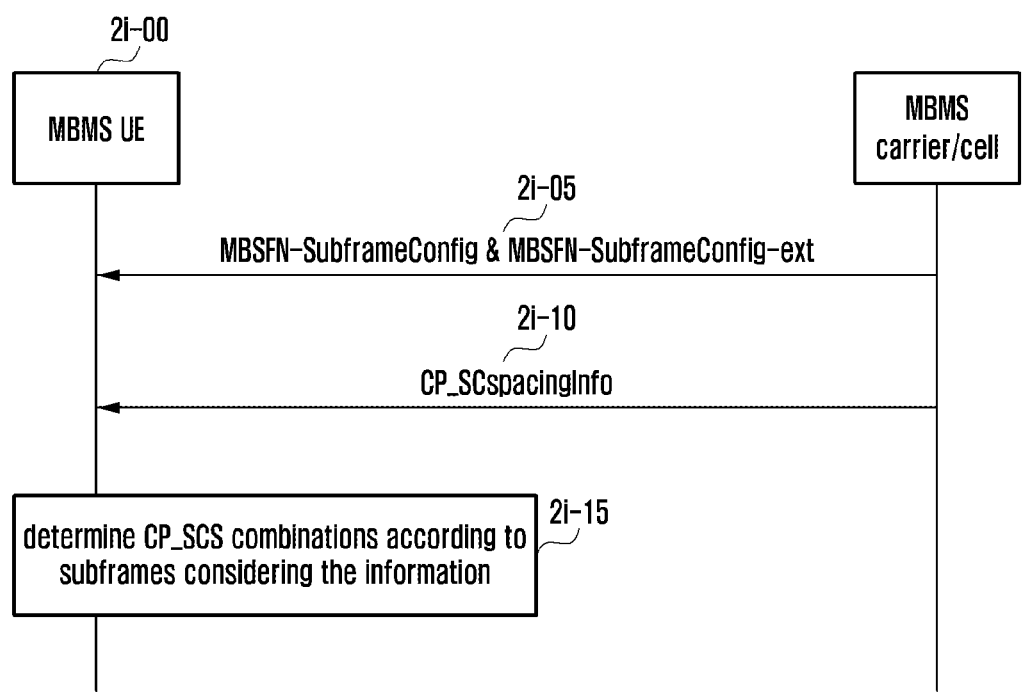
FIG. 2I illustrates a flow diagram of a procedure for determining a combination (CP_SCS combination) of a cyclic prefix length and a sub-carrier based on subframes of a normal carrier according to various embodiments of the present disclosure.

FIG. 2I illustrates a flow diagram of a procedure for determining, when a service that the UE needs to receive is provided via a normal carrier, a combination (CP_SCS combination) of a cyclic prefix length and a sub-carrier according to subframes of a normal carrier.

The UE receives the following information via MCCH and system information of a normal carrier for frame structure (FS) type 1 (FDD type) or frame structure type 2 (TDD type) according to a transmission/reception mode of an eNB, e.g., frequency division duplex (FDD) or time division duplex (TDD):

MBSFN-SubframeConfig (6-bit or 24-bit BITMAP); for FDD/FS1, information regarding the indication of subframes #1, #2, #3, #6, #7, and #8 to MBSFN subframes (#n specifies subframe number, and subframe number specifies a chronological order of subframe in one radio frame, i.e., integers 0~9); for TDD/FS2, information regarding the indication of subframes #3, #4, #7, #8, and #9 to MBSFN subframes; MBSFN-SubframeConfig-ext (4-bit or 16-bit BITMAP); for FDD/FS1, information regarding the indication of subframes #0, #4, #5, and #9 to extended MBSFN subframes; and for TDD/FS2, information regarding the indication of subframes #0, #1, #5, and #6 to extended MBSFN subframes.

The UE receives the information and identifies a subframe indicating an MBSFN frame and extended MBSFN frame in operation 2i-05. The UE receives the following information via MCCH or system information of a corresponding carrier in operation 2i-10:

CP_SCspacingInfo (CyclicPrefixSubCarrierSpacingInfo, 2-bit or 8-bit BITMAP); and For FS1: information regarding the application of CP_SCS combination 3 to subframe #4 or #9; if the FS1 is 2 bits, the first bit is information regarding subframe #4 and the second bit is information regarding subframe #9; and if the FS2 is 8 bits, bits b1, b3, b5, and b7 are information regarding subframe #4, and bits b2, b4, b6, and b8 are information regarding subframe #9 (bn denotes the nth bit).

The remaining subframes do not use combination 3 in order to secure the compatibility with MBMS UE of the previous release.

For FS2: information regarding the application of CP_SCS combination 3 to subframe #1 or #6; if the FS2 is 2 bits, the first bit is information regarding subframe #1 and the second bit is information regarding subframe #6; and if the FS2 is 8 bits, bits b1, b3, b5, and b7 are information regarding subframe #1, and bits b2, b4, b6, and b8 are information regarding subframe #6 (bn denotes the nth bit).

The remaining subframes do not use combination 3 in order to secure the compatibility with MBMS UE of the previous release.

The UE configures combinations according to subframes, considering the CP_SCspacingInfo information, as follows, in operation 2i-15: CP_SCS combination1 is applied to a normal subframe; CP_SCS combination2 is applied to a subframe set as an MBSFN subframe in the MBSFN-SubframeConfig; for FS1, a combination to be applied to subframes specified as an extended MBSFN subframe in the MBSFN-SubframeConfig-ext is determined as follows; CP_SCS combination1 is applied to subframes #0 and #5; CP_SCS combination3 is applied to one of the subframes #4 and #9, which is specified by CP_SCspacingInfo, and CP_SCS combination2 is applied to the other of the subframes #4 and #9; and for FS2, a combination to be applied to subframes specified as an extended MBSFN subframe in the MBSFN-SubframeConfig-ext is determined as follows: CP_SCS combination1 is applied to subframes #0 and #5; and CP_SCS combination3 is applied to one of the subframes #1 and #6, which is specified by CP_SCspacingInfo, and CP_SCS combination2 is applied to the other of the subframes #1 and #6.

Figure 2J:
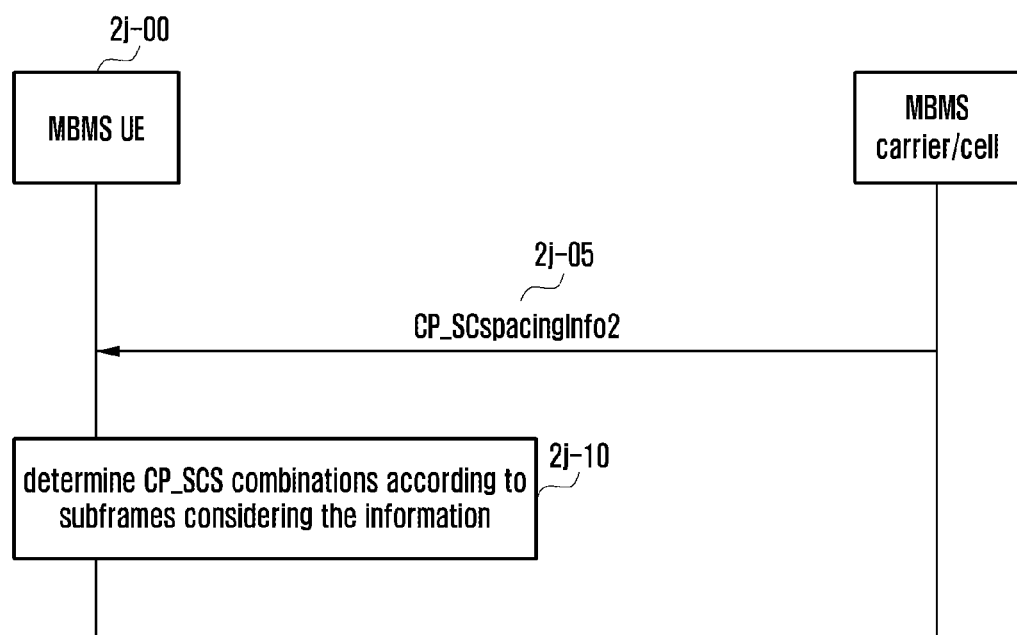
FIG. 2J illustrates a flow diagram of a procedure for determining a combination (CP_SCS combination) of a cyclic prefix length and a sub-carrier based onsubframes of a dedicated carrier according to various embodiments of the present disclosure.

FIG. 2J illustrates a flow diagram of a procedure for determining, when a service that the UE needs to receive is provided via a dedicated carrier, a combination (CP_SCS combination1 of a cyclic prefix length and a sub-carrier according to subframes of a dedicated carrier.

The UE 2j-00 receives CP_SCspacingInfo2 via MCCH or system information (transmission via #0 or #5) of a dedicated carrier in operation 2j-05. The CP_SCspacingInfo2 includes information regarding types of CP_SCS combinations to be applied to subframes. That is, subframes #1, #2, #3, #4, #6, #7, #8, and #9 may use one of the three types of CP_SCS combinations, and subframes #0 and #5 capable of transmitting MIB, SIB, PSS, SSS, etc. may use a preset combination (CP_SCS combination2). The UE applies: CP_SCS combination indicated by CP_SCspacingInfo2 to subframes #1, #2, #3, #4, #6, #7, #8, and #9, considering the CP_SCspacingInfo2; and a preset combination (CP_SCS combination2) to subframes #0 and #5 in operation 2j-10.

Figure 2K:
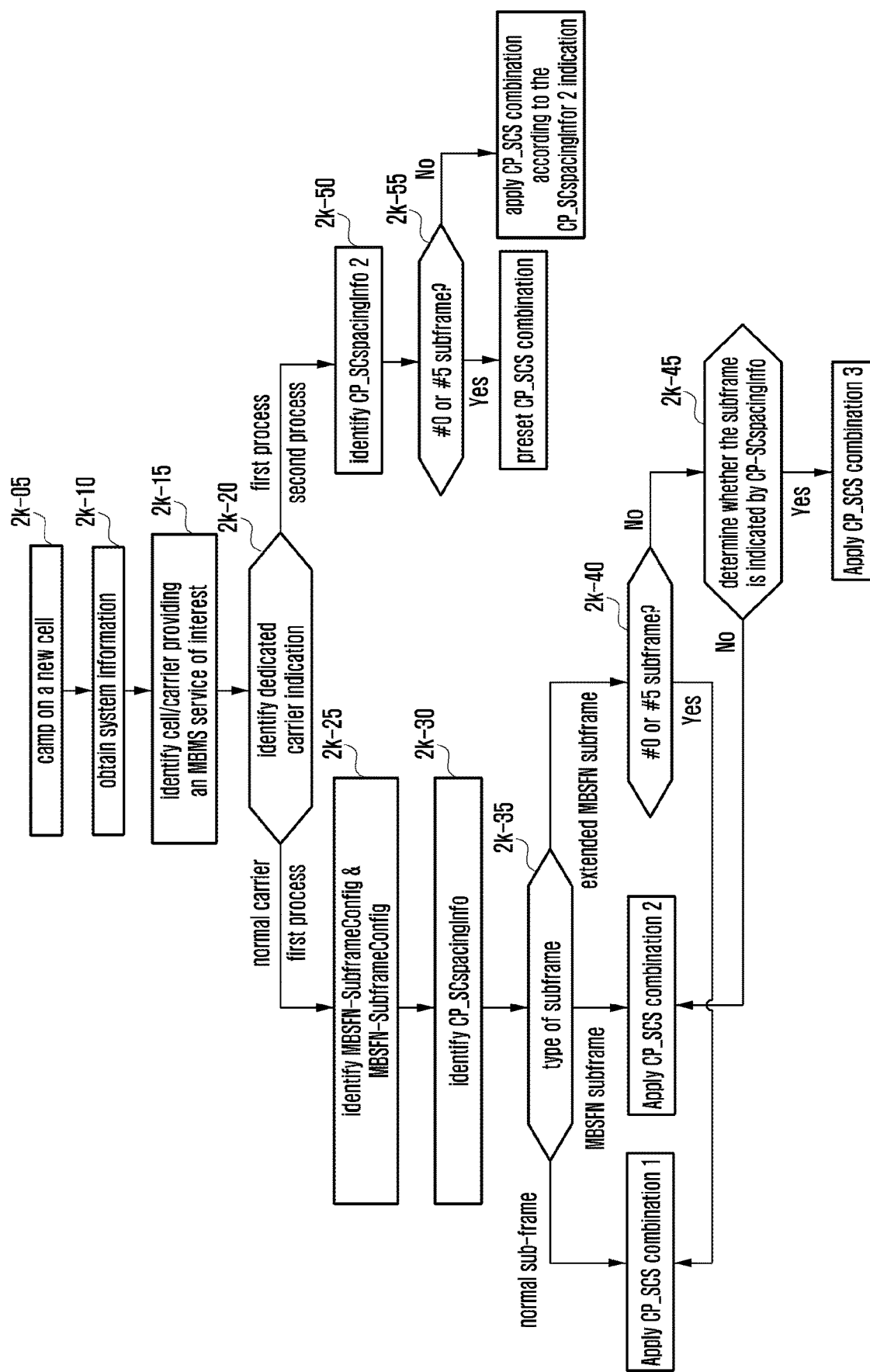
FIG. 2K illustrates a flow diagram of a method for a UE to determine a combination of a cyclic prefix and a sub-carrier spacing by subframes according to various embodiments of the present disclosure.

FIG. 2K illustrates a flow diagram of a method for a UE to determine a combination of a cyclic prefix and a sub-carrier spacing by subframes according to the present disclosure. More specifically, FIG. 2K is a flowchart that describes a procedure for determining a combination by subframes in FDD mode. It should be understood that the procedure may be modified to describe a procedure for determining a combination by subframes in TDD mode.

The UE, which needs to receive an MBMS service, camps on a cell in operation 2k-05. The UE receives necessary system information (scheduling information regarding SIBs, etc.) from an eNB, and receives system information related to a dedicated carrier and a normal carrier via SIB15 in operation 2k-10. The system information may include normal carrier frequency information (dl-carrierFreq) providing an MBMS service and service area Id (SAI) list of a corresponding carrier; and carrier frequency information regarding a dedicated carrier and information regarding a service area Id list of a corresponding dedicated carrier. The system information may also include a dedicated carrier indication (dedicateCarrierIndication) informing that parts of the carriers are a dedicated carrier. The UE has previously identified a service area (SA) which provides a service that the UE needs to receive, and determines whether a service area Id (SAI) of a service area providing a service of interest is a service area Id of a normal carrier or a dedicated carrier in operation 2k-20. If the UE ascertains that a service area Id (SAI) of a service area providing a service of interest is a service area Id of a normal carrier in operation 2k-20, the UE performs a first process to receive an MBMS service via a normal carrier in operation 2k-25. If the UE ascertains that a service area Id (SAI) of a service area providing a service of interest is a service area Id of a dedicated carrier in operation 2k-20, the UE performs a second process to receive an MBMS service via a dedicated carrier in operation 2k-50. When the UE receives a service via a normal carrier, the UE receives MBSFN-SubframeConfig and MBSFN-SubframeConfig-ext via MCCH and system information regarding the normal carrier, and identifies normal subframe, MBSFNsubframe, and extended MBSFNsubframe in operation 2k-25. The UE identifies CP_SCspacingInfo and determines whether the UE uses CP_SCS combination3 in operation 2k-30. The UE determines CP_SCS combination according to types of subframe in operation 2k-35. CP_SCS combination 1 is applied to a normal subframe, and CP_SCS combination 2 is applied to an MBSFN subframe. For an extended MBSFN subframe, CP_SCS combination3 is applied to subframes #4 and #9 if the subframes are indicated by CP_SCspacingInfo, and CP_SCS combination2 is applied to subframes #4 and #9 if the subframes are not indicated by CP_SCspacingInfo, in operation 2k-45. If the UE receives a service via a dedicated carrier, the UE receives and identifies CP_SCspacingInfo2 via MCCH or system information regarding a dedicated carrier in operation 2k-50. The CP_SCspacingInfo2 includes information regarding the application of types of CP_SCS combination to subframes. That is, subframes #1, #2, #3, #4, #6, #7, #8, and #9 may use one of the three types of CP_SCS combinations, and subframes #0 and #5 capable of transmitting MIB, SIB, PSS, SSS, etc. may use a preset combination (CP_SCS combination2). The UE applies: a preset combination (CP_SCS combination2) to subframes #0 and #5; and CP_SCS combinations to the other subframes, according to the indications of CP_SCspacingInfo2, in operation 2k-55.

As described above, the present disclosure: defines combinations of two types of sub-carrier spacing and three cyclic prefix lengths applied to a cell/carrier, as in the table 1; and provides the method, procedure and system which enable the UE to perform a signaling to selectively use CP_SCS combinations by subframes, depending on whether a cell/carrier providing a service to the UE is a normal cell/carrier or a dedicated cell/carrier, as shown in FIGS. 2H, 2I and 2J, thereby supporting the demand increasing in MBMS service and thus the enlarged MBMS service area.

Figure 2L:
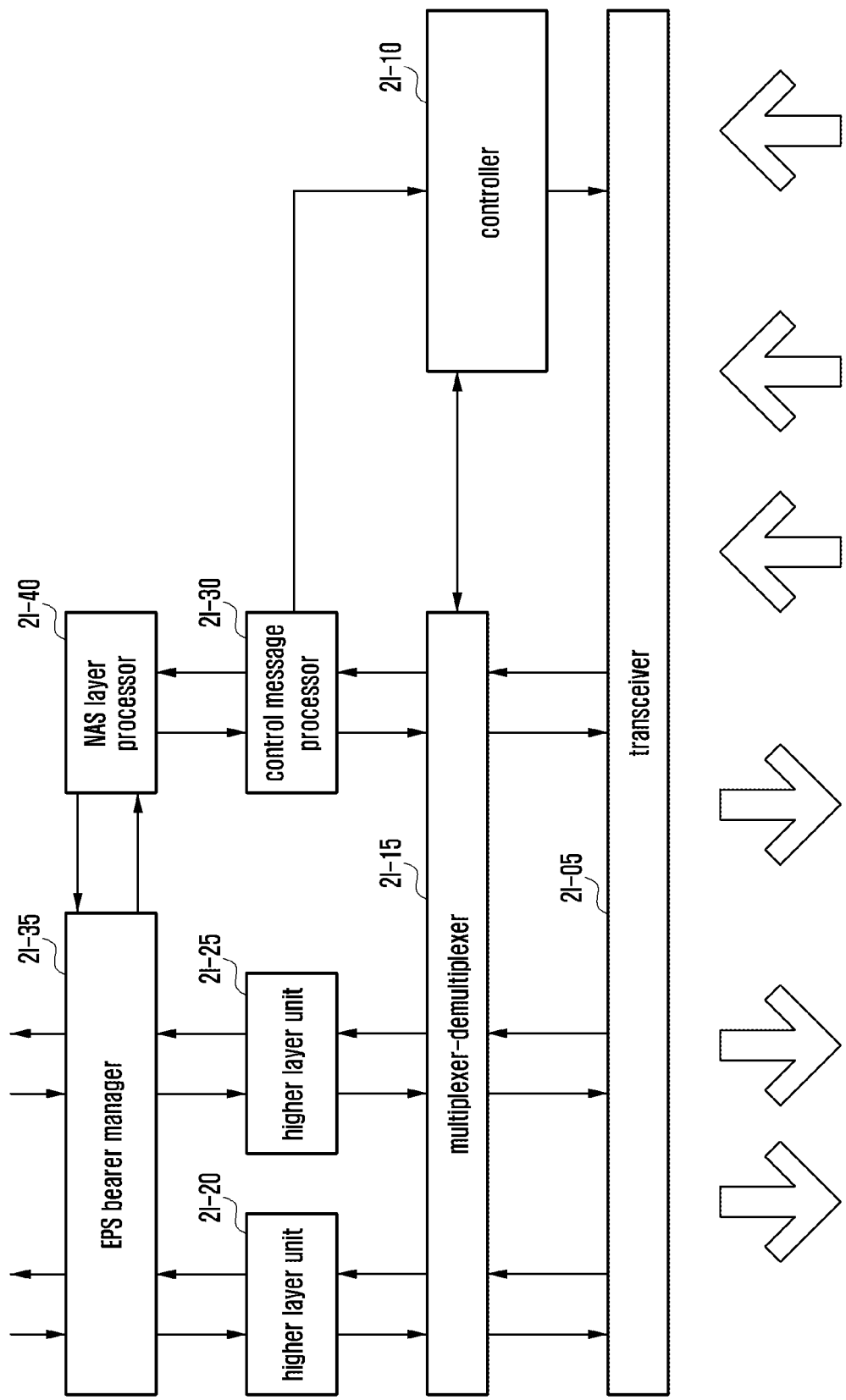
FIG. 2L illustrates an example UE according to various embodiments of the present disclosure.

With reference to FIG. 2L, the UE according to embodiment of the present disclosure includes a transceiver 2l-05, a controller 2l-10, a multiplexer-demultiplexer 2l-15, a control message processor 2l-30, various higher layer processors 2l-20 and 2l-25, an EPS bearer manager 2l-35 and an NAS layer processor 2l-40.

The transceiver 2l-05 receives data and preset control signals via a forward channel of a serving cell, and transmits data and preset control signals via a reverse channel. If a number of serving cells are configured, the transceiver 2l-05 transmits/receives data and controls signals to/from the serving cells.

The multiplexer-demultiplexer 2l-15: multiplexes data, created in the higher layer processors 2l-20 and 2l-25 or the control message processor 2l-30; or demultiplexes data received from the transceiver 2l-05, and transfers the result to the corresponding higher layer processor 2l-20 or 2l-25 or the control message processor 2l-30.

The control message processor 2l-30 serves as an RRC layer unit which processes control messages received from an eNB and performs a corresponding operation. For example, if the control message processor 2l-30 receives a message, RRC CONNECTION SETUP, the control message processor 2l-30 establishes a temporary DRB with an SRB.

The higher layer processors 2l-20 and 2l-25 are referred to as a DRB device, and may be configured according to types of services. The higher layer processors 2l-20 and 2l-25 process data, crated by user services, such as file transfer protocol (FTP) or voice over internet protocol (VoIP), etc., and transfer the result to the multiplexer-demultiplexer 2l-15. The higher layer processors 2l-20 and 2l-25 process data transferred from the multiplexer-demultiplexer 2l-15, and transfer the result to higher layer service applications. One service may have a one-to-one mapping with one EPS bearer and one higher layer processor.

The controller 2l-10 identifies scheduling commands received via the transceiver 2l-05, e.g., reverse grants, and controls the transceiver 2l-05 and the multiplexer-demultiplexer 2l-15 to perform the reverse transmission via a corresponding transmission resource at an appropriate timing.

Figure 2M:
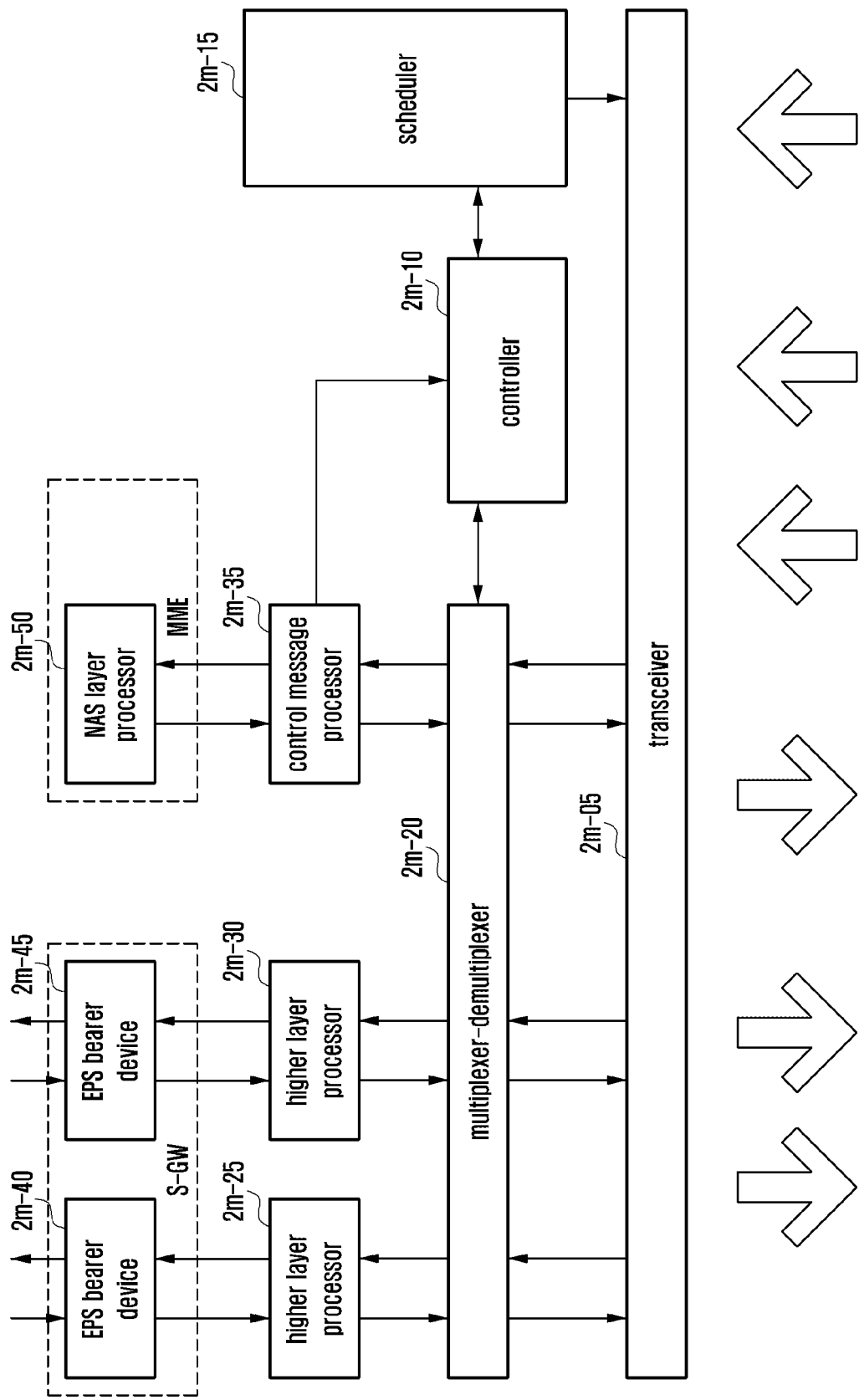
FIG. 2M illustrates an example eNB, an MME and an S-GW according to various embodiments of the present disclosure.

FIG. 2M illustrates an exampleeNB, an MME and an S-GW according to an embodiment of the present disclosure.

As shown in FIG. 2M, the eNB includes a transceiver 2m-05, a controller 2m-10, a multiplexer-demultiplexer 2m-20, a control message processor 2m-35, various higher layer processors 2m-25 and 2m-30, a scheduler 2m-15, and EPS bearer devices 2m-40 and 2m-45, and an NAS layer processor 2m-50. The EPS bearer devices are located in an S-GW, and the NAS layer processor is located in an MME.

The transceiver 2m-05 transmits data and a preset control signal via a forward carrier, and receives data and a preset control signal via a reverse carrier. If a number of carriers are configured, the transceiver 2m-05 performs the transmission/reception of data and controls signals via the carriers.

The multiplexer-demultiplexer 2m-20: multiplexes data, created in the higher layer processors 2m-25 and 2m-30 or the control message processor 2m-35; or demultiplexes data received from the transceiver 2m-05, and transfers the result to the higher layer processors 2m-25 and 2m-30, the control message processor 2m-35, or the controller 2m-10. The control message processor 2m-35 processes a control message transmitted from the UE, and performs a corresponding operation. The control message processor 2m-35 creates control messages to be transmitted to the UE, and transfers the messages to lower layers.

The higher layer processors 2m-25 and 2m-30 may be configured according to EPS bearers. The higher layer processors 2m-25 and 2m-30 configure data transferred from the EPS bearer devices into RLC PDUs and transfers the RLC PDUs to the multiplexer-demultiplexer 2m-20. The higher layer processors 2m-25 and 2m-30 also configure RLC PDUs transferred from the multiplexer-demultiplexer 2m-20 into PDCP SDUs, and transfer the PDCP SDUs to the EPS bearer devices.

The scheduler allocates a transmission resource to the UE at an appropriate timing point, considering the state of the UE, such as a buffer state, a channel state, etc., thereby enabling the transceiver to: process signals received from the UE; or transmit signals to the UE.

The EPS bearer device is configured according to EPS bearers. The EPS bearer device processes data transferred from higher layer processors and transmits the result to the next network node.

The higher layer processor and the EPS bearer device are connected to each other via an S1-U bearer. The higher layer processor corresponding to a common DRB is connected to an EPS bearer for the common DRB via a common S1-U bearer.

The NAS layer processor processes an IP packet included in an NAS message, and transmits the result to the S-GW.

As described above, the present disclosure: defines combinations of two types of sub-carrier spacing and three cyclic prefix lengths applied to a cell/carrier; and provides the method, procedure and system which enable the UE to perform a signaling to selectively use the defined combinations, according to subframes, depending on whether a cell/carrier providing a service to the UE is a normal cell/carrier or a dedicated cell/carrier, thereby supporting the demand increasing in MBMS service and thus the enlarged MBMS service area.

The present disclosure provides a method and apparatus for enabling a number of service providers to share MBMS services with each other so that a UE receives MBMS services via another service provider's network in a mobile communication system. The present disclosure defines a procedure and information that a UE needs to receive MBMS services via another service provider's network in a mobile communication system.

In the following description, an operation principle of embodiments of the disclosure is described in detail with reference to the accompanying drawings. Detailed descriptions of well-known functions and structures incorporated herein may be omitted to avoid obscuring the subject matter of the disclosure. The following terms are defined considering functions of the disclosure, and may be changed by users or operators according to their needs. Therefore, the terms will be defined throughout the content of this description.

In the following description, terms used to identify an access node, terms referred to as network entities, terms expressing messages, terms representing interfaces between network objects, terms used for various types of identification information, etc. are used for the sake of convenient description. Therefore, the present disclosure is not limited by the terms and may use other terms with the meanings equivalent to the terms described in the present disclosure, representing the corresponding components.

For the sake of convenient description, the present disclosure uses terms and names defined in the specifications of the 3rd generation partnership project long term evolution (3GPP LTE). However, it should be understood that the present disclosure is not limited to the terms and names and may also be applied to systems following the other standards.

The present disclosure provides a method and apparatus that enables a number of service providers to share MBMS services with each other so that a UE can receive MBMS services via another service provider's network in a mobile communication system.

With the variety of types and purposes of MBMS services, it may be preferable that different service providers need to share the same MBMS service with each other. For example, it is assumed that an MBMS service related to a game being held in a sports stadium is provided to spectators. The spectators in the sports stadium may be users who use services provided by various service providers. While the spectators are viewing the sports game in the stadium, the spectators may be likely to demand the same MBMS content. In this case, it is preferable that one service provider provides the MBMS service rather than all the service providers provide the same MBMS service, so that subscribers to the service provider and subscribers to the other service providers receive the MBMS service provided by the service provider.

The present disclosure provides information regarding a carrier capable of receiving MBMS services and information regarding a service provider of the carrier, via common information (e.g., system information) transmitted to a number of UEs, in order to enable service providers to share MBMS services with each other, so that a UE receives an MBMS service considering the common information. In this case, the UE performs the reception operations that differ from each other depending on a condition as to whether a carrier providing the MBMS service is provided by a service provider that has been registered or has not been registered. More specifically, the UE receives, from a network, a request related to the reception of an MBMS service, and responds to the request with different operations depending on a condition as to whether a corresponding MBMS service is provided by a service provider that has been registered or has not been registered.

In the following description, a service provider which has been registered is referred to as a registered/registration service provider; a PLMN which has been registered is referred to as a registered/registration PLMN; a service provider which has not been registered is referred to as a not-registered/non-registration service provider; and a PLMN which has not been registered is referred to as a not-registered/non-registration PLMN.

The registered/registration service provider or registered/registration PLMN is referred to as a PLMN on which the UE has performed an ATTACH process or a PLMN on which location registration has been successfully performed. The registered/registration service provider or registered/registration PLMN is also called a registered PLMN or selected PLMN. This is the PLMN on which certain Location Registration outcomes have occurred. Details follow the specification 36.304 and 23.122. The not-registered/non-registration service provider or not-registered/non-registration PLMN is referred to as the remaining PLMNs except for the registered PLMN. In the present disclosure, considering locations of the UE, the not-registered/non-registration service provider or not-registered/non-registration PLMN is also referred to as the remaining PLMNs, except for the registered PLMN, among the PLMNs providing the MBMS-related signal strength/quality which is sufficient for the UE to receive an MBMS service of interest.

Figure 3A:
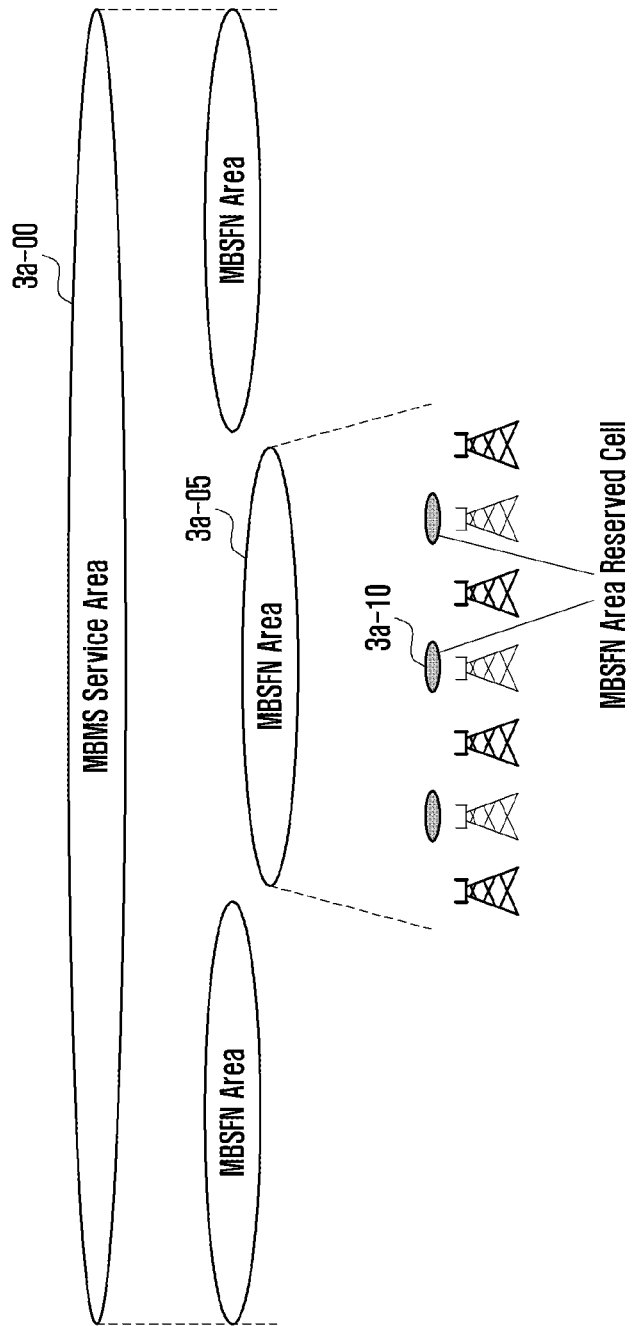
FIG. 3A illustrates an example MBMS according to various embodiments of the present disclosure.

FIG. 3A illustrates an example MBMS according to the present disclosure.

MBMS service area 3a-00 is a network area including a number of eNBs capable of preforming the transmission of multimedia broadcast multicast service single frequency network (MBSFN). MBSFN Area 3a-05 is a network area configured with a number of cells integrated for the MBSFN transmission. The cells in the MBSFN area are all synchronized for the MBSFN transmission. All the cells except for MBSFN Area Reserved Cells 3a-10 are used for the MBSFN transmission. MBSFN area reserved Cells 3a-10 are referred to as cells which are not used for the MBSFN transmission. MBSFN area reserved Cells 3a-10 may be used for the transmission for other objectives; however, MBSFN area reserved Cells 3a-10 may be allowed for limited transmission power for radio resources assigned to perform the MBSFN transmission.

Figure 3B:
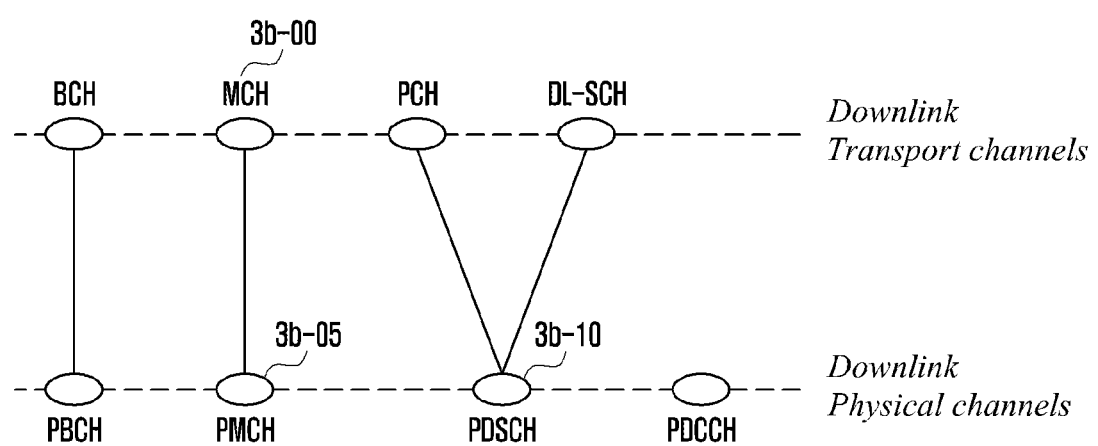
FIG. 3B illustrates an example mapping relationship of downlink channels used for the MBSFN transmission according to various embodiments of the present disclosure.

FIG. 3B illustrates an example mapping relationship of downlink channels used for the MBSFN transmission.

As shown in FIG. 3B, MCH 3b-00 is used between an MAC layer and a physical layer. MCH is mapped to PMCH 3b-05 of a physical layer. In general, unicast scheme transmitting data to only a specific the UE uses physical downlink shared channel (PDSCH) 3b-10.

Figure 3C:
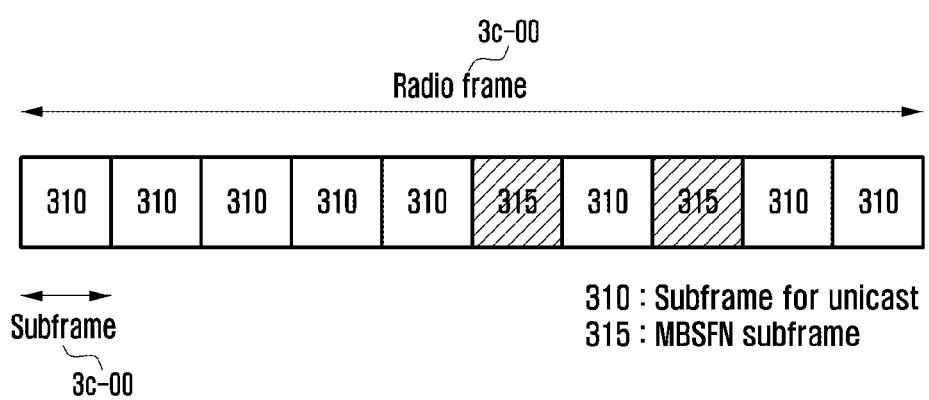
FIG. 3C illustrates an example structure of a downlink frame used in LTE systems according to various embodiments of the present disclosure.

FIG. 3C illustrates an example structure of a downlink frame used in LTE systems.

As shown in FIG. 3C, a radio frame 3c-00 includes 10 subframes 3c-05. Each subframe may be a 'normal subframe 3c-10' used for the transmission/reception of general data or 'MBSFN subframe 3c-15' used for broadcasts. Normal subframe and MBSFN subframe differ from each other, in terms of number and structure, with respect to orthogonal frequency division multiplexing (OFDM) symbols, cyclic prefix (CP) length, cell-specific reference signals (CRS), etc.

In order to perform the transmission/reception of unicast data in an LTE system, physical downlink control channel (PDCCH) informs the system of a location where data is actually transmitted/received. Actual data is transmitted via PDSCH. Before a UE receives real data, the UE needs to determine whether the PDCCH has information regarding a resource assigned to the UE. On the other hand, MBSFN obtains resource assignment information via a relatively more complicated process. An eNB informs a UE of transmission locations of multicast control channels (MCCHs) by MBSFN Areas provided by a cell, via system information block 13 (SIB13) as broadcast information. MCCH contains resource assignment information for MBSFN. The UE decodes MCCH, and thus detects a transmission location of MBSFN subframes.

As described above, MBMS provides resource assignment information via a mode that differs from a conventional unicast, and this is because MBMS can be provided to the UE in an idle mode. Therefore, the transmission location of MCCH as a control channel is provided via SIB13 as broadcast information. The reception of MBMS service is explained, below, with reference to FIG. 3D.

Figure 3D:
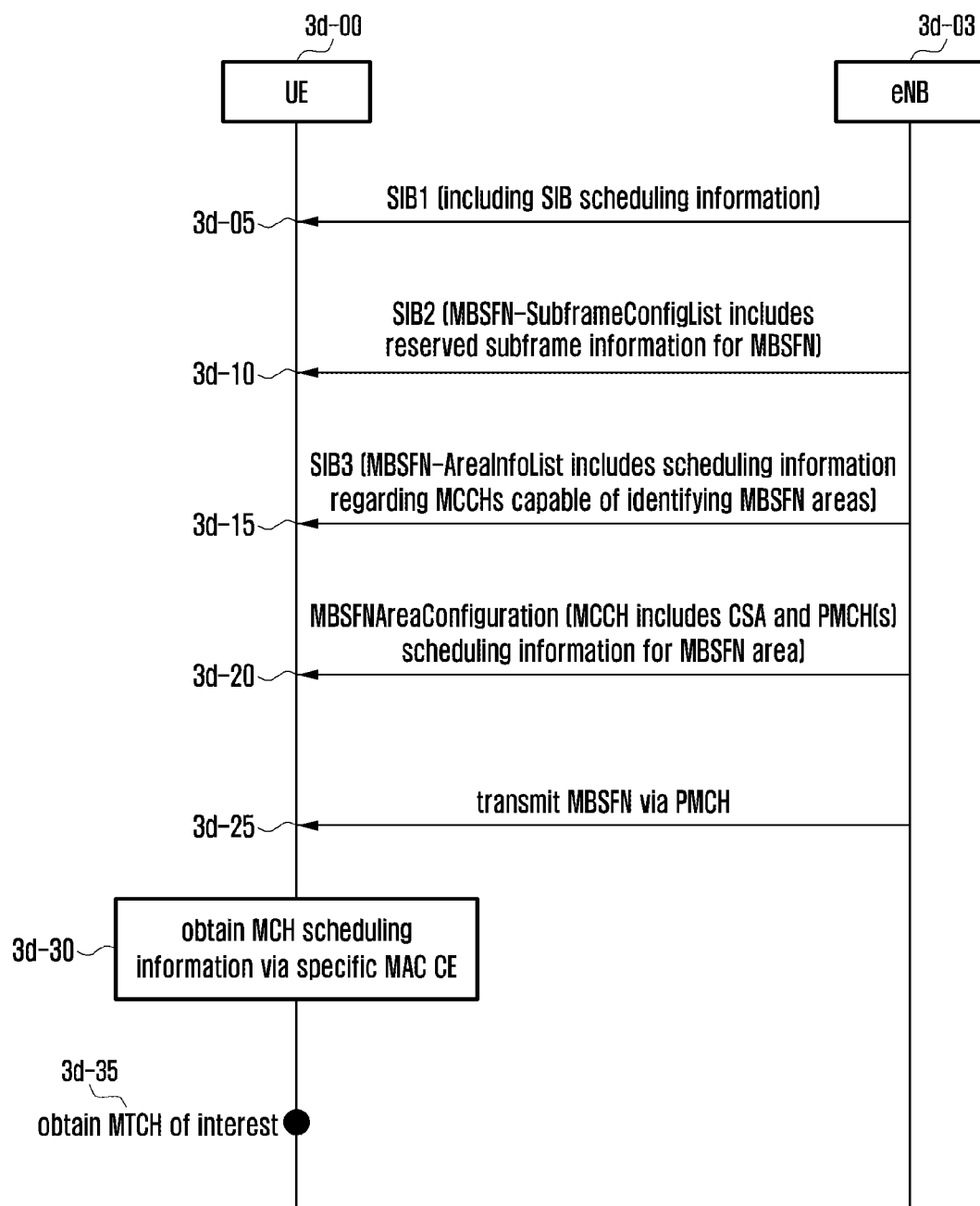
FIG. 3D illustrates a flow diagram of a method for a UE to receive MBSFN according to various embodiments of the present disclosure.

FIG. 3D illustrates a flow diagram of a method for a UE to receive MBSFN.

The UE 3d-00 receives SIB1 from the eNB 3d-03 in operation 3d-05. The SIB1 includes scheduling information regarding other SIBs. Therefore, in order to receive other SIBs, SIB1 needs to have been received previously. The UE 3d-00 receives SIB2 from the eNB 3d-03 in operation 3d-10. An MBSFN subframe configuration list of SIB2 (MBSFN-SubframeConfigList Information Element (IE)) indicates subframes which can be used for MBSFN transmission. The MBSFN-SubframeConfigList IE includes MBSFN-SubframeConfig IE and indicates a subframe of a radio frame which can be an MBSFN subframe. If the UE 3d-00 needs to receive MBSFN, the UE 3d-00 receives SIB13 from the eNB 3d-03 in operation 3d-15. MBSFN area information list of SIB13 (MBSFN-AreaInfoList IE) includes location information regarding the transmission of MCCHs by MBSFN areas, provided by a cell. The UE 3d-00 receives MCCH, using the information received as in operation 3d-15, in operation 3d-20. MBSFN area configuration (MBSFNAreaConfiguration) IE of MCCH indicates a location of a resource used for MBSFN transmission, and the UE 3d-00 receives an MBSFN subframe using the information in operation 3d-25. The UE obtains a location of an MBSFN subframe, transmitting an MTCH of interest, from MCH scheduling information (MSI) as one of the MAC control elements (MAC CEs) of received MAC PDU in operation 3d-30. The UE decodes an MTCH of interest, using MSI, in operation 3d-35.

Figure 3E:
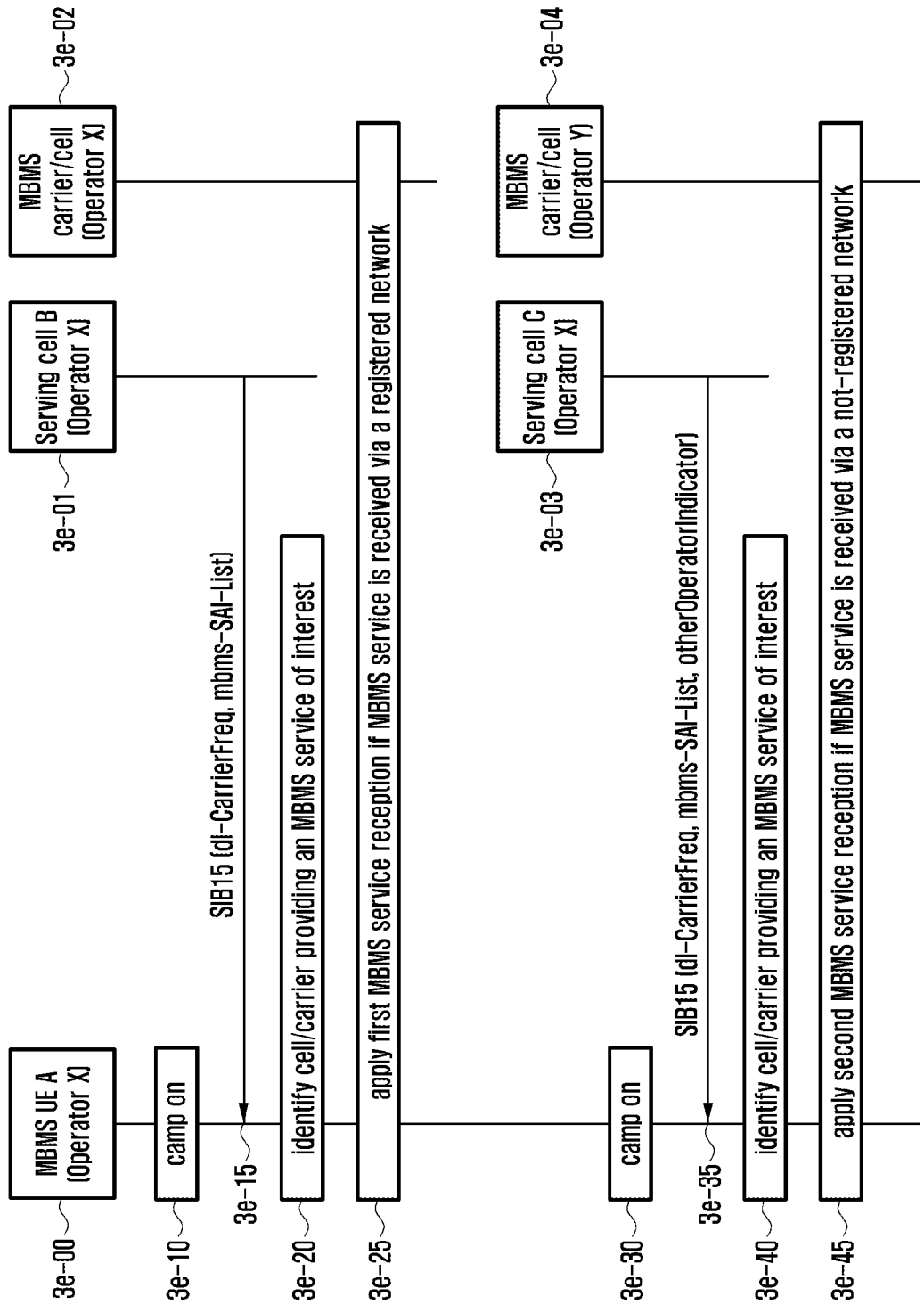
FIG. 3E illustrates a flow diagram of a method for a UE to receive an MBMS service from a registration service provider and another service provider according to various embodiments of the present disclosure.

FIG. 3E illustrates a flow diagram of a method for a UE to receive an MBMS service from a registration service provider and another service provider according to the present disclosure.

The UE A 3e-00, which needs to receive an MBMS service, camps on a cell 3e-01 or 3e-03 of registered service provider X (which is also called a public land mobile network (PLMN), a service provider, and an operator) in operation 3e-10 or 3e-30; receives SIB15 from a corresponding serving cell 3e-01 or 3e-03 in operations 3e-15 and 3e-35; and obtains the following information:

Frequency information (dl-CarrierFreq) regarding a carrier providing an MBMS service, and Service Area Identities (SAI) list of a corresponding carrier;

Information regarding a condition as to whether each of carriers is a carrier and of a registered service provider where a UE is currently registered. For example, an MBMS carrier that of a service provider, which is not a service provider of a cell that provides system information, is signaled by a separate 1-bit indication, or also along with an PLMN identifier.

A UE may have previously identified a service area (SA) which provides an MBMS service that the UE needs to receive. The UE identifies a cell 3e-02 or 3e-04 and a carrier providing an MBMS service of interest in operations 3e-20 and 3e-40. If the UE ascertains that a carrier whose SAI is identical to that of an MBMS service that the UE needs to receive is a carrier of a currently registered service provider, the UE uses a first MBMS service reception of receiving an MBMS service via a registered PLMN in operations 3e-25. If the UE ascertains that a carrier whose SAI is identical to that of an MBMS service that the UE needs to receive is not a carrier of a currently registered service provider, the UE uses a second MBMS service reception of receiving an MBMS service via a not-registered PLMN in operations 3e-45.

Figure 3F:
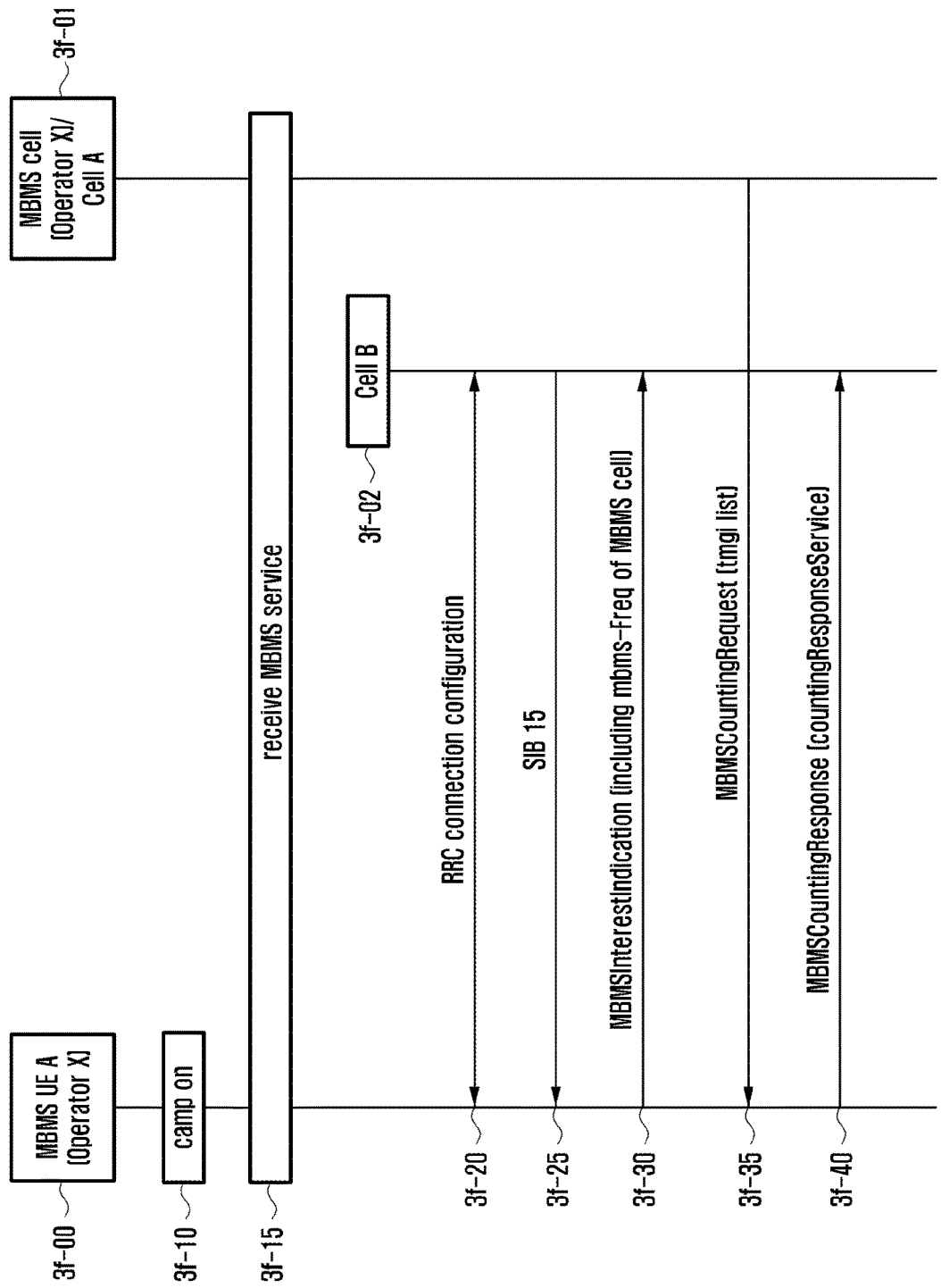
FIG. 3F illustrates a flowchart of a first MBMS service reception of receiving an MBMS service via a registered PLMN according to various embodiments of the present disclosure.

FIG. 3F illustrates a flowchart of a first MBMS service reception of receiving an MBMS service via a registered PLMN.

The UE A needs to receive an MBMS service in operation 3*f*-00. The UE A camps on a cell of a registered service provider in operation 3*f*-10. The UE receives an MBMS service from a cell A (3*f*-01) of a registered service provider in operation 3*f*-15. The UE 3*f*-00 in reception of an MBMS service may configure an RRC connection in cell B (3*f*-02) based on a reason in operation 3*f*-20. In this case, cell A (3*f*-01) and cell B (3*f*-02) may be identical to each other. The UE 3*f*-00 determines whether cell B (3*f*-02) is broadcasting SIB15 in operation 3*f*-25. If the UE 3*f*-00 ascertains that cell B (3*f*-02) is broadcasting SIB15 in operation 3*f*-25, the UE 3*f*-00 performs the transmission of a control message, MBMSInterestIndication, in operation 3*f*-30. The message includes the following information: carrier frequency information (downlink carrier frequency information) regarding an MBMS service that the UE currently receives; and information indicating priority of an MBMS service and an unicast data service The MBMSInterestIndication is used to guarantee that a UE receives an MBMS service without error, when an eNB performs radio resource management (RRM) for the UE. For example, an eNB may not hand over the UE in reception of an MBMS service from a corresponding carrier to another frequency.

MBMS services via MBSFN are transmitted by a number of cells via MBSFN subframes, and this may consume a great large amount of radio resources. Therefore, it is preferable to use MBSFN only if the number of the UE receiving a corresponding MBMS service is greater than or equal to a preset value. In order to determine whether MBSFN needs to be used, an eNB may transmit a control message, MBMSCountingRequest, via MCCH, with respect to an MBMS service that the eNB may provide and is currently providing. If the UE 3*f*-00 receives MBMSCountingRequest as a counting request for an MBMS service that the UE 3*f*-00 is currently receiving or may receive in operation 3*f*-35, the UE 3*f*-00 transmits a message, MBMSCountingResponse, to an RRC-connected cell B (3*f*-02) in operation 3*f*-40. The messages, MBMSCountingRequest and MBMSCountingResponse, include temporary mobile group identity (TMGI) as an identifier for a corresponding MBMS service.

FIG. 3G illustrates a flowchart of a second MBMS service reception of receiving an MBMS service via a not-registered PLMN.

The UE A needs to receive an MBMS service in operation 3*g*-00. The UE A camps on a cell of a registered service provider in operation 39-10. The UE receives an MBMS service from a cell A (3*g*-01) of a not-registered service provider in operation 3*g*-15. The UE 3*g*-00 in reception of an MBMS service may configure an RRC connection in cell B (3*g*-02) based on a reason in operation 3*g*-20. In this case, cell A (3*g*-01) and cell B (3*g*-02) may differ from each other. The UE 3*g*-00 determines whether cell B (3*g*-02) is broadcasting SIB15 in operation 3*g*-25. If the UE 3*g*-00 ascertains that cell B (3*g*-02) is broadcasting SIB15 in operation 3*g*-25, the UE 3*g*-00 performs the transmission of a control message, MBMSInterestIndication, in operation 3*g*-30. The message includes the following information: carrier frequency information (downlink carrier frequency information) regarding an MBMS service that the UE currently receives; information indicating priority of an MBMS service and an unicast data service; and PLMN identifier of a carrier that is currently receiving an MBMS service.

The MBMSInterestIndication is used to guarantee that an eNB performs appropriate Radio Resource Management (RRM) for a UE. For example, an eNB may not hand over the UE in reception of an MBMS service from a corresponding carrier to another frequency.

If the UE 3*g*-00 receives MBMSCountingRequest as a counting request for an MBMS service that the UE 3*g*-00 is currently receiving or will receive in operation 3*g*-35, the UE 3*g*-00 checks whether a carrier that is currently receiving an MBMS service is a carrier of a registered PLMN or a not-registered PLMN in operation 3*g*-40. If the UE is receiving an MBMS service from a registered PLMN and in a connection state, the UE 3*g*-00 transmits a message, MBMSCountingResponse. If the UE is receiving an MBMS service from a registered PLMN but is not in an RRC connection state, or is receiving a service from a nor-registered PLMN, the UE ignores the message, MBMSCountingRequest, and does not transmit a message, MBMSCountingResponse. The messages, MBMSCountingRequest and MBMSCountingResponse, include temporary mobile group identity (TMGI) as an identifier for a corresponding MBMS service.

Figure 3H:
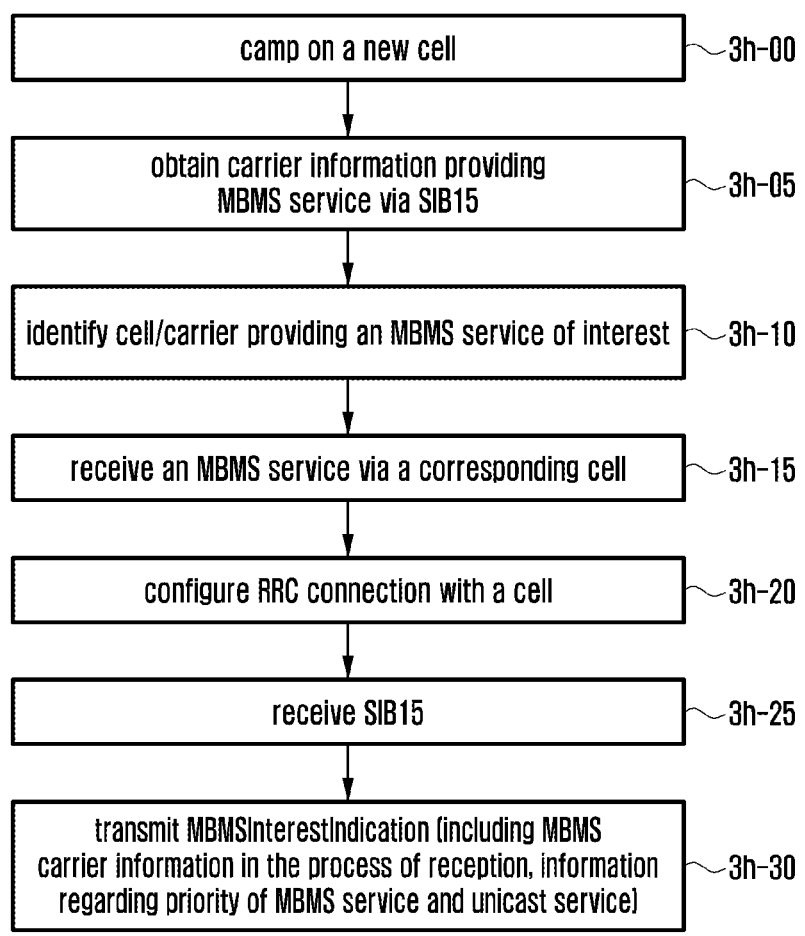
FIG. 3H illustrates a flowchart of a method for a UE to receive an MBMS service from a registered PLMN or a not-registered PLMN according to various embodiments of the present disclosure.

FIG. 3H illustrates a flowchart of a method for a UE to receive an MBMS service from a registered PLMN or a not-registered PLMN, according to the present disclosure.

A UE, which needs to receive an MBMS service, camps on a cell in operation 3*h*-00. The UE receives an SAI list of a corresponding carrier and information regarding a carrier frequency providing an MBMS service via SIB15 as system information provided by a corresponding cell in operation 3*h*-05. The SIB15 includes information regarding a condition as to whether carriers are carriers of corresponding service providers respectively. For example, an MBMS carrier of a service provider, which is not a service provider of a cell providing system information, is signaled by a 1-bit indication, or signaled along with a PLMN identifier. The UE identifies a carrier and cell providing an MBMS service of interest, referring to information regarding the received SIB15 in operation 3*h*-10. The UE may have previously identified a Service Area (SA) which provides a service that the UE needs to receive. The UE performs different types of MBMS service reception according to a condition as to whether a carrier whose SAI is identical to that of an MBMS service that the UE needs to receive is a carrier of a registered service provider. The MBMS services are received from a registered PLMN and a not-registered PLMN by the following operations which are commonly performed, called common operations. An MBMS service is received via a selected carrier and cell in operation 3*h*-15. The detailed operations are performed by the procedure shown in FIG. 3D. The UE in reception of an MBMS service from a cell configures an RRC connection in a based on a reason in operation 3*h*-20. The UE determines whether a cell is broadcasting SIB15 in operation 3*h*-25. The UE ascertains that a cell is broadcasting SIB15, the UE receives SIB15. The UE may receive SIB15 before the UE configures the RRC connection. The UE performs the transmission of a control message, MBMSInterestIndication in operation 3*h*-30. The message includes the following information: carrier frequency information (downlink carrier frequency information) regarding an MBMS service that the UE currently receives; information indicating priority of an MBMS service and an unicast data service; and PLMN identifier of a carrier that is currently receiving an MBMS service or information indicating that an MBMS service is received via a not-registered PLMN.

If any one of the MBMS services of a not-registered PLMN exists on a list of MBMS services that the UE is receiving or has interest in receiving, the last information described above is included in the message. If all the MBMS services are MBMS services of a registered PLMN, the last information described above is not included in the message.

The MBMSInterestIndication is used to guarantee that the UE receives an MBMS service without error, when an eNB performs RRM for the UE. For example, an eNB may not hand over the UE in reception of an MBMS service from a corresponding carrier to another frequency.

Figure 3I:
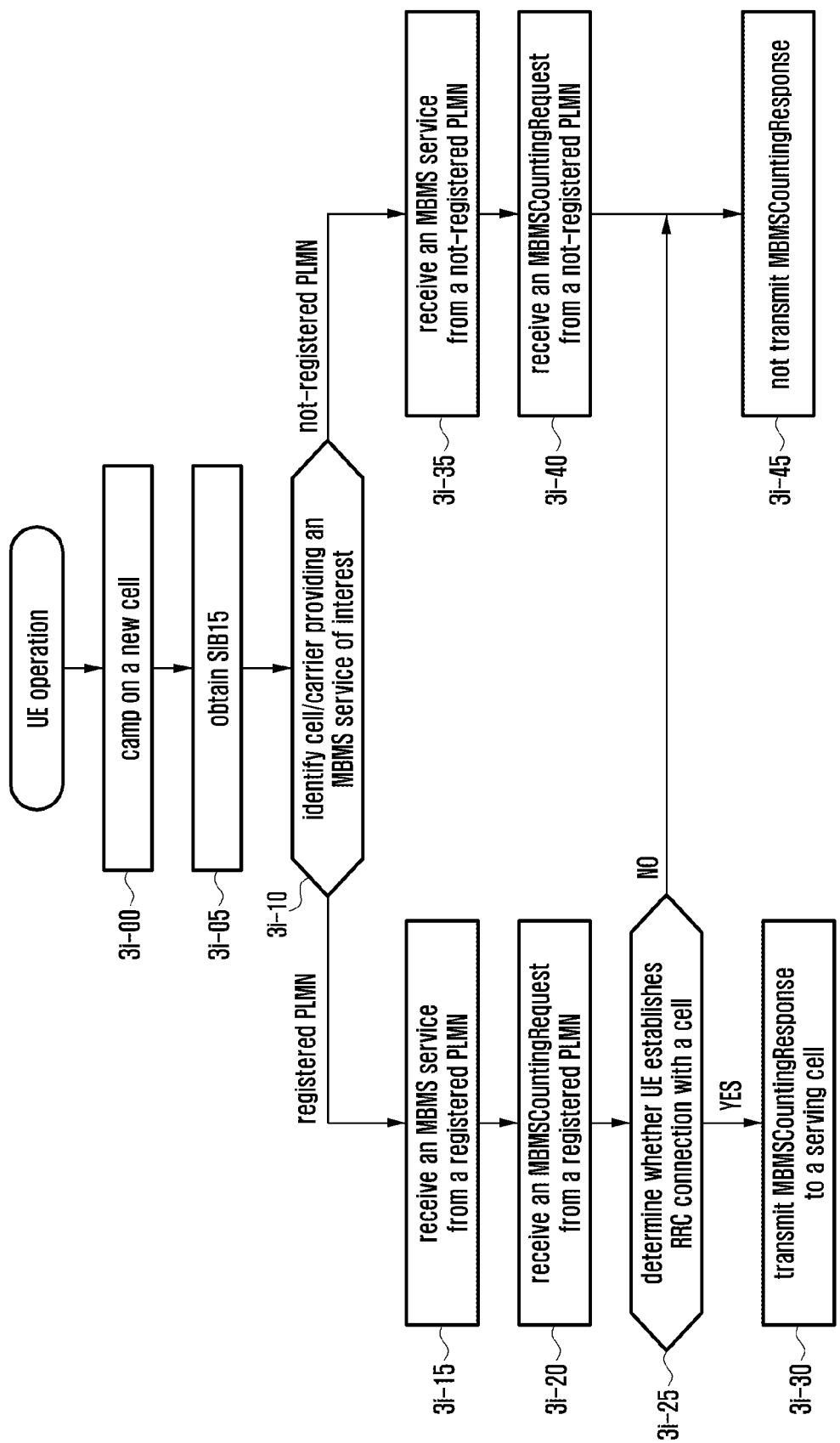
FIG. 3I illustrates a flowchart that describes operations of a UE when receiving a counting request while receiving an MBMS service according to various embodiments of the present disclosure.

FIG. 3I illustrates a flowchart of a UE operation when receiving a counting request while receiving an MBMS service according to the present disclosure.

A UE, which needs to receive an MBMS service, camps on a cell in operation 3$i$-00. The UE receives an SAI list of a corresponding carrier and information regarding a carrier frequency providing an MBMS service via SIB15 as system information provided by a corresponding cell in operation 3$i$-05. The SIB15 includes information regarding a condition as to whether carriers are carriers of corresponding service providers respectively. For example, an MBMS carrier of a service provider, which is not a service provider of a cell providing system information, is signaled by a 1-bit indication, or signaled along with a PLMN identifier. The UE identifies a carrier and cell providing an MBMS service of interest, referring to information regarding the received SIB15 in operation 3$i$-10. The UE may have previously identified a service area (SA) which provides a service that the UE needs to receive. The UE performs different types of MBMS service reception according to a condition as to whether a carrier whose SAI is identical to that of an MBMS service that the UE needs to receive is a carrier of a registered service provider. If the UE ascertains that a service provider providing an MBMS service of interest is a registered PLMN, the UE performs a first MBMS service reception. That is, the UE receives an MBMS service from a registered PLMN cell in operation 3$i$-15. Detailed operations of operation 3$i$-15 are performed by the procedure shown in FIG. 3H. The UE receives a message, MBMSCountingRequest, for an MBMS service that the UE is receiving or will receive, in operation 3$i$-20. The control message is transmitted via MCCH. An eNB uses the control message to determine whether MBSFN is used and to manage a radio resource of an MBMS service that the eNB may perform or is currently performing. If the UE establishes RRC connection with a cell in operation 3$i$-25, it transmits a message, MBMSCountingResponse, to a serving cell in operation 3$i$-30. However, if the UE does not establish RRC connection with a cell in operation 3$i$-25, the UE does not transmit a message, MBMSCountingResponse in operation 3$i$-45.

If a service provider providing an MBMS service of interest is a not-registered PLMN, the UE performs a second MBMS service reception. The UE receives an MBMS service from a not-registered PLMN cell in operation 3$i$-35. The UE receives a message, MBMSCountingRequest, for an MBMS service that the UE is receiving or will receive, from a not-registered PLMN cell in operation 3$i$-40. In the second MBMS service reception, The UE does not transmit a message, MBMSCountingResponse, regardless of the reception of an MBMSCountingRequest, in operation 3$i$-45.

If the UE receives MBMSCountingRequest as a counting request for an MBMS service that the UE is currently receiving or will receive, the UE checks whether a carrier that is currently receiving an MBMS service is a carrier of a registered PLMN or a not-registered PLMN. If the UE is receiving an MBMS service from a registered PLMN and in a connection state, the UEtransmits a message, MBMSCountingResponse. If the UE is receiving an MBMS service from a registered PLMN but is not in an RRC connection state, or is receiving a service from a not-registered PLMN, the UEignores the message, MBMSCountingRequest, and does not transmit a message, MBMSCountingResponse. The messages, MBMSCountingRequest and MBMSCountingResponse, include Temporary Mobile Group Identity (TMGI) as an identifier for a corresponding MBMS service.

Figure 3J:
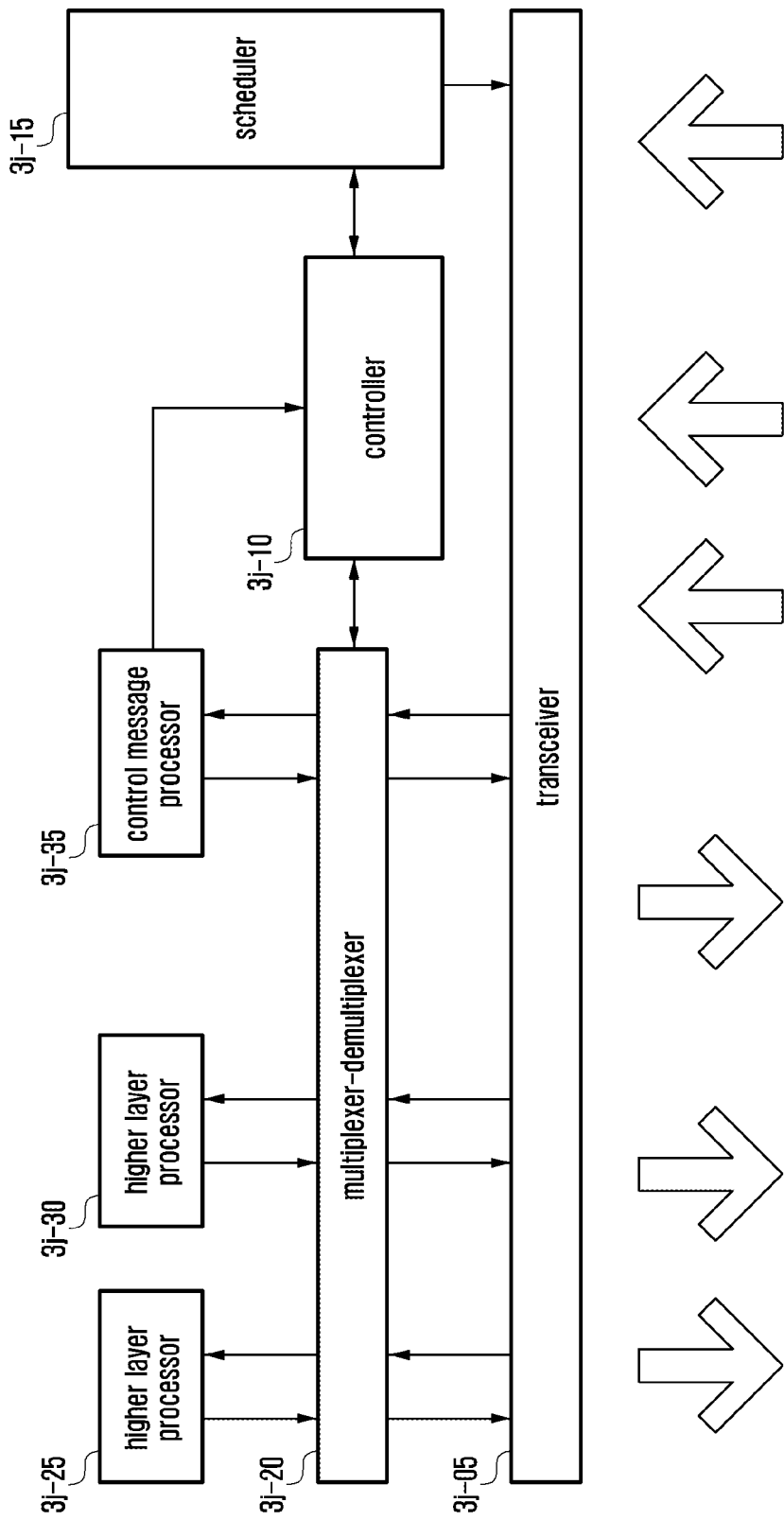
FIG. 3J illustrates an example eNB according to various embodiments of the present disclosure.

FIG. 3J illustrates an example eNB according to an embodiment of the present disclosure.

As shown in FIG. 3J, an eNB according to the present disclosure includes a transceiver 3$j$-05, a controller 3$j$-10, a multiplexer-demultiplexer 3$j$-20, a control message processor 3$j$-35, various higher layer processors 3$j$-25 and 3$j$-30, and a scheduler 3$j$-15. The transceiver 3$j$-05 transmits data and a preset control signal via a forward carrier, and receives data and a preset control signal via a reverse carrier. If a number of carriers are configured, the transceiver 3$j$-05 performs the transmission/reception of data and control signals via the carriers. The multiplexer-demultiplexer 3$j$-20: multiplexes data, created in the higher layer processors 3$j$-25 and 3$j$-30 or the control message processor 3$j$-35; or demultiplexes data received from the transceiver 3$j$-05, and transfers the result to the higher layer processors 3$j$-25 and 3$j$-30, the control message processor 3$j$-35, or the controller 3$j$-10. The control message processor 3$j$-35: processes a control message, such as MBMSInterestIndication, MBMSCountingResponse, etc., transmitted from the UE; and performs a corresponding operation. The control message processor 3$j$-35 creates control messages to be transmitted to the UE and transfers the messages to lower layers. The higher layer processors 3$j$-25 and 3$j$-30 may be configured according to services by UEs. The higher layer processors 3$j$-25 and 3$j$-30 process data created from user services, such as FTP, VoIP, etc., and transfer the result to the multiplexer-demultiplexer 3$j$-20. The higher layer processors 3$j$-25 and 3$j$-30 process data transferred from the multiplexer-demultiplexer 3$j$-20, and transfer the result to service applications of the higher layers. The controller 3$j$-10 determines a timing to transmit MBMS to the UE, and controls the transceiver. The controller 3$j$-10 manages operations in response to the requests of the UE and transfers the response to the transceiver. The scheduler 3$j$-15 assigns a transmission resource to the UE at a timing, considering a buffer state and a channel state of the UE, a service request and active time of the UE, etc. The scheduler 3$j$-15 processes signals transmitted via the transceiver from the UE. The scheduler 3$j$-15 processes signals to be transmitted to the UE.

Figure 3K:
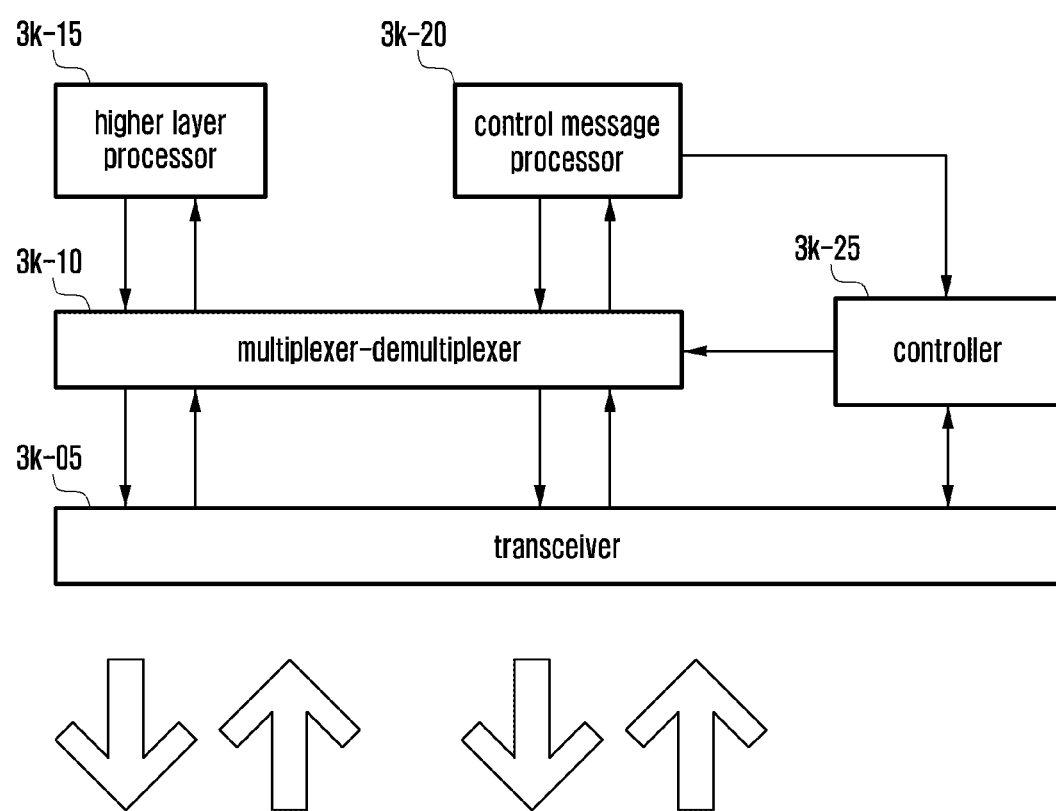
FIG. 3K illustrates an example UE according to various embodiments of the present disclosure.

FIG. 3K illustrates an example UE according to an embodiment of the present disclosure.

The UE transmits/receives data, etc. to/from a higher layer unit 3$k$-15. The UE selects a PLMN and a frequency via a control message processor 3$k$-20. The UE performs the transmission/reception of control messages, such as MBMSInterestIndication, MBMSCountingResponse, etc. When the UE transmits control signals or data to an eNB, the UEmultiplexes the control signals or data via a multiplexer 3$k$-10 according to the control of the controller 3$k$-25, and transmits the data to the eNB via the transmitter 3$k$-05. When the UE performs the reception of signals/data, the UE receives a physical signal via the receiver 3$k$-05 according to the control of the controller 3$k$-25, demultiplexes the received signals via the demultiplexer 3$k$-10, and transfers the corresponding messages to the higher layer unit 3$k$-15 or the control message processor 3$k$-20.

Although the embodiment is implemented in such a way that the UE includes a number of blocks which perform functions that differ from each other, it should be understood that the present disclosure is not limited to the embodiment. For example, the embodiment may be modified in such a way that the controller 3k-25 performs the function of the demultiplexer 3k-10. In this case, the controller 3k-25 is capable of detecting the generation of a downlink scheduling operation at a transmission time interval. The controller 3k-25 determines whether the controller 3k-25 processes the downlink scheduling operation, based on information regarding a frequency and PLMN supporting an MBMS service and a condition as to whether the Transmission Time Interval corresponds to an MBSFN subframe. The controller 3k-25 processes or ignores the downlink scheduling operation based on the determination.

The terms as used in embodiments of the present disclosure are merely for the purpose of describing particular embodiments and are not intended to limit the present disclosure. Singular forms are intended to include plural forms unless the context clearly indicates otherwise.

Although embodiments of the present disclosure have been described in detail in the foregoing description, it should be understood that many variations and modifications of the basic inventive concept herein described, which may be apparent to those skilled in the art, will still fall within the spirit and scope of the embodiments of the disclosure as defined in the appended claims.

The present disclosure defines information that a UE needs to receive an MBMS service via another service provider network, and provides a method of transmitting the information. The present disclosure determines whether an MBMS service that the UE needs to receive is provided by a currently registered service provider, and changes the reception mode according to the determination, thereby enabling the UE to receive the MBMS service from both a registered service provider network and another service provider network, without error.

The present disclosure relates to wireless communication systems, and more particularly, to licensed assisted access (LAA) using unlicensed frequency bands with assistance of licensed bands in long term evolution (LTE) systems.

With the rapid development of wireless communication technology, communication systems have also been evolved. One of the systems is an LTE system as the fourth generation mobile communication technology, attracting attention. In the LTE system, various technologies, e.g., carrier aggregation (CA), have been introduced to meet the rapid increase in the demand for traffic. Carrier aggregation (CA) refers to a technology that increases the number of carriers in communication between a user equipment (UE) and a base station (E-UTRAN NodeB, eNB), to employ from one carrier in conventional art to a primary carrier and one or more secondary carriers, thereby increasing the amount of transmission by the number of secondary carriers. In LTE technology, a cell where a primary carrier is served is called a primary Cell (PCell) and a cell where a secondary carrier is served is called a secondary Cell (SCell). The number of PCell is only one. The number of SCells (based on LTE Release 11) is up to maximum 4, and may increase in the future.

Meanwhile, the LTE system refers to a system that a communication service provider uses to provide communication services via a licensed band frequency assigned from a corresponding organization. However, in order to meet the rapid increase in the demand for traffic, a discussion is made on the LTE technology to use in an unlicensed band used for Wireless LAN, Bluetooth, etc., which is called licensed-assisted access (LAA). If the CA technology is applied to the LAA, a scenario may be considered where a PCell uses a licensed band frequency and SCells use an unlicensed band frequency by using the LAA. SCell using the unlicensed band is called LAA SCell.

As described above, if the systems employ a number of frequencies, the systems also require a relay, a remote radio head, etc. and this causes eNB systems using a primary carrier and secondary carriers to change in physical location. In this case, there may be a case that the uplink transmission timing needs to be changed. For example, if an eNB using a primary carrier and an eNB using secondary carriers differ from each other in location, it causes a problem, e.g., the farther UE is apart from an eNB the earlier UE needs to transmit an uplink signal to an eNB. To this end, a cell group with the same unlink timing included in a PCell is called a primary timing advance group (pTAG). A cell group with the same unlink timing not included in a PCell is called a secondary timing advance group (sTAG).

If LAA SCell(s) is(are) located in a location which differs from a location where a PCell is located, the LAA SCell(s) need to be configured (set) with separate timing advance values. In order to set a timing advance value, a reference downlink cell for set a setup value needs to be determined. However, it is difficult to configure (set) a reference downlink cell because of the characteristics of an unlicensed band. In particular, although a reference downlink cell has been determined, a preamble needs to be transmitted by performing a random access to calculate a time calibration value. However, it is difficult to transmit a preamble because of the characteristics of an unlicensed band.

The present disclosure set a reference cell of sTAG that includes LAA SCell, using the following method: option 1: select one of the activated SCells among the SCells configured in the same sTAG; option 2: select one of the activated SCells among the SCells which are configured in the same sTAG but are not LAA SCell; and option 3: enable an eNB to select a reference cell and to configure the cell for the UE, using a message of a radio resource control (RRC) layer.

In this case, the selected reference cell may be a cell that belongs to another TAG.

After selecting a reference cell, a real timing advance value is used as in the following method, depending on a condition as to whether a random access is performed.

If random access is not performed in LAA SCell, option 1: re-use the concept of sTAG. For TAG including an LAA SCell, it is indicated that the sTAG is used for LAA when the sTAG is configured. Alternatively, a timing advance related value (NTA, NTA_offset) is set to a constant. After that, when LAA SCell is added to the UE, the sTAG is configured.

In Option 2: timing advance values according to LAA SCells (without using the concept of sTAG) are set respectively, When SCell is added, self-timing-indication (DL reference timings according to SCells) is indicated (instead of setting an sTAG). Alternatively, a timing advance related value (NTA, NTA_offset) is set to a constant. Alternatively, if an unlicensed band is added, NTA and/or NTA_offset are set to a default value (e.g. 0) (not following pTAG, despite no stag-id). After that, the eNB receives PUSCH/SRS from the UE and adjusts a timing advance value set to the constant or default value, with TAC MAC CE. In TAT start (when performing SCell addition or activation), TAT value is set to a finite number or infinity if random access is performed in LAA SCell, re-use the concept of sTAG In the following description, an operation principle of embodiments of the disclosure is described in detail with reference to the accompanying drawings. Detailed descriptions of well-known functions and structures incorporated herein may be omitted to avoid obscuring the subject matter of the disclosure. The following terms are defined considering functions of the disclosure, and may be changed by users or operators according to their needs. Therefore, the terms will be defined throughout the content of this description.

In the following description, technology for providing the dual connectivity in wireless communication systems is explained.

In the following description, terms used to identify an access node, terms referred to as network entities, terms expressing messages, terms representing interfaces between network objects, terms used for various types of identification information, etc. are used for the sake of convenient description. Therefore, the present disclosure is not limited by the terms and may use other terms with the meanings equivalent to the terms described in the present disclosure, representing the corresponding components.

For the sake of convenient description, the present disclosure uses terms and names defined in the specifications of the 3rd generation partnership project long term evolution (3GPP LTE). However, it should be understood that the present disclosure is not limited to the terms and names and may also be applied to systems following the other standards.

Figure 4A:
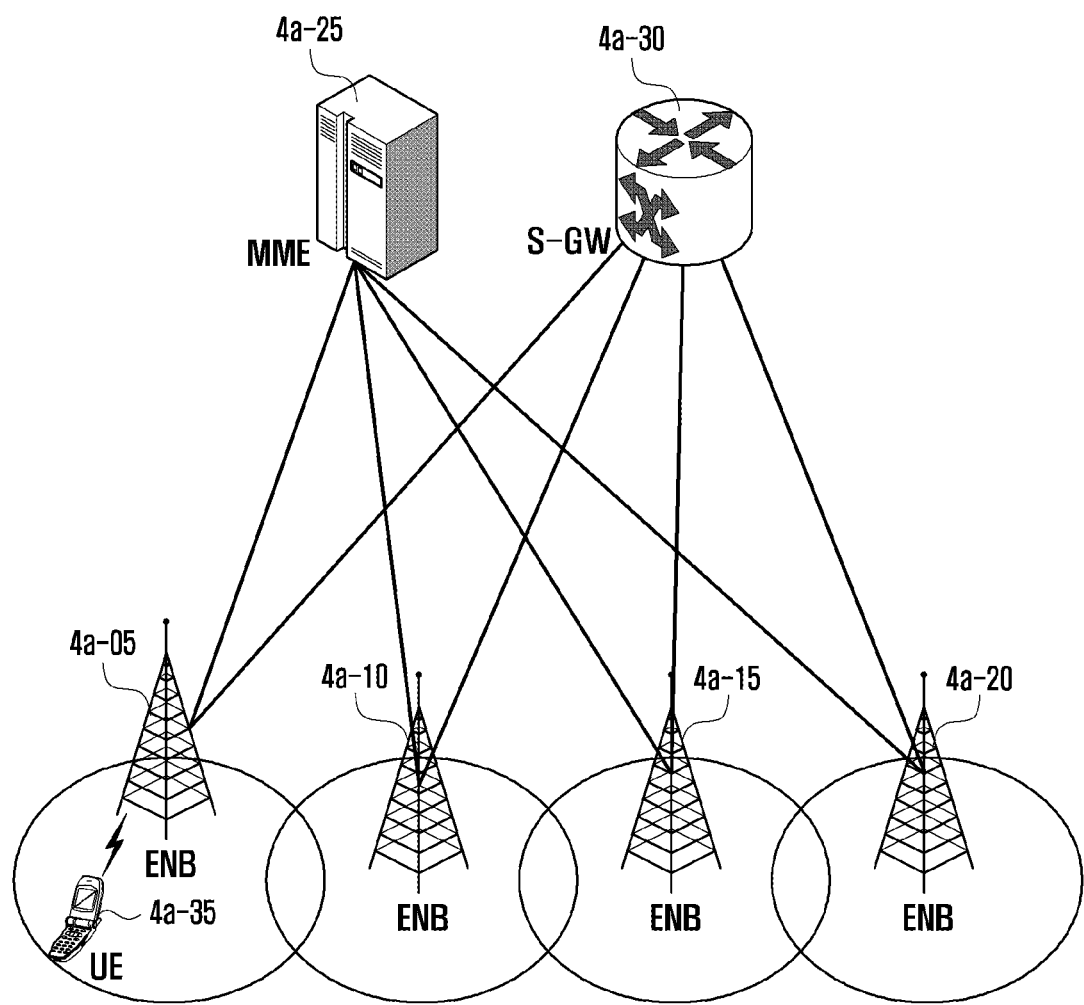
FIG. 4A illustrates an example configuration of an LTE system according to various embodiments of the present disclosure.

FIG. 4A illustrates an example configuration of an LTE system according to the present disclosure.

With reference to FIG. 4A, the LTE system configures the wireless access network, including evolved Node Bs (called ENBs, Node Bs or base stations) 4a-05, 4a-10, 4a-15, and 4a-20, a mobility management entity (MME) 4a-25, and a serving-gateway (S-GW) 4a-30. User equipment (UE) 4a-35 is connected to the ENBs 4a-05~4a-20 and the S-GW 4a-30 via an external network.

The eNBs 4a-05~4a-20 correspond to conventional Node B of the UMTS system. The eNBs 4a-05~4a-20 are connected to the UE 4a-35 via wireless channels, performing more complicated functions than conventional Node B. In LTE system, since real-time services such as a voice over IP (VoIP) service and all user traffic are serviced via shared channels, devices are required to collect information regarding states, such as buffer states of the UE, power headroom states, channel states, etc., and to make a schedule. This job is performed via the eNBs 4a-05~4a-20. One eNB can control a number of cells. For example, in order to implement a transmission rate of 100 Mbps, LTE system employs orthogonal frequency division multiplexing (OFDM) as a wireless access technology at a bandwidth of 20 MHz. It also employs adaptive modulation & coding (AMC) to determine modulation scheme and channel coding rate, meeting with the channel state of the UE. The S-GW 4a-30 is a device that provides as data bearers. The S-GW 4a-30 establishes or removes data bearers according to the control of the MME 4a-25. The MME 4a-25 manages the mobility of the UE and controls a variety of functions. The MME 4a-25 connects to a number of the eNBs.

Figure 4B:
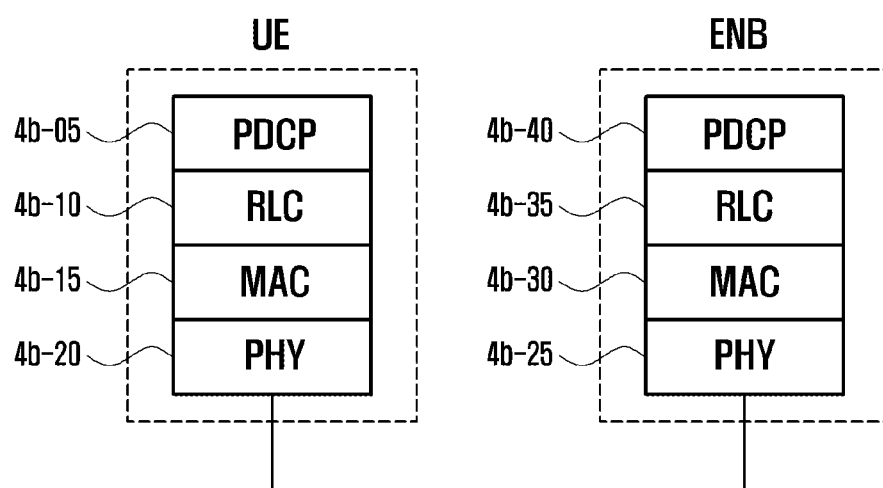
FIG. 4B illustrates an example radio protocol stack in an LTE system according to various embodiments of the present disclosure.

FIG. 4B illustrates an example radio protocol stack in an LTE system according to the present disclosure.

With reference to FIG. 4B, the UE and eNB have packet data convergence protocols (PDCP) 4b-05 and 4b-40, radio link controls (RLC) 4b-10 and 4b-35, and medium access control (MAC) 4b-15 and 4b-30, respectively. PDCP 4b-05 and 4b-40 compress/decompress IP header. RLC 4b-10 and 4b-35 reconfigure PDCP packet data unit (PDU) in proper size. MAC 4b-15 and 4b-30 connect to a number of RLC layer devices configured in one UE. MAC 4b-15 and 4b-30 multiplex RLC PUDs to MAC PDU, and de-multiplex RLC PDUs from MAC PDU. Physical layers (PHY) 4b-20 and 4b-25 in the UE and eNB channel-code and modulate data from the higher layers, create OFDM symbols, and transmit them via a wireless channel. In addition, PHY 4b-20 and 4b-25 demodulate and channel-decode OFDM symbols transmitted via a wireless channel, and transfer them to the higher layers. PHY 4a-20 and 4a-25 also use hybrid ARQ (HARQ) to additionally correct errors, where the reception stage transmits 1 bit to acknowledge a condition as to whether the reception stage receives the packets from the transmission stage, which is called HARQ ACK/NACK. Downlink HARQ ACK/NACK in response to uplink transmission is transmitted via physical Hybrid-ARQ indicator channel (PHICH). Uplink HARQ ACK/NACK in response to downlink transmission is transmitted via physical uplink control channel (PUCCH) or physical uplink shared channel (PUSCH).

The Physical layer of LTE systems has a structure of radio frame of 10 ms to transmit downlink and uplink data, and provides two types of radio frame as follows: type 1: applied to Frequency Division Duplex (FDD); and type 2: applied to Time Division Duplex (TDD)

Each of the two types of radio frames is 10 ms in length and configured with 10 subframes of 1 ms each. A subframe of 1 ms is called one transmission time interval (TTI). That is, one radio frame is divided into 10 subframes, numbered from subframe 0 to subframe 9.

In FDD, the uplink and downlink use different frequency regions and are separated from each other. Each of the uplink and downlink is divided into 10 subframes.

In TDD, each subframe of one radio frame is divided into a downlink subframe, an uplink subframe, and a special subframe, according to the settings. The special subframe is divided into downlink pilot time slot (DwPTS), guard period (GP), and uplink pilot time slot (UpPTS). The special subframe serves as a branch switching between the downlink and uplink. DwPTS, GP, and UpPTS may be set to different lengths, but the sum of their lengths is 1 ms like the other subframes.

Figure 4C:
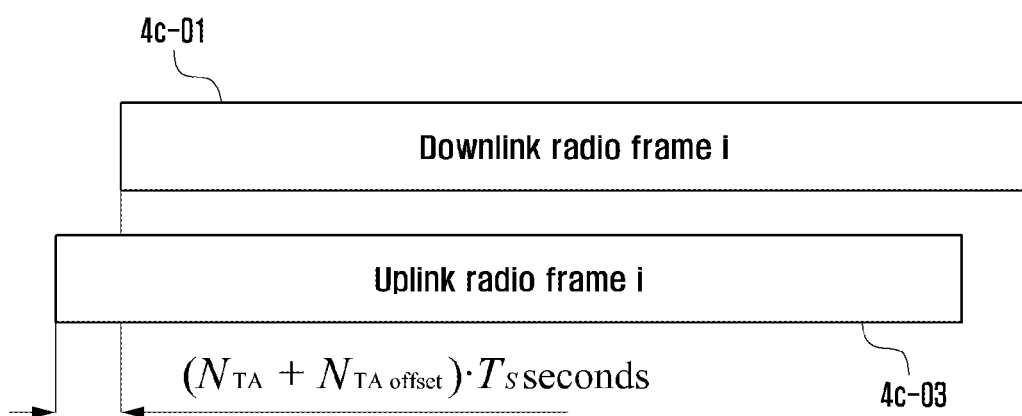
FIG. 4C illustrates an example method of calculating a timing advance value when a UE performs the uplink transmission according to various embodiments of the present disclosure.

FIG. 4C illustrates an example calculating a timing advance value when a UE performs the uplink transmission.

In order to calculate an uplink transmission timing, a UE selects a downlink cell as a reference cell for calculating a timing in operation 4c-01. If carrier aggregation (CA) is used, a downlink reference cell of a pTAG that a PCell belongs to may be a PCell; a downlink reference cell of sTAG that SCell(s) belonged to without a PCell may be any one of the activated Scells of the SCells in the TAG, as a reference cell, which can be arbitrarily selected by the UE.

The present disclosure provides a method of selecting a downlink reference cell of sTAG that LAA SCell belongs to, via the following options: option 1: select one of the activated SCells among the SCells configured in the same sTAG; option 2: select one of the activated SCells among the SCells which are configured in the same sTAG but are not LAA SCell; and option 3: enable an eNB to select a reference cell and to configure the cell for the UE (e.g., operation 4d-23 of FIG. 4D, etc. which will be described later), using a message of a radio resource control (RRC) layer In this case, the selected reference cell may be a cell that belongs to another TAG.

An uplink timing is determined, according to the configured reference downlink cell, by the following equation.

$$(N_{TA} + N_{TA\ offset}) \times T_s \text{ seconds}$$

In the equation, $N_{TA}$ has a value $0 \leq N_{TA} \leq 20512$. $N_{TA}$ offset is $N_{TA\ offset}=0$ for frame structure type 1 and $N_{TAoffset}=624$ for frame structure type 2. TS is a fixed value, $*T_s=1/(15000\times 2048)$ seconds.

An existing method allows a UE to obtain the initial value of NTA via random access. That is, the UE transmits a preset preamble via a random access resource informed by an eNB. If the eNB receives the preamble from the UE, the eNB calculates the reception timing of the preamble, and transmits, to the UE, a random access response (RAR) message including a transmission delay. The delay included in the RAR is expressed by TA (TA=0, 1, 2, . . . , 1282), which is calculated by the following equation $$N_{TA}=TA\times 16.$$

That is, an eNB adjusts an uplink timing advance value in a unit of 0.52 μs. In summary, a UE: transmits a preamble; receives an RAR; and calculates the initial value of NTA, based on TA included in the RAR.

Meanwhile, there may be a case that a UE does not transmit a preamble to an LAA SCell. Before transmitting a signal in an unlicensed band, the UE may need to perform an operation to detect whether there is another device using a corresponding band, e.g., listen-before-talk (LBT). If the UE performs the transmission of a preamble while performing LBT, this increases the degree of complexity.

Therefore, if cells of sTAG are configured to include only LAA SCell(s), and thus the UE cannot perform random access in an LAA SCell, a method is required to set the initial value of NTA. To this end, the present disclosure proposes the following options.

In option 1: re-use the concept of sTAG, an eNB configures sTAG for LAA Cell, when the sTAG is configured, it is indicated that the sTAG is for LAA Alternatively, a timing advance related value (NTA, NTA_offset) is set to a constant. After that, when an eNB adds LAA SCell to the UE, the sTAG is configured In option 2: Timing advance values according to LAA SCells (without using the concept of sTAG) are set respectively, wen an eNB adds SCell to the UE, self-timing-indication (DL reference timings according to SCells) is included (instead of setting an sTAG). Alternatively, a timing advance related value (NTA, NTA_offset) is set to a constant. Alternatively, if an unlicensed band is added, NTA and/or NTA_offset are set to a default value (e.g. 0) (not following pTAG, despite no stag-id). After that, the eNB receives, from the UE, uplink data or a sounding reference signal (SRS), and additionally instructs the uplink adjustment. In this case, the eNB transmits TA to the UE, via a message of a MAC layer, timing advance command MAC control element (TAC MAC CE). TA (TA=0, 1, 2, . . . , 63) included in the TAC MAC CE is calculated by the following equation.

$$N_{TA,new}=N_{TA,old}+(T_A-31)\times 16$$

That is, an uplink timing advance value is adjusted, from an initial value or a previous value, with a relative value (using a unit of 0.52 μs), thereby adjusting a timing in the uplink transmission.

Figure 4D:
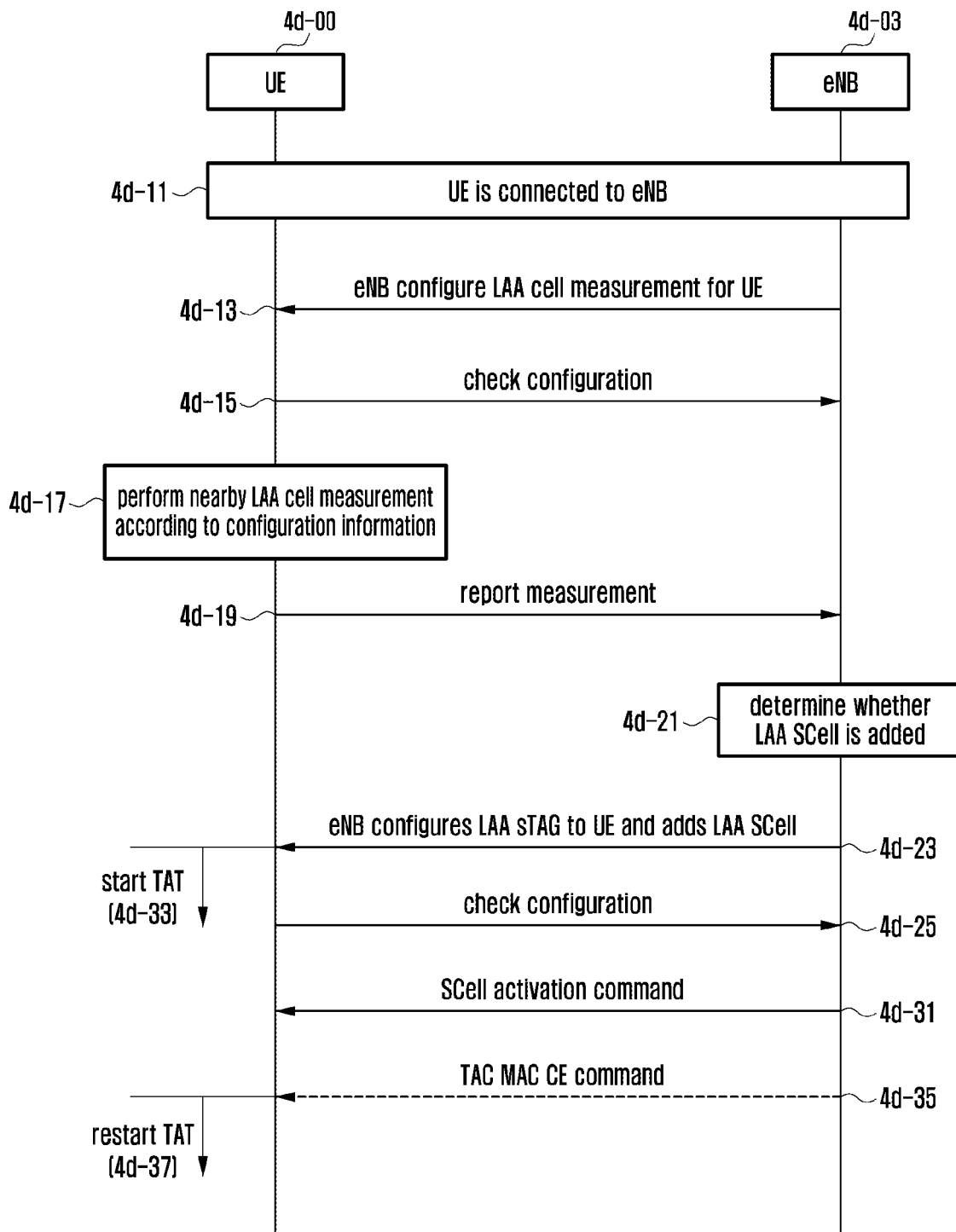
FIG. 4D illustrates a flow diagram of messages flow between a UE and an eNB when a timing for licensed-assisted access secondary cell (LAA SCell) is adjusted according to various embodiments of the present disclosure.

FIG. 4D illustrates a flow diagram of messages flow between a UE and an eNB when a timing for LAA SCell is adjusted, according to the present disclosure.

In the embodiment, it is assumed that a UE 4*d*-01 attempts to access an eNB/cell 4*d*-03 and is in a connected state in operation 4*d*-11. The connected state is referred to a state where the UE succeeds in accessing a corresponding eNB and can transmit/receive data to/from the eNB.

If the UE is equipped with a function for adding an LAA SCell (i.e., a function for supporting an LAA), the eNB configures the measurement of a nearby LAA cell for the UE in operation 4*d*-13. The configuration message may be transmitted via a message of an RRC layer, RRCConnectionReconfiguration. The configuration message includes a timing to receive a discovery reference signal (DRS) from an LAA SCell, etc. The UE receives the configuration message and transmits an configuration acknowledgement message to the eNB. The configuration acknowledgement message may be transmitted via a message of an RRC layer, RRCConnectionReconfigurationComplete.

After that, the UE measures nearby LAA cells according to configuration information in operation 4*d*-17. If the UE ascertains that a preset condition is satisfied (e.g., a preset period of time has elapsed, the measured signal strength of a cell is greater than a threshold, etc.), the UE reports the measurement result to the eNB in operation 4*d*-19.

The eNB determines whether the eNB adds an LAA cell as a SCell to the UE, based on the report result, in operation 4*d*-21. The eNB transmits, to the UE, a message for additionally configuring an LAA SCell and information regarding a TAG that an LAA cell belongs to in operation 4*d*-23. The information regarding a TAG that an LAA cell belongs to and the LAA SCell may be set, via the same message or via individual messages, e.g., a message of an RRC layer, RRCConnectionReconfiguration.

As described above with reference to 4C, the configuration message may include information regarding a downlink cell as a reference of a timing advance (Option 3 described above with reference to FIG. 4C). That is, the eNB selects a reference cell and directly configures a reference to the UE.

As described above with reference to 4C, if all the cells of sTAG are LAA SCell, the UE may not perform random access. In this case, the message, RRCConnectionReconfiguration, includes the following information so that the UE can set an initial value of NTA.

If option 1 is applied, i.e., if the concept of sTAG is re-used, when an eNB configures sTAG for LAA Cell, the eNB includes an indication indicating that sTAG is for LAA or the eNB includes a constant for a timing advance related value (NTA, NTA_offset). After that, when an eNB adds LAA SCell to the UE, the sTAG is configured If option 2 is applied, i.e., timing advance values according to LAA SCells (without using the concept of sTAG) are set respectively, when an eNB adds LAA SCell to the UE, self-timing-indication (DL reference timings according to SCells) is included (instead of setting an sTAG). Alternatively, includes a constant for a timing advance related value (NTA, NTA_offset). Alternatively, if an unlicensed band is added, the UE directly sets NTA and/or NTA_offset to a default value (e.g. 0) (not following pTAG, despite no stag-id) (in this case, the RRC message does not include an indication)

After receiving the information, the UE transmits a message acknowledging that the UE correctly received the configuration information in operation 4*d*-25. An example of the message is RRCConnectionReconfigurationComplete.

After receiving the configuration information, the UE sets NTA and NTA offset, using a constant or a default value, according to option 1 or option 2. As shown in FIG. 4C, the UE sets a timing advance value to perform the uplink transmission, before $(N_{TA}+N_{TAoffset})\times T_s$ seconds, from a downlink reference cell. If the UE does not perform random access, the UE starts timeAlignmentTimer (TAT), informing that the set timing advance is valid since a timing when the UE received the configuration message. In this case, the timer value may be set to a finite value or infinity. This is because: the coverage of an LAA SCell is very small in size (since the limitation of transmission power, etc.); the timing advance value is not large; and the variation is not large.

After that, the eNB makes an activation command to actually use the additionally configured LAA SCell in operation 4d-31. The activation command may be transmitted via a message of an MAC layer, Activation/Deactivation MAC CE. The UE receives the activation message, and receives/transmits data from/to a corresponding LAA SCell. The eNB additionally adjusts a timing advance value, based on the received data or SRS. To this end, TAC MAC CE of MAC layer is used. The UE receives the TAC MAC CE, adjusts a timing advance value, and re-starts the TAT value that has started, as described above referring to FIG. 4C.

Figure 4E:
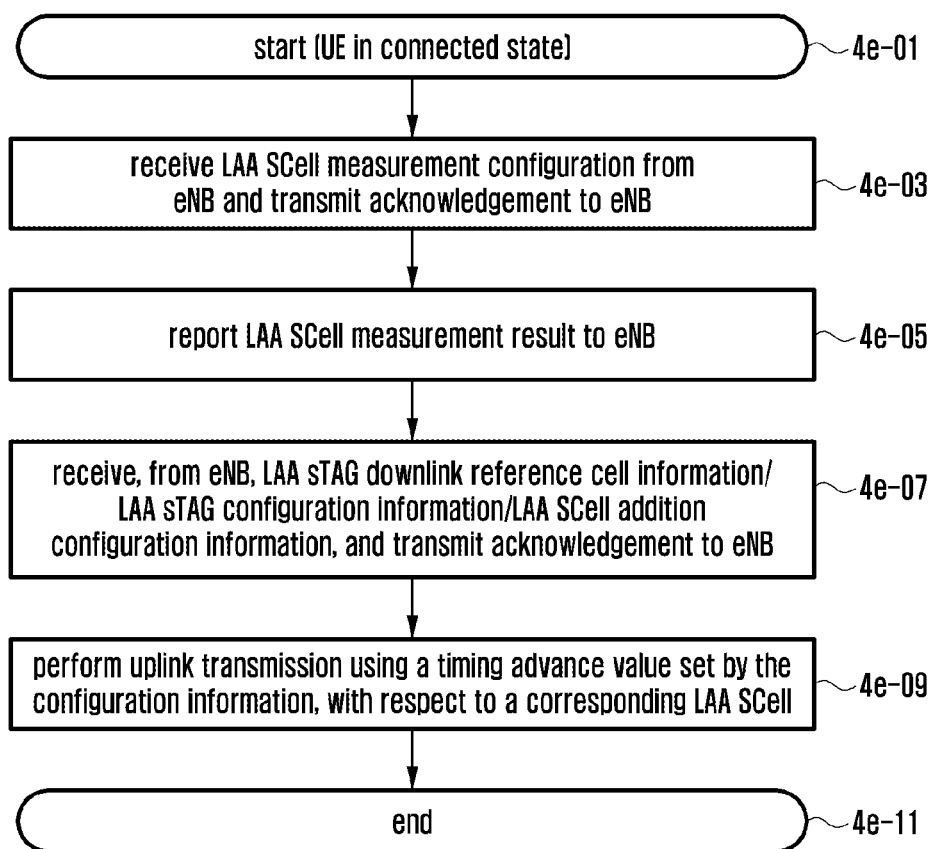
FIG. 4E illustrates a flowchart of a method for a UE to adjust a timing for LAA SCell according to various embodiments of the present disclosure.

FIG. 4E illustrates a flowchart of a method for a UE to adjust timing for LAA SCell according to the present disclosure.

It is assumed that a UE is in a connected state and supports an LAA function, like the embodiment With reference to FIG. 4D. The UE receives a message for configuring the measurement of nearby LAA cells from an eNB, and transmits the acknowledgement message to the eNB in operation 4e-03. The measurement configuration message includes a timing to receive a discovery reference signal (DRS) from an LAA SCell, etc. After that, the UE measures nearby LAA cells according to the configuration information, and reports, if a set condition is satisfied, the measurement result to the eNB in operation 4e-05.

The UE receives, from the eNB, a message for additionally configuring an LAA SCell and information regarding a TAG that an LAA cell belongs to, and transmits the acknowledgement message to the eNB in operation 4e-07. The information regarding a TAG that an LAA cell belongs to and the LAA SCell may be set by the same message or by individual messages, e.g., a message of an RRC layer, RRCConnectionReconfiguration.

As described above with reference to 4C, the configuration message may include information regarding a downlink cell as a reference of a timing advance (option 3 described above with reference to FIG. 4C). That is, the eNB selects a reference cell and directly configures a reference to the UE.

As described above with reference to 4C, if all the cells of sTAG are LAA SCell, the UE cannot perform random access. In this case, the message, RRCConnectionReconfiguration, includes the following information so that the UE can set an initial value of NTA.

If Option 1 is applied, i.e., if the concept of sTAG is re-used, when an eNB configures sTAG for LAA Cell, the eNB includes an indication indicating that sTAG is for LAA or the eNB includes a constant for a timing advance related value (NTA, NTA_offset). After that, when an eNB adds LAA SCell to the UE, the sTAG is configured If option 2 is applied, i.e., timing advance values according to LAA SCells (without using the concept of sTAG) are set respectively, when an eNB adds LAA SCell to the UE, self-timing-indication (DL reference timings according to SCells) is included (instead of setting an sTAG). Alternatively, includes a constant for a timing advance related value (NTA, NTA_offset). Alternatively, if an unlicensed band is added, the UE directly sets NTA and/or NTA_offset to a default value (e.g. 0) (not following pTAG, despite no stag-id) (in this case, the RRC message does not include an indication).

After that, if the added LAA SCell is activated, the UE sets NTA and NTA offset, using a constant or a default value, according to option 1 or option 2, based on the information received as in operation 4e-07. The UE sets a timing advance value to perform the uplink transmission, before $(N_{TA}+N_{TAoffset}) \times T_s$ seconds, from a downlink reference cell, and establishes the uplink, as described above with reference to FIG. 4C. If the UE does not perform random access, the UE starts timeAlignmentTimer (TAT), informing that the set timing advance is valid since a timing when the UE received the configuration message. After that, the eNB additionally adjusts a timing advance value, based on the received data or SRS. To this end, TAC MAC CE of MAC layer is used. The UE receives the TAC MAC CE, adjusts a timing advance value, and re-starts the TAT value that has started, as described above referring to FIG. 4C.

Figure 4F:
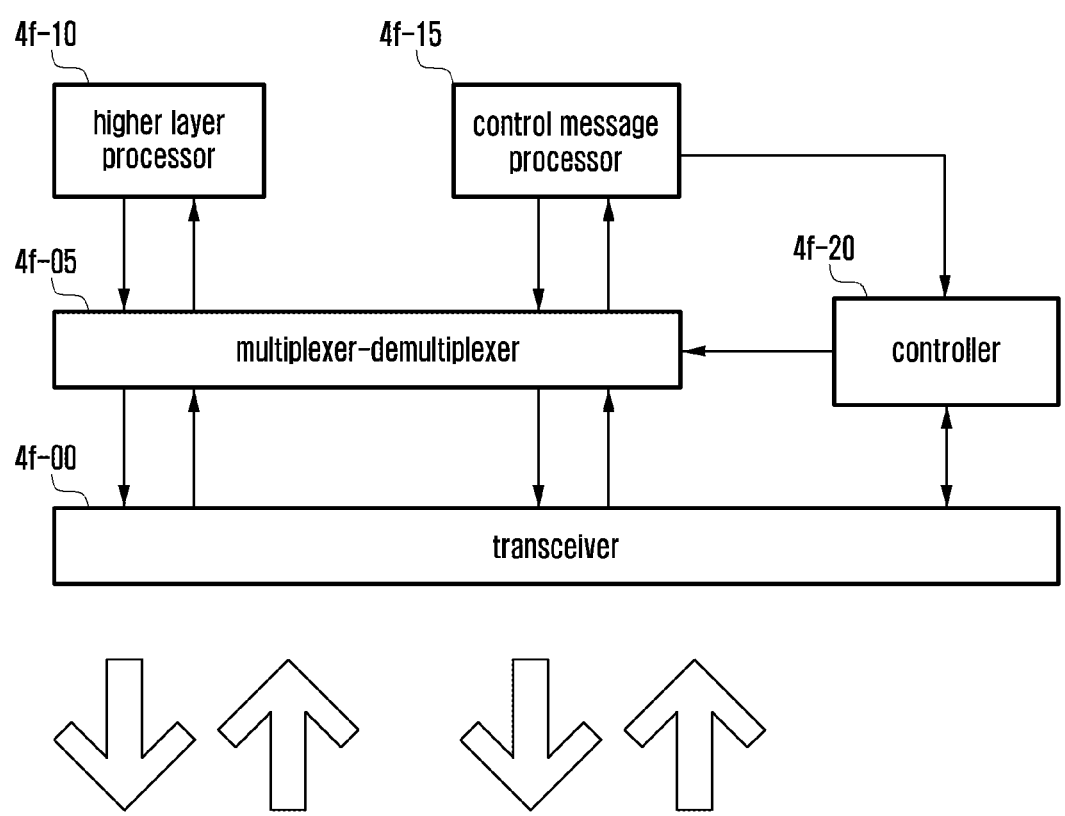
FIG. 4F illustrates an example UE according to various embodiments of the present disclosure.

FIG. 4F illustrates an example a UE according to an embodiment of the present disclosure.

A UE transmits/receives data, etc. to/from a higher layer 4f-10. The UE transmits/receives control messages via a control message processor 4f-15. When the UE transmits control signals or data to an eNB, the UE multiplexes the control signals or data via a multiplexer 4f-05 according to the control of the controller 4f-20, and transmits the data to the eNB via the transmitter 4f-00. When the UE performs the reception of signals/data, the UE receives a physical signal via the receiver 4f-00 according to the control of the controller 4f-20, demultiplexes the received signals via the demultiplexer 4f-05, and transfers the corresponding messages to the higher layer unit 4f-10 or the control message processor 4f-15. For example, the messages of the RRC layer are control messages.

Although the embodiment is implemented in such a way that the UE includes a number of blocks which perform functions that differ from each other, it should be understood that the present disclosure is not limited to the embodiment. For example, the embodiment may be modified in such a way that the controller 4f-20 performs the function of the demultiplexer 4f-05.

The present disclosure enables a UE to: receive, from an eNB, configuration information regarding sTAG that an LAA SCell belongs to and additional configuration of an SCell; set a timing advance value, without performing random access; and perform, if a corresponding LAA SCell is activated, the uplink transmission, based on the set timing advance value.

The methods according to embodiments described in the claims or description can be implemented with hardware, software, and a combination thereof.

When the methods are implemented with software, a computer-readable storage media where one or more programs (software modules) are stored is provided. One or more programs stored in the computer-readable storage media are configured for execution by one or more processors in the electronic devices. One or more programs include instructions for enabling the electronic device to execute the methods according to embodiments described in the claims or in the description.

These programs (software modules and software) are stored in: random access memory (RAM), flash memory, non-volatile memory, read only memory (ROM), electrically erasable programmable read only memory (EEPROM), magnetic disc storage device, compact disc-ROM (CD-ROM), digital versatile discs (DVDs) or other types of optical storage device, magnetic cassette, etc. or a combination thereof. In addition, two or more of the same type of memories form a memory block.

In addition, the programs may also be stored in an attachable storage device accessible through a communication network, such as Internet, Intranet, local area network (LAN), wide area network (WAN), storage area network (SAN) or a combination thereof. This storage device may be connected to the apparatus according to the present disclosure via external ports. In addition, a separate storage device of a communication network may be connected to the apparatus according to the present disclosure.

The terms as used in embodiments of the present disclosure are merely for the purpose of describing particular embodiments and are not intended to limit the present disclosure. Singular forms are intended to include plural forms unless the context clearly indicates otherwise.

Although embodiments of the disclosure have been described in detail hereinabove, it should be understood that many variations and modifications of the basic inventive concept herein described, which may be apparent to those skilled in the art, will still fall within the spirit and scope of the embodiments of the disclosure as defined in the appended claims.

The present disclosure provides a method of setting a timing advance value to perform the uplink transmission in an LAA SCell using an unlicensed band. More specifically, the present disclosure provides a method and apparatus for determining a timing advance value of a group corresponding to a constant or a value indicated by an eNB, using the concept of a timing advance group (TAG), although random access is not performed, or timing advance values according to LAA SCells. Therefore, The UE is capable of setting a timing advance value and transmitting the set timing advance value to an LAA SCell, in the uplink, without performing the random access.

The present disclosure relates to wireless communication systems, and more particularly, to licensed assisted access (LAA) using unlicensed frequency bands with assistance of licensed bands in long term evolution (LTE) systems.

Various communication technologies coexist and are used in unlicensed band. For example, WLAN technology is used in 5 GHz band employing LAA technology. LAA technology and WLAN technology use the same frequency, and thus LAA technology and WLAN technology may interfere with each other. WLAN technology does not control transmission power, and performs the transmission using maximum transmission power as far as countries set their regulations regarding maximum transmission power levels. In contrast, LTE technology performs transmission at minimum power (in order to prevent mutual interference between a number of eNBs, etc.). If an LTE signal and a WLAN signal are simultaneously transmitted, the LTE signal is weak and thus may not be transmitted well.

The present disclosure enables an eNB to determine whether a WLAN exists on a frequency used by a corresponding LAA SCell in order to perform the power control for an LAA SCell, and use the following method, based on the determination.

If only LTE exists, power control is performed (mode 1).

If a nearby WLAN AP exists, power control is not performed (mode 2).

In this case, an eNB adds: a preset indication to a preset SIB; or a preset indication when an LAA SCell is added to the UE, thereby preventing the power control from being performed when a corresponding SCell is used.

In the following description, an operation principle of embodiments of the disclosure is described in detail with reference to the accompanying drawings. Detailed descriptions of well-known functions and structures incorporated herein may be omitted to avoid obscuring the subject matter of the disclosure. The following terms are defined considering functions of the disclosure, and may be changed by users or operators according to their needs. Therefore, the terms will be defined throughout the content of this description.

In the following description, technology for providing the dual connectivity in wireless communication systems is explained.

In the following description, terms used to identify an access node, terms referred to as network entities, terms expressing messages, terms representing interfaces between network objects, terms used for various types of identification information, etc. are used for the sake of convenient description. Therefore, the present disclosure is not limited by the terms and may use other terms with the meanings equivalent to the terms described in the present disclosure, representing the corresponding components.

For the sake of convenient description, the present disclosure uses terms and names defined in the specifications of the 3rd generation partnership project long term evolution (3GPP LTE). However, it should be understood that the present disclosure is not limited to the terms and names and may also be applied to systems following the other standards.

Figure 5A:
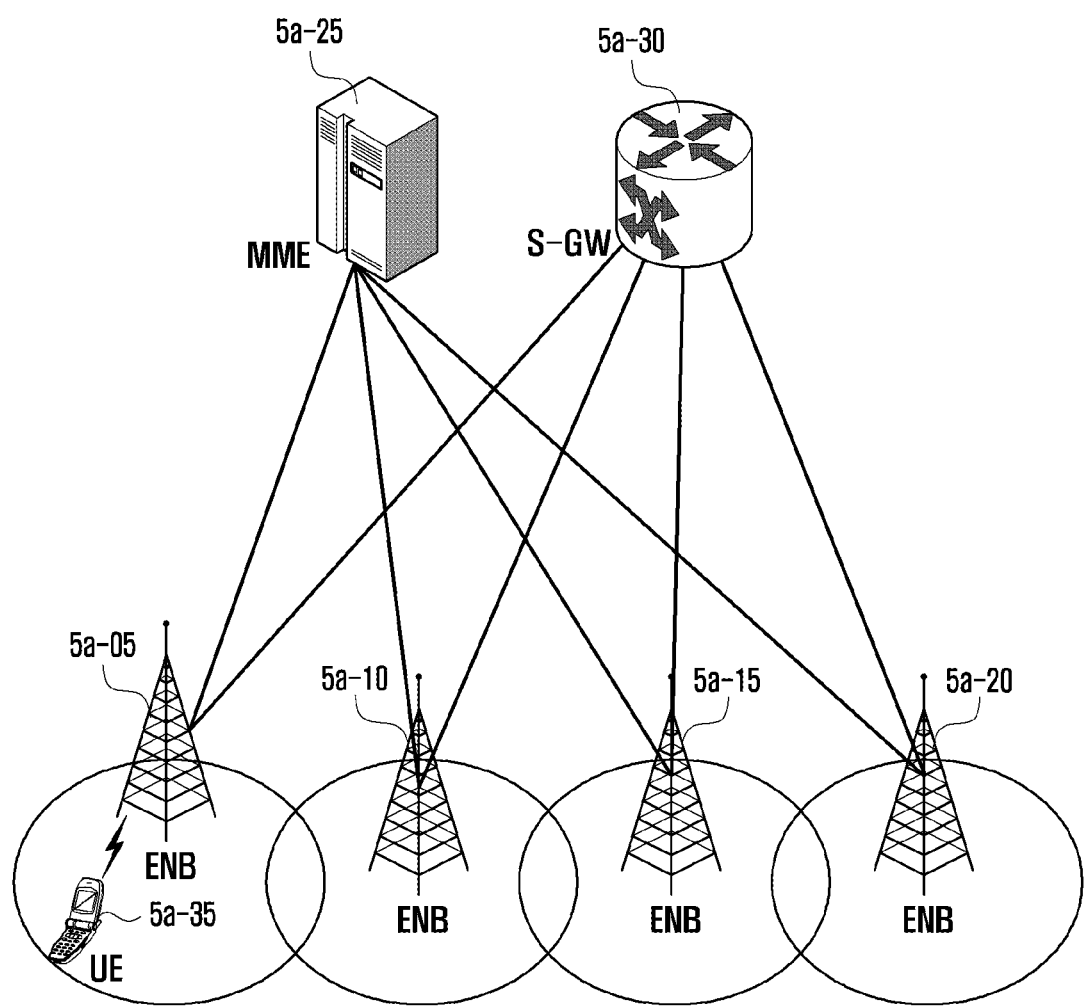
FIG. 5A illustrates an example configuration of an LTE system according to various embodiments of the present disclosure.

FIG. 5A illustrates an example configuration of an LTE system according to the present disclosure.

With reference to FIG. 5A, the LTE system configures the wireless access network, including evolved Node Bs (called ENBs, Node Bs or base stations) 5a-05, 5a-10, 5a-15, and 5a-20, a mobility management entity (MME) 5a-25, and a serving-gateway (S-GW) 5a-30. User equipment (UE) 5a-35 is connected to the ENBs 5a-05~5a-20 and the S-GW 5a-30 via an external network.

The eNBs 5a-05~5a-20 correspond to conventional Node B of the UMTS system. ENBs 5a-05~5a-20 are connected to the UE 5a-35 via wireless channels, performing more complicated functions than conventional Node B. In LTE system, since real-time services such as a voice over IP (VoIP) service and all user traffic are serviced via shared channels, devices are required to collect information regarding states, such as buffer states of the UE, power headroom states, channel states, etc., and to make a schedule. This job is performed via the eNBs 5a-05~5a-20. One ENB can control a number of cells. For example, in order to implement a transmission rate of 100 Mbps, LTE system employs orthogonal frequency division multiplexing (OFDM) as a wireless access technology at a bandwidth of 20 MHz. It also employs adaptive modulation & coding (AMC) to determine modulation scheme and channel coding rate, meeting with the channel state of the UE. The S-GW 5a-30 is a device that provides as data bearers. The S-GW 5a-30 establishes or removes data bearers according to the control of MME 5a-25. MME 5a-25 manages the mobility of the UE and controls a variety of functions. MME 5a-25 connects to a number of the eNBs.

Figure 5B:
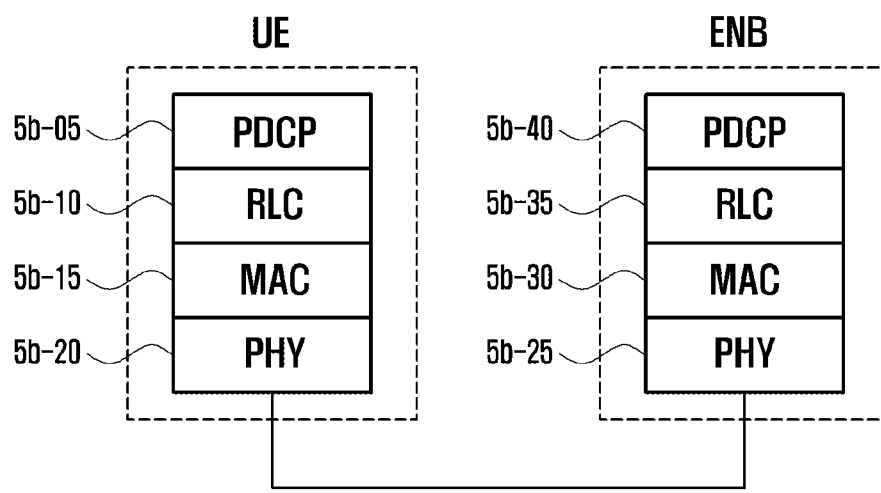
FIG. 5B illustrates an example radio protocol stack in an LTE system according to various embodiments of the present disclosure.

FIG. 5B illustrates an example radio protocol stack in an LTE system according to the present disclosure.

With reference to FIG. 5B, The UE and eNB have packet data convergence protocols (PDCP) 5b-05 and 5b-40, radio link controls (RLC) 5b-10 and 5b-35, and medium access control (MAC) 5b-15 and 5b-30, respectively. PDCP 5b-05 and 5b-40 compress/decompress IP header. RLC 5b-10 and 5b-35 reconfigure PDCP packet data unit (PDU) in proper size. MAC 5b-15 and 5b-30 connect to a number of RLC layer devices configured in one UE. MAC 5b-15 and 5b-30 multiplex RLC PUDs to MAC PDU, and de-multiplex RLC PDUs from MAC PDU. Physical layers (PHY) 5b-20 and 5b-25 in the UE and eNB channel-code and modulate data from the higher layers, create OFDM symbols, and transmit them via a wireless channel. In addition, PHY 5b-20 and 5b-25 demodulate and channel-decode OFDM symbols transmitted via a wireless channel, and transfer them to the higher layers. PHY 5a-20 and 5a-25 also use hybrid ARQ (HARQ) to additionally correct errors, where the reception stage transmits 1 bit to acknowledge a condition as to whether the reception stage receives the packets from the transmission stage, which is called HARQ ACK/NACK. Downlink HARQ ACK/NACK in response to uplink transmission is transmitted via physical hybrid-ARQ indicator channel (PHICH). Uplink HARQ ACK/NACK in response to downlink transmission is transmitted via physical uplink control channel (PUCCH) or physical uplink shared channel (PUSCH).

The physical layer of LTE systems has a structure of Radio Frame of 10 ms to transmit downlink and uplink data, and provides two types of radio frames as follows:

type 1: applied to Frequency Division Duplex (FDD); and
type 2: applied to Time Division Duplex (TDD)

Each of the two types of radio frames is 10 ms in length and configured with 10 subframes of 1 ms each. A subframe of 1 ms is called one transmission time interval (TTI). That is, one radio frame is divided into 10 subframes, numbered from subframe 0 to subframe 9.

In FDD, the uplink and downlink use different frequency regions and are separated from each other. Each of the uplink and downlink is divided into 10 subframes.

In TDD, each subframe of one radio frame is divided into a downlink subframe, an uplink subframe, and a special subframe, according to the settings. The special subframe is divided into downlink pilot time slot (DwPTS), guard period (GP), and uplink pilot time slot (UpPTS). The special subframe serves as a branch switching between the downlink and uplink. DwPTS, GP, and UpPTS may be set to different lengths, but the sum of their lengths is 1 ms like the other subframes.

Figure 5C:
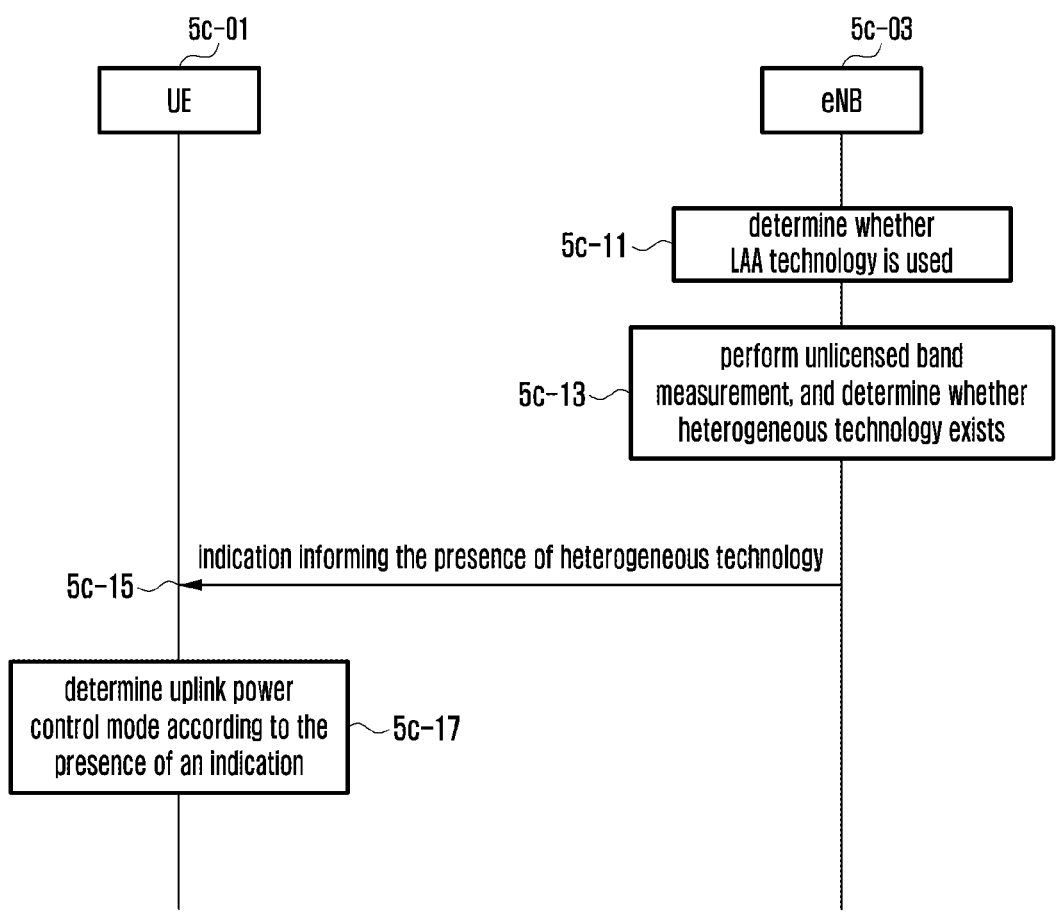
FIG. 5C illustrates a flow diagram of messages flow between a UE and an eNB when a power control method is used in an unlicensed band according to various embodiments of the present disclosure.

FIG. 5C illustrates a flow diagram of messages flow between a UE and an eNB when a power control method is used in an unlicensed band, according to the present disclosure.

The eNB 5c-03 determines whether the eNB 5c-03 needs to use the LAA technology in operation 5c-11. The determination criteria are a condition as to whether UEs connected to the eNB support the LAA technology and the current traffic load of the eNB. If the eNB ascertains that traffic needs to be split to unlicensed bands because of a relatively large amount of transmission/reception data, the eNB may determine whether the eNB needs to use the LAA technology.

If the eNB needs to use the LAA technology in operation 5c-11, the eNB measures an unlicensed band to use the LAA technology and determines whether heterogeneous technologies exist on a corresponding band in operation 5c-13. An example of heterogeneous technologies is WLAN, etc. If the eNB detects a message or a beacon frame transmitted from a WLAN, the eNB ascertains that the WLAN uses a corresponding band. The message transmitted from a WLAN may include a preamble and physical header, MAC header, etc., which are defined in the IEEE 802.11 specification.

If the eNB ascertains that heterogeneous technologies exist, the eNB transmits a preset indication notifying that heterogeneous technologies exist on a corresponding band in operation 5c-15. Alternatively, if the transmission of hetero- geneous technologies via a corresponding band is prohibited, e.g., according to country regulations, without performing the measurement, the eNB may transmit a corresponding indication. The indication may be transmitted via a preset system information block (SIB) transmitted as a broadcast to a cell. Alternatively, the indication may be transmitted, via a unicast message, to the UE that needs to set the LAA technology. If the indication is transmitted via a unicast message, the indication may be transmitted using a message of a radio resource control (RRC) layer, RRCConnectionReconfiguration.

The UE determines an uplink power control method, according to a condition as to whether the indication received from the eNB exists, in operation 5c-17. The uplink power control method according to the present disclosure is divided into two types of modes as follows.

Mode1: follow a power control method of LTE; and increase/decrease transmission power according to transmission power control (TPC) transmitted by an eNB, based on an initial power value determined by the preamble transmission of the UE or a fixed initial power value defined in the specification Mode 2: perform the transmission using a preset fixed transmission power value, instead of the values used as in Mode 1; an example of the fixed value may be a minimum value of a regulation related to a corresponding band and when the UE performs the maximum transmission If the UE receives an indication from the eNB that heterogeneous technologies exist on a corresponding band, the UE performs the uplink transmission in mode 2. On the other hand, if the UE does not receive an indication, the UE performs the uplink transmission in mode 1.

Therefore, if LTE technology and heterogeneous technologies are simultaneously used on an unlicensed band, the present disclosure enables the UE to transmit uplink data in mode 2, thereby minimizing the interference by heterogeneous technologies in LTE signals.

Figure 5D:
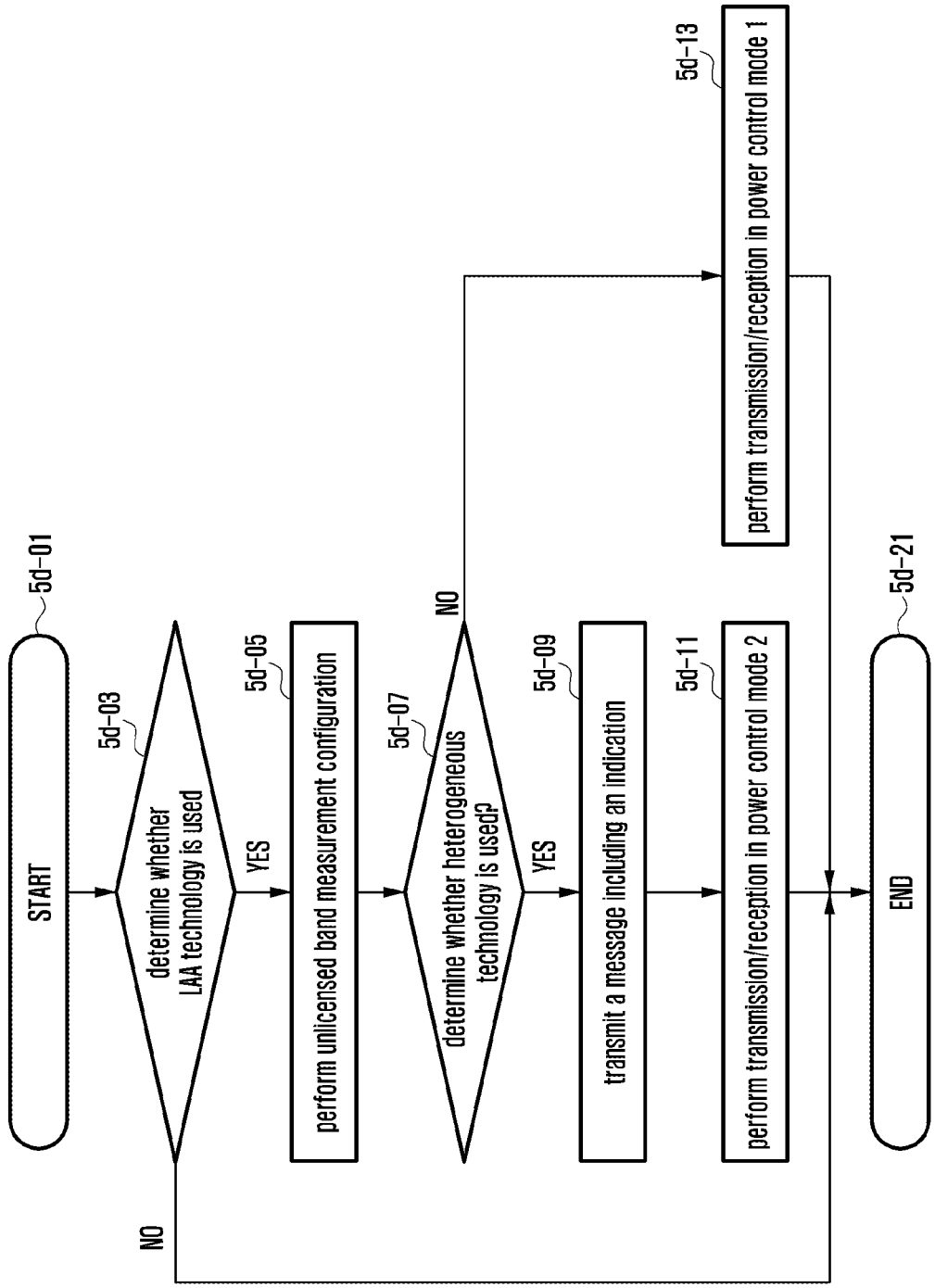
FIG. 5D illustrates a flow diagram of eNB operations when a power control scheme is used in an unlicensed band according to various embodiments of the present disclosure.

FIG. 5D illustrates a flow diagram of eNB operations when a power control method is used in an unlicensed band, according to the present disclosure.

The eNB determines whether the eNB needs to use the LAA technology during the operation in operation 5d-03. The determination criteria are a condition as to whether the UEs connected to the eNB support the LAA technology and the current traffic load of the eNB. If the number of the UEs connected to the eNB, capable of supporting the LAA technology, is greater than or equal to a preset number, the eNB ascertains that traffic needs to be split to unlicensed bands because of a relatively large amount of transmission/reception data. In this case, the eNB may determine whether the eNB needs to use the LAA technology.

If the eNB needs to use the LAA technology in operation 5d-03, the eNB measures an unlicensed band to use the LAA technology and determines whether heterogeneous technologies exist on a corresponding band in operation 5d-05. An example of heterogeneous technologies is WLAN, etc. If the eNB detects a message or a beacon frame transmitted from a WLAN, the eNB ascertains that the WLAN uses a corresponding band. The message transmitted from a WLAN may include a preamble and physical header, MAC header, etc., which are defined in the IEEE 802.11 specification. If the transmission of heterogeneous technologies via a corresponding band is prohibited, e.g., according to country regulations, without performing the measurement, the eNB may ascertain that heterogeneous technologies do not exist.

If the eNB ascertains that heterogeneous technologies exist in operation 5d-07, the eNB transmits a preset indication notifying that heterogeneous technologies exist on a corresponding band in operation 5d-09. The indication may be transmitted via a preset system information block (SIB) as a broadcast message transmitted to a cell. Alternatively, the indication may be transmitted, via a unicast message, to the UE that needs to set the LAA technology. If the indication is transmitted via a unicast message, the indication may be transmitted using a message of an RRC layer, RRCConnectionReconfiguration.

The eNB determines a power control method, according to the determination result. The uplink power control method according to the present disclosure is divided into two types of modes as follows.

Mode1: follow a power control method of LTE; and increase/decrease transmission power according to TPC transmitted by an eNB, based on an initial power value determined by the preamble transmission of the UE or a fixed initial power value defined in the specification Mode 2: perform the transmission using a preset fixed transmission power value, instead of the values used as in Mode 1; an example of the fixed value may be a minimum value of a regulation related to a corresponding band and when the UE performs the maximum transmission If the eNB detects that heterogeneous technologies are used, the eNB performs the transmission/reception of data in mode 2 in operation 5d-11. On the other hand, if the eNB does not detect that heterogeneous technologies are used, the UE performs the uplink transmission in mode 1 in operation 5d-13.

Therefore, if LTE technology and heterogeneous technologies are simultaneously used on an unlicensed band, the present disclosure enables the eNB to perform the transmission/reception of data in mode 2, thereby minimizing the interference by heterogeneous technologies in LTE signals.

Figure 5E:
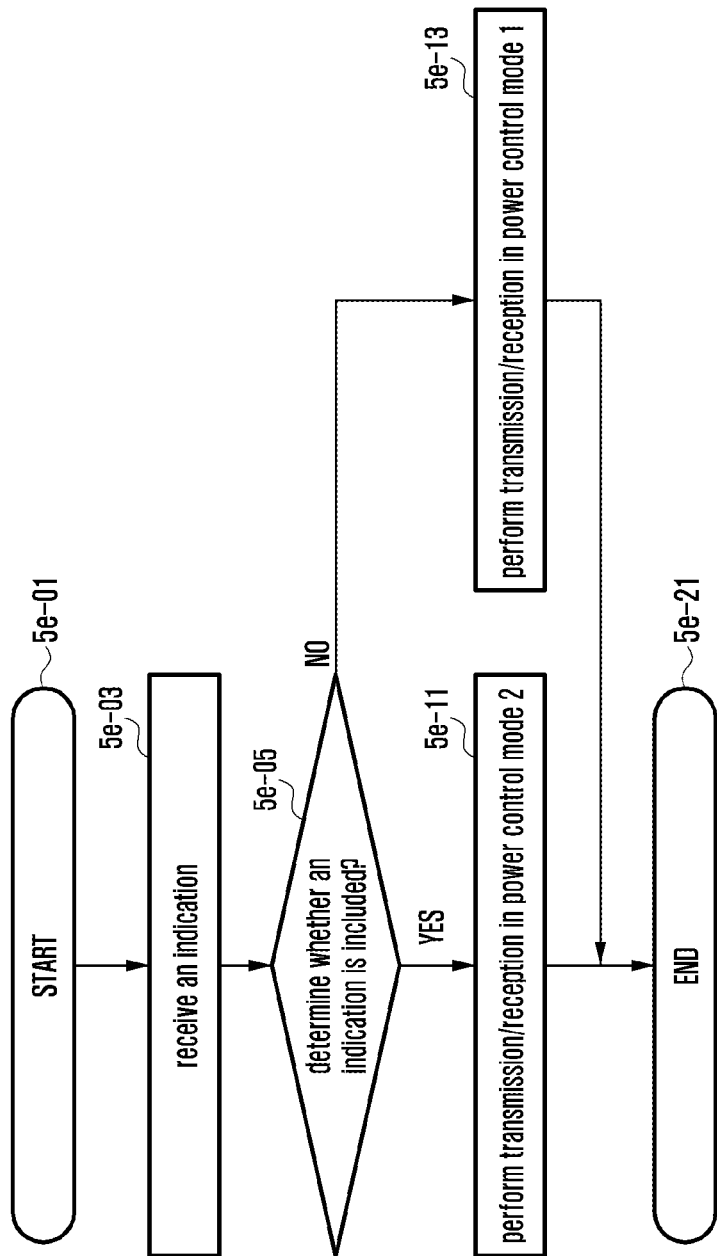
FIG. 5E illustrates a flow diagram of a UE operations when a power control method is used in an unlicensed band according to various embodiments of the present disclosure.

FIG. 5E illustrates a flow diagram of UE operations when a power control method is used in an unlicensed band, according to the present disclosure.

The UE receives a preset indication from an eNB in operation 5e-03. The indication may be transmitted via a preset SIB message as a broadcast message transmitted to a cell, or received via a unicast message. If the indication may be transmitted via a unicast message, the UE may use a message of an RRC layer, RRCConnectionReconfiguration. If the message includes a preset indication, the UE may perform the uplink transmission in mode 2 as described above with reference to FIG. 5D or 5D in operation 5e-11. If the message does not include an indication, the UE performs the uplink transmission in mode 1 in operation 5e-13.

Therefore, if LTE technology and heterogeneous technologies are simultaneously used on an unlicensed band, the present disclosure enables the UE to perform the transmission/reception of data in mode 2, thereby minimizing the interference by heterogeneous technologies in LTE signals.

Figure 5F:
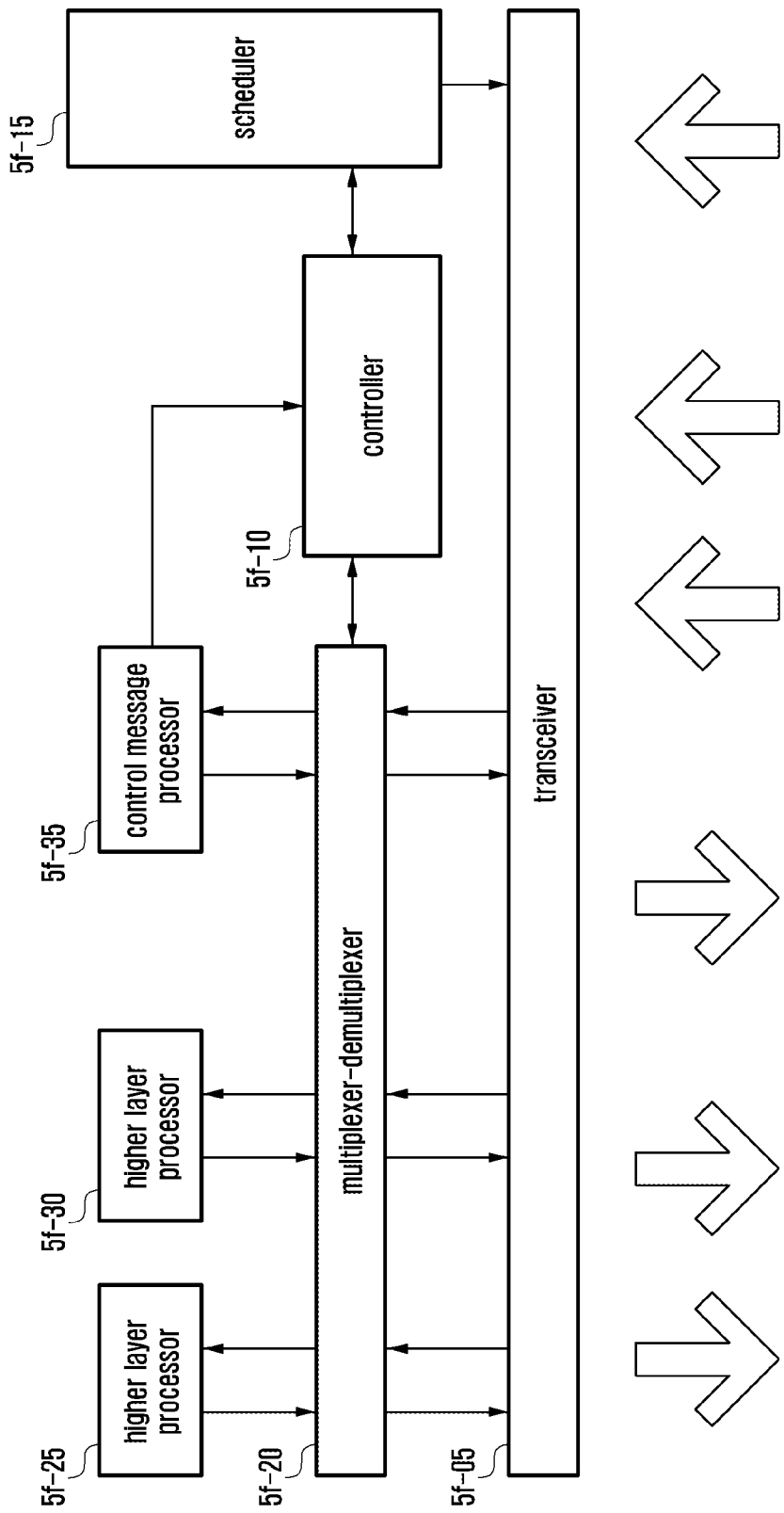
FIG. 5F illustrates an example eNB according to various embodiments of the present disclosure.

FIG. 5F illustrates an example eNB according to an embodiment of the present disclosure.

As shown in FIG. 5F, an eNB according to the present disclosure includes a transceiver 5f-05, a controller 5f-10, a multiplexer-demultiplexer 5f-20, a control message processor 5f-35, various higher layer processors 5f-25 and 5f-30, and a scheduler 5f-15. The transceiver 5f-05 transmits data and a preset control signal via a forward carrier, and receives data and a preset control signal via a reverse carrier. If a number of carriers are configured, the transceiver 5f-05 performs the transmission/reception of data and control signals via the carriers. The multiplexer-demultiplexer 5f-20: multiplexes data, created in the higher layer processors 5f-25 and 5f-30 or the control message processor 5f-35; or demultiplexes data received from the transceiver 5f-05, and transfers the result to the higher layer processors 5f-25 and 5f-30, the control message processor 5f-35, or the controller 5f-10. The control message processor 5f-35: processes a control message transmitted from the UE; and performs a corresponding operation. The control message processor 5f-35 creates control messages to be transmitted to the UE and transfers the messages to lower layers. The higher layer processors 5f-25 and 5f-30 may be configured according to services by the UEs. The higher layer processors 5f-25 and 5f-30 process data created from user services, such as FTP, VoIP, etc., and transfer the result to the multiplexer-demultiplexer 5f-20. The higher layer processors 5f-25 and 5f-30 process data transferred from the multiplexer-demultiplexer 5f-20, and transfer the result to service applications of the higher layers. The controller 5f-10 controls the transceiver. The controller 5f-10 manages operations in response to the requests of the UE and transfers the response to the transceiver. The scheduler 5f-15 assigns a transmission resource to the UE at a timing, considering a buffer state and a channel state of the UE, an active time of the UE, etc. The scheduler 5f-15 processes signals transmitted via the transceiver from the UE. The scheduler 5f-15 processes signals to be transmitted to the UE.

The method according to the present disclosure enables the eNB to: determine whether the LAA technology needs to be used; determine whether heterogeneous technologies use unlicensed band to be used; determine whether the eNB transmits a power control-related indication to the UE, according to the determination; and transmits the indication based on the determination.

Figure 5G:
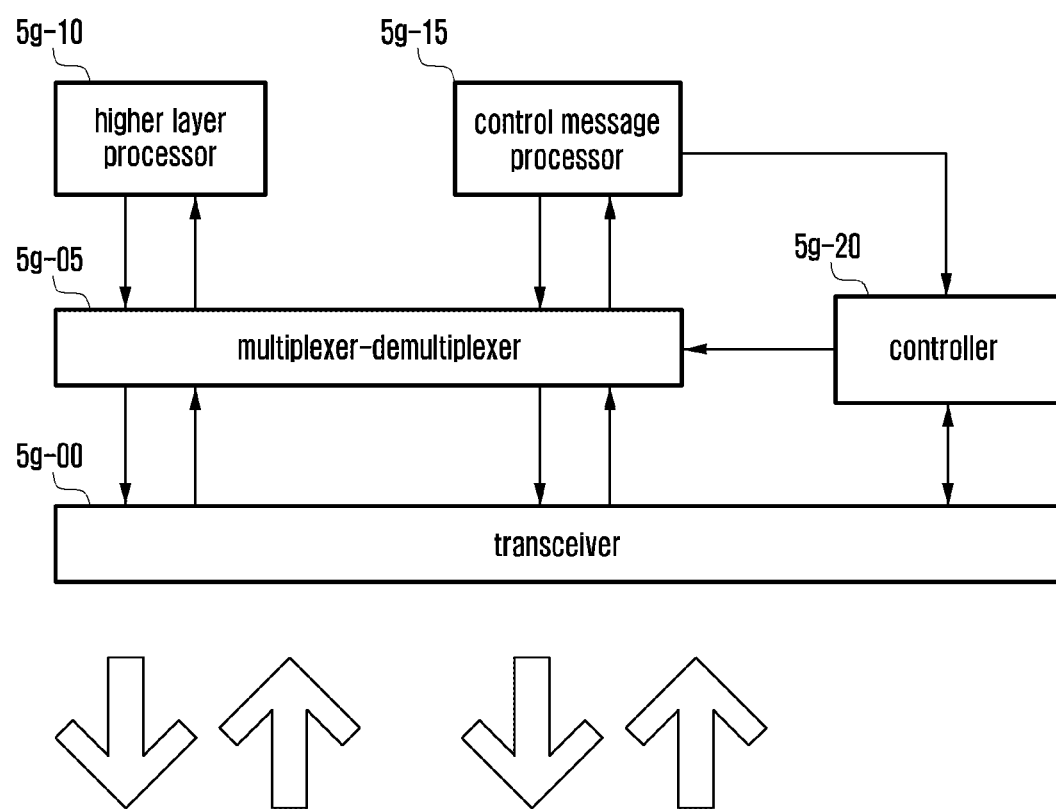
FIG. 5G illustrates an example UE according to various embodiments of the present disclosure.

FIG. 5G illustrates an example a UE according to an embodiment of the present disclosure.

The UE transmits/receives data, etc. to/from a higher layer unit 5g-15. The UE performs the transmission/reception of control messages via a control message processor 5g-15. When the UE transmits control signals or data to an eNB, the UE multiplexes the control signals or data via a multiplexer 5g-05 according to the control of the controller 5g-20, and transmits the data to the eNB via the transmitter 5g-00. When the UE performs the reception of signals/data, the UE: receives a physical signal via the receiver 5g-00 according to the control of the controller 5g-20; demultiplexer the received signals via the demultiplexer 5g-05; and transfers the corresponding messages to the higher layer unit 5g-10 or the control message processor 5g-15. For example, the messages of the RRC layer are control messages.

Although the embodiment is implemented in such a way that the UE includes a number of blocks which perform functions that differ from each other, it should be understood that the present disclosure is not limited to the embodiment. For example, the embodiment may be modified in such a way that the controller 5g-20 performs the function of the demultiplexer 5g-05.

The method according to the present disclosure enables the UE to determine a power control mode according to a preset indication included in a control message transmitted from the eNB; and perform the uplink transmission in corresponding mode.

The methods according to embodiments described in the claims or description can be implemented with hardware, software, and a combination thereof.

When the methods are implemented with software, a computer-readable storage media where one or more programs (software modules) are stored is provided. One or more programs stored in the computer-readable storage media are configured for execution by one or more processors in the electronic devices. One or more programs include instructions for enabling the electronic device to execute the methods according to embodiments described in the claims or in the description.

These programs (software modules and software) are stored in: random access memory (RAM), flash memory, non-volatile memory, read only memory (ROM), electrically erasable programmable read only memory (EEPROM), magnetic disc storage device, compact disc-ROM (CD-ROM), digital versatile discs (DVDs) or other types of optical storage device, magnetic cassette, etc. or a combination thereof. In addition, two or more of the same type of memories form a memory block.

In addition, the programs may also be stored in an attachable storage device accessible through a communication network, such as Internet, Intranet, local area network (LAN), wide area network (WAN), storage area network (SAN) or a combination thereof. This storage device may be connected to the apparatus according to the present disclosure via external ports. In addition, a separate storage device of a communication network may be connected to the apparatus according to the present disclosure.

The terms as used in embodiments of the present disclosure are merely for the purpose of describing particular embodiments and are not intended to limit the present disclosure. Singular forms are intended to include plural forms unless the context clearly indicates otherwise.

Although embodiments of the disclosure have been described in detail hereinabove, it should be understood that many variations and modifications of the basic inventive concept herein described, which may be apparent to those skilled in the art, will still fall within the spirit and scope of the embodiments of the disclosure as defined in the appended claims.

In order to use an LAA cell that performs the transmission on an unlicensed band using the LTE technology, the present disclosure provides a method and apparatus that: determines whether heterogeneous technologies use a corresponding unlicensed band and performs transmission power control in different modes according to the determination. More specifically, if heterogeneous technologies use an unlicensed band, the power transmission is controlled in mode 2. If heterogeneous technologies do not use an unlicensed band, the power transmission is controlled in mode 1. Therefore, if LTE technology and heterogeneous technologies are simultaneously used on the same unlicensed band, the present disclosure is capable of reducing the interference by the simultaneous use of LTE technology and heterogeneous technologies in the signals.

The present disclosure relates to wireless communication systems, and more particularly, to licensed assisted access (LAA) using unlicensed frequency bands with assistance of licensed bands in long term evolution (LTE) systems.

In LTE systems, the UE reports power headroom information, power headroom report (PHR), to an eNB. The power headroom information is referred to as the difference between the maximum transmission power set to the UE and the transmission power estimated by the UE. The transmission power estimated by the UE is calculated by a value that the UE uses when the UE performs the real uplink transmission. However, when the UE does not perform the real transmission, the transmission power estimated by the UE may be calculated based on a preset equation defined in the standard specification. The eNB receives the power headroom information from the UE, the eNB detects a maximum power headroom of the UE. In an environment using CA, the power headroom information is transmitted to individual secondary carriers. If an LAA SCell is additionally set to the UE, the UE needs to report power headroom information to the LAA SCell. In a state where the UE calculates the power headroom information, assuming that the UE performs real transmission, the UE may fail to perform real transmission because of the interference of an unlicensed band. In this case, if the UE transmits corresponding information to an eNB, the eNB may not correctly detect the maximum transmission power of the UE.

The present disclosure uses the following method for an PHR value of an LAA

SCell.

In option 1: The UE uses only a virtual format for LAA SCell, an eNB performs an LAA SCell UL scheduling; however, the eNB fails to perform PUSCH transmission because of LBT.

In option 2: The UE uses a real format, determine whether PCMAX,c is reported and a reference format is used, according to a condition as to whether PUSCH scheduling, not real transmission of PUSCH, is performed. In option 3: The UE uses a real format; however, the UE informs that the UE does not perform transmission using a reserved bit. In option 4: The UE uses a virtual format, when the UE receives a UL grant, the UE prepares two PHRs, and makes a determination according to whether LBT of LAA SCell PUSCH succeeds, check a condition as to whether LBT succeeds in an LAA SCell (licensed cell), via a PHR (not limited to only PHR)

In the following description, an operation principle of embodiments of the disclosure is described in detail with reference to the accompanying drawings. Detailed descriptions of well-known functions and structures incorporated herein may be omitted to avoid obscuring the subject matter of the disclosure. The following terms are defined considering functions of the disclosure, and may be changed by users or operators according to their needs. Therefore, the terms will be defined throughout the content of this description.

In the following description, technology for providing the dual connectivity in wireless communication systems is explained.

In the following description, terms used to identify an access node, terms referred to as network entities, terms expressing messages, terms representing interfaces between network objects, terms used for various types of identification information, etc. are used for the sake of convenient description. Therefore, the present disclosure is not limited by the terms and may use other terms with the meanings equivalent to the terms described in the present disclosure, representing the corresponding components.

For the sake of convenient description, the present disclosure uses terms and names defined in the specifications of the 3rd generation partnership project long term evolution (3GPP LTE). However, it should be understood that the present disclosure is not limited to the terms and names and may also be applied to systems following the other standards.

Figure 6A:
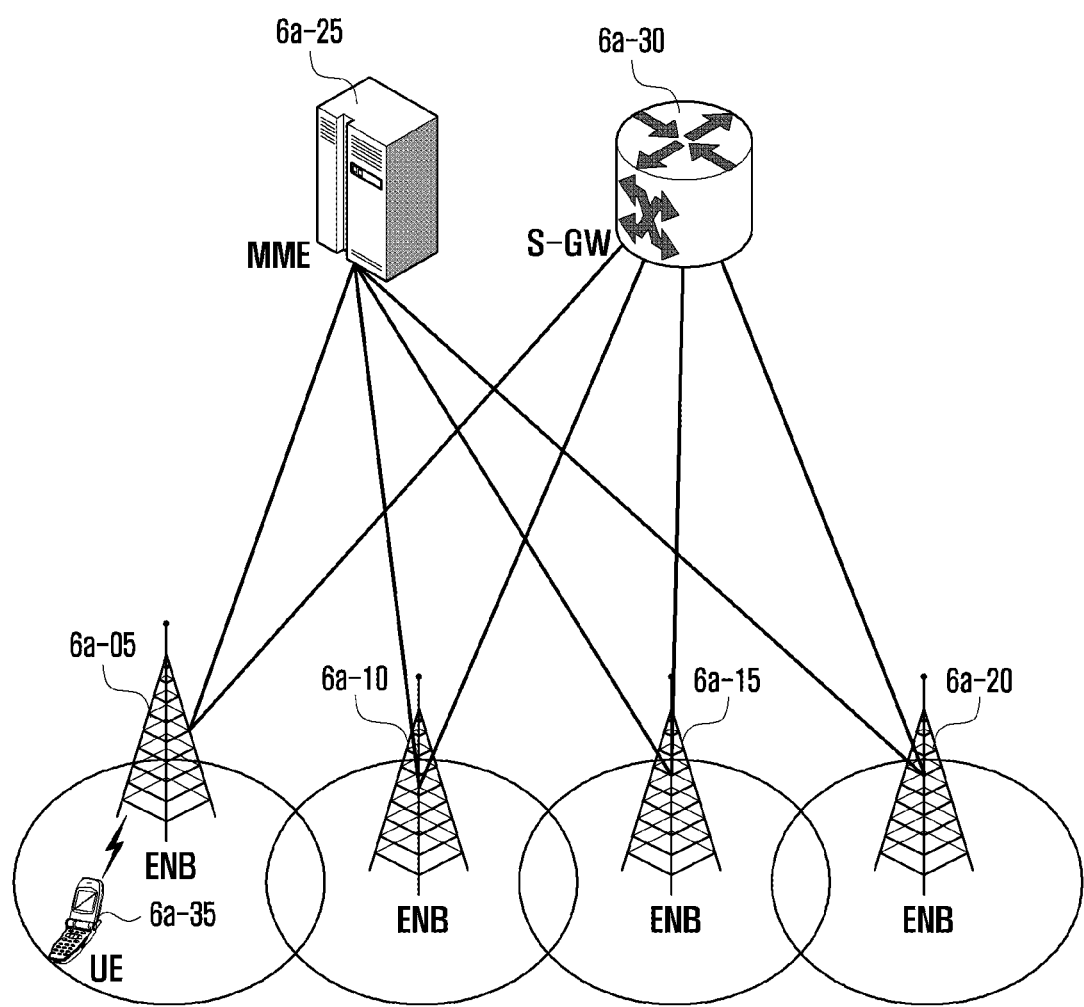
FIG. 6A illustrates an example configuration of an LTE system according to various embodiments of the present disclosure.

FIG. 6A illustrates an example configuration of an LTE system according to the present disclosure.

With reference to FIG. 6A, the LTE system configures the wireless access network, including evolved NodeBs (called eNBs, NodeBs or base stations) 6a-05, 6a-10, 6a-15, and 6a-20, a mobility management entity (MME) 6a-25, and a serving-gateway (S-GW) 6a-30. User equipment (UE)

6a-35 is connected to the ENBs 6a-05~6a-20 and the S-GW 6a-30 via an external network.

The eNBs 6a-05~6a-20 correspond to conventional NodeB of the UMTS system. The eNBs 6a-05~6a-20 are connected to the UE 6a-35 via wireless channels, performing more complicated functions than conventional NodeB. In LTE system, since real-time services such as a voice over IP (VoIP) service and all user traffic are serviced via shared channels, devices are required to collect information regarding states, such as buffer states of the UE, power headroom states, channel states, etc., and to make a schedule. This job is performed via the eNBs 6a-05~6a-20. One eNB can control a number of cells. For example, in order to implement a transmission rate of 100 Mbps, LTE system employs orthogonal frequency division multiplexing (OFDM) as a wireless access technology at a bandwidth of 20 MHz. It also employs adaptive modulation & coding (AMC) to determine modulation scheme and channel coding rate, meeting with the channel state of the UE. S-GW 6a-30 is a device that provides as data bearers. The S-GW 6a-30 establishes or removes data bearers according to the control of The MME 6a-25. The MME 6a-25 manages the mobility of the UE and controls a variety of functions. The MME 6a-25 connects to a number of the eNBs.

Figure 6B:
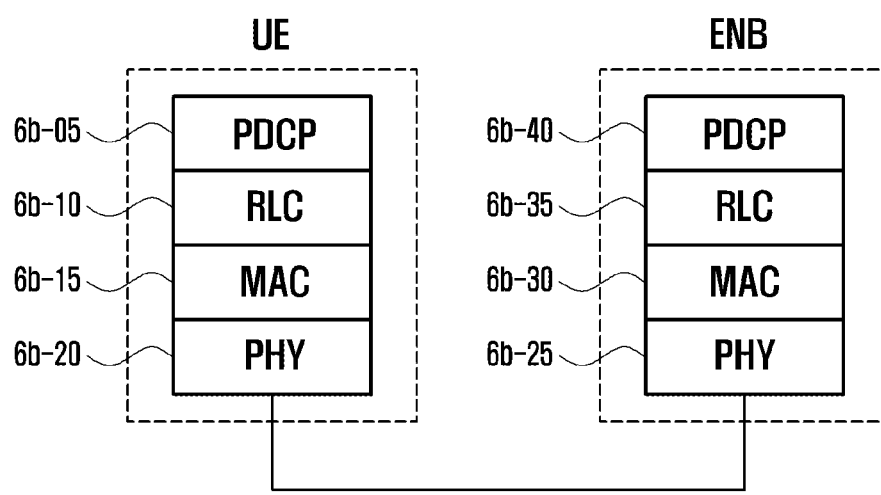
FIG. 6B illustrates an example radio protocol stack in an LTE system according to various embodiments of the present disclosure.

FIG. 6B illustrates an example radio protocol stack in an LTE system according to the present disclosure.

With reference to FIG. 6B, the UE and ENB have packet data convergence protocols (PDCP) 6b-05 and 6b-40, radio link controls (RLC) 6b-10 and 6b-35, and medium access control (MAC) 6b-15 and 6b-30, respectively. PDCP 6b-05 and 6b-40 compress/decompress IP header. RLC 6b-10 and 6b-35 reconfigure PDCP packet data unit (PDU) in proper size. MAC 6b-15 and 6b-30 connect to a number of RLC layer devices configured in one UE. MAC 6b-15 and 6b-30 multiplex RLC PUDs to MAC PDU, and de-multiplex RLC PDUs from MAC PDU. Physical layers (PHY) 6b-20 and 6b-25 in the UE and ENB channel-code and modulate data from the higher layers, create OFDM symbols, and transmit them via a wireless channel. In addition, PHY 6b-20 and 6b-25 demodulate and channel-decode OFDM symbols transmitted via a wireless channel, and transfer them to the higher layers. PHY 6a-20 and 6a-25 also use hybrid ARQ (HARQ) to additionally correct errors, where the reception stage transmits 1 bit to acknowledge a condition as to whether the reception stage receives the packets from the transmission stage, which is called HARQ ACK/NACK. Downlink HARQ ACK/NACK in response to uplink transmission is transmitted via physical hybrid-ARQ indicator channel (PHICH). Uplink HARQ ACK/NACK in response to downlink transmission is transmitted via physical uplink control channel (PUCCH) or physical uplink shared channel (PUSCH).

The physical layer of LTE systems has a structure of radio frame of 10 ms to transmit downlink and uplink data, and provides two types of radio frames as follows: type 1: applied to Frequency Division Duplex (FDD); and type 2: applied to Time Division Duplex (TDD)

Each of the two types of radio frames is 10 ms in length and configured with 10 subframes of 1 ms each. A subframe of 1 ms is called one transmission time interval (TTI). That is, one radio frame is divided into 10 subframes, numbered from Subframe 0 to Subframe 9.

In FDD, the uplink and downlink use different frequency regions and are separated from each other. Each of the uplink and downlink is divided into 10 subframes.

In TDD, each subframe of one radio frame is divided into a downlink subframe, an uplink subframe, and a special subframe, according to the settings. The special subframe is divided into downlink pilot time slot (DwPTS), guard period (GP), and uplink pilot time slot (UpPTS). The special subframe serves as a branch switching between the downlink and uplink. DwPTS, GP, and UpPTS may be set to different lengths, but the sum of their lengths is 1 ms like the other subframes.

Figure 6C:
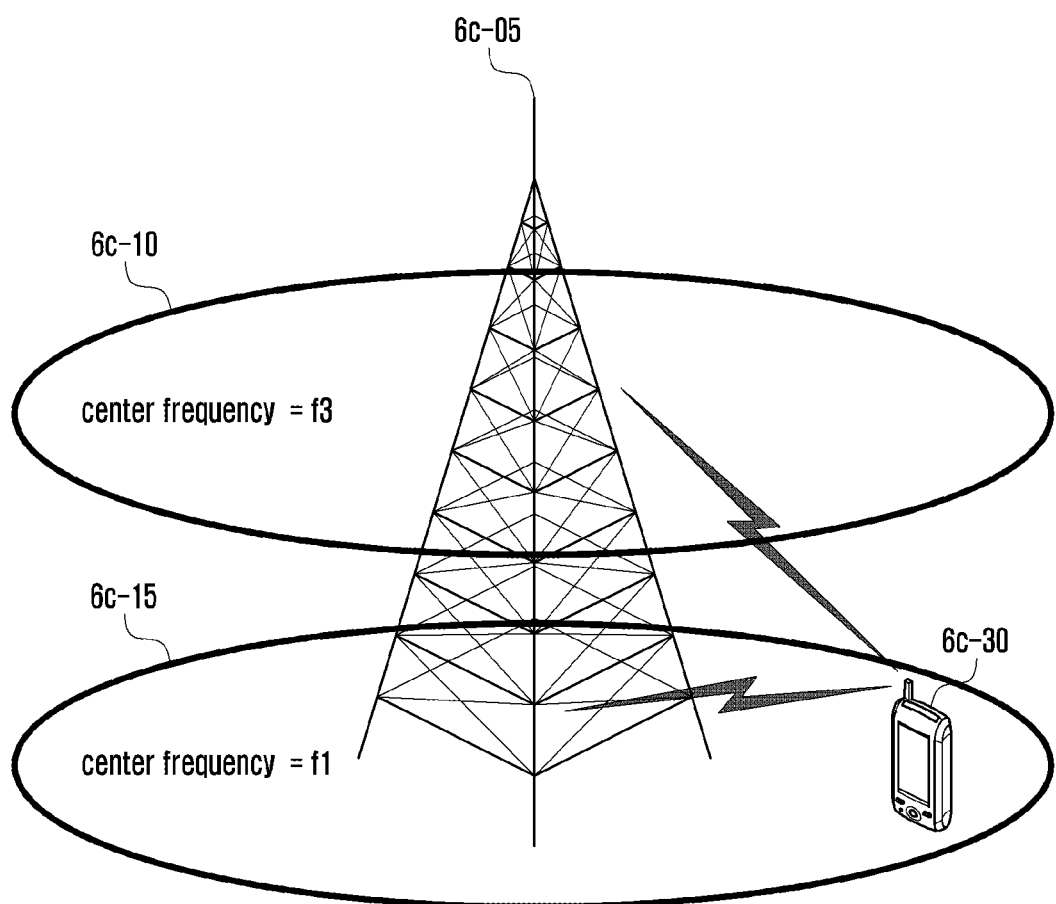
FIG. 6C illustrates an example carrier aggregation (CA) according to various embodiments of the present disclosure.

FIG. 6C illustrates an example carrier aggregation (CA).

One eNB broadcasts/receives a number of carriers which are spread over different frequency bands. For example, when an eNB 6c-05 broadcasts a forward carrier 6c-15 of center frequency f1 and a forward carrier 6c-10 of center frequency f3, conventional art allows a UE to transmit/receive data via one of the two carriers. However, the UE capable of performing carrier aggregation is capable of simultaneously transmitting/receiving data using a number of carriers. The eNB allocates more carriers to the UE capable of performing carrier aggregation according to the conditions, so that the UE can increase the data transmission rate. When one cell is configured with one forward carrier (downlink) and one reverse carrier (uplink) as a general expression, the term 'carrier aggregation' may be used in the sense that UE simultaneously transmits/receives data through a number of cells. In that case, the maximum transmission rate, which can be achieved in an existing single cell, increases in proportion to the number of aggregated carrier. Aggregated carriers are configured by an RRC signaling. In LTE, carriers to be aggregated may be added or removed by using a message, RRCConnectionReconfiguration. Although a specific carrier is configured, data transmission is not performed. In order to actually use a corresponding carrier, carriers needs to be activated by the MAC signaling. LTE activates carriers configured using MAC control element (CE) in the MAC PDU. Since services are provided by a number of activated carriers, a number of serving cells are required.

Since the reverse transmission causes interferences in the reverse transmission of other cell, the reverse transmission power needs to be maintained in a proper level. To this end, the UE calculates reverse transmission power using a function and perform reverse transmission with the calculated reverse transmission power. For example, the UE: calculates a required reverse transmission power value as the UE inputs, to the function, scheduling information, such as a level of modulation coding scheme (MCS) to be applied, the amount of allocated transmission resources, etc., and input values used for estimating a channel status, such as a path loss value, etc.; and performs the reverse transmission by applying the calculated, required reverse transmission power value thereto. The reverse transmission output value that the UE can apply is limited by the maximum transmission value of the UE. When the calculated, required reverse transmission power value is greater than the maximum transmission value of the UE, the UE performs the reverse transmission by applying the maximum transmission value thereto. In this case, since the UE cannot apply a sufficient amount of reverse transmission power to the reverse transmission, the quality of reverse transmission may be aged. It is preferable that the eNBs need to make a schedule so that the required transmission power does not exceed the maximum transmission power value. However, since ENBs do not detect several parameters such as pathway loss, etc., The UE transmits power headroom report (PHR) MAC control information to the ENB, thereby reporting the power headroom (PH) information to the eNB.

Factors affecting power headroom are 1) the amount of assigned transmission resources, 2) MCS applied to reverse transmission, 3) path loss of a related forward carrier, 4) cumulative value of power adjustment command, etc. path loss (PL) or cumulative power adjustment command value may vary depending on reverse carriers. Therefore, if a number of reverse carriers are aggregated in one UE, it is preferable to set conditions as to whether PHR transmission is performed to reverse carriers respectively. In order to perform PHR transmission efficiently, one reverse carrier may report all the PHs for a number of reverse carriers. According to operation strategies, PH for carriers that do not perform real PUSCH transmission may be required. In this case, it is more efficient for one reverse carrier to report all the PHs for a number of reverse carriers. To this end, an existing PHR needs to be extended. A number of PHs to be included in one PHR may be configured in a preset order.

PHR is triggered by the following case: if path loss of generally connected forward carriers is greater than or equal to a preset threshold, if prohibit PHR timer has expired, or if a preset period of time has elapsed since PHR was created. Although PHR is triggered, the UE does not transmit the PHR right after the UE is trigged, but waits until a timing that the UE can perform reverse transmission, e.g., a timing that a reverse transmission resource is assigned. This is because PHR is information that does not need to be processed immediately.

In general, in the format of PHR MAC CE, first 2 bits of PHR are not currently used, and the remaining 6 bits are used to indicate one of the values from −23 dB to 40 dB, which indicates a UE's power headroom. The UE calculates power headroom by the following equation (1).

$$PH(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}$$ Equation (1)

In serving cell c, PH(i) of the ith subframe is calculated, based on maximum reverse transmission power PCMAX,c (i), the number of resource blocks MPUSCH,c(i), power offset ΔTF,c, path loss PLc, fc(i) (accumulated TPC commands), derived from MCS. In the equation (1), PLc denotes path loss of a cell that is set to provide path loss to serving cell c. Path loss, used to determine the reverse transmission power of a serving cell, is path loss of a forward channel of a corresponding cell or path loss of a forward channel of another cell. An eNB selects one of the path loss types to use, and informs a UE of the selected path loss, in the call setup process. In the equation (1), fc(i) denotes an accumulated value of a transmission power control command (Transmission Power Control) of serving cell c. PO_PUSCH,C is a parameter of a higher layer, and is a sum of cell-specific and UE-specific values. In general, PO_PUSCH,C uses different values according to types of physical uplink shared channel (PUSCH) transmission of semi-persistent scheduling, dynamic scheduling, random access response, etc. αc: is a 3-bit cell-specific value provided by a higher layer; is a weight (i.e., the greater the value the more the path loss affects the reverse transmission power) applied to path loss when reverse transmission power is calculated; and has a limitation in value to be applied according to types of PUSCH transmission. j value is used to indicate a type of PUSCH. J=0 denotes semi-persistent scheduling; j=1 denotes dynamic scheduling; and j=2 denotes random access response. If a specific serving cell does not perform PUSCH transmission, MPUSCH and ΔTF may not be applied to the equation (1) based on the definition.

In a CA mobile communication system with a number of aggregated carriers, if a serving cell performing real PUCSH transmission exists, a serving cell where PUSCH transmission is not performed for a preset period of time may also exit. PH for each serving cell may be reported by another serving cell, together. If PHs for a number of serving cells need to be reported in a mobile communication system with a number of aggregated carriers, these are collected into one PHR and then transmitted. This method is capable of reducing signal overhead, compared wo a method of transmitting PHs according to carriers, and also obtaining PH information regarding carriers that do not perform real PUSCH transmission. To this end, an extended PHR format is used and is well-known. Therefore, a detail description is omitted below.

In an extended PHR format, the UE reports Type 1 PH and Type 2 PH to an eNB. Type 1 PH (included in a PCell) is a value except for physical uplink shared channel (PUSCH) transmission power from maximum reverse transmission power PCMAX,c (i) for each carrier i. Type 2 PH is a value except for PUSCH transmission power value and physical uplink control channel (PUCCH) transmission power value from maximum reverse transmission power PCMAX,c for a PCell. The Type 2 PH is only related to a PCell, and this is because transmission of PUCCH is performed in only a PCell.

In calculation of Type 1 PH, if real PUSCH is not transmitted, PUSCH transmission power is calculated by a preset reference format defined in the specification, thereby obtaining the PH value which is called virtual PH. In calculation of Type 2 PH, if real PUCCH is not transmitted, PUCCH transmission power is calculated by a preset reference format defined in the specification, thereby obtaining the PH value which is called virtual PH. If the virtual PH is used, V field in the format set to '1.' If PUSCH value and PUCCH value are used as values that are actually transmitted when Type 1/Type 2 PH value is calculated, V field in the format is set to '0.'

Figure 6D:
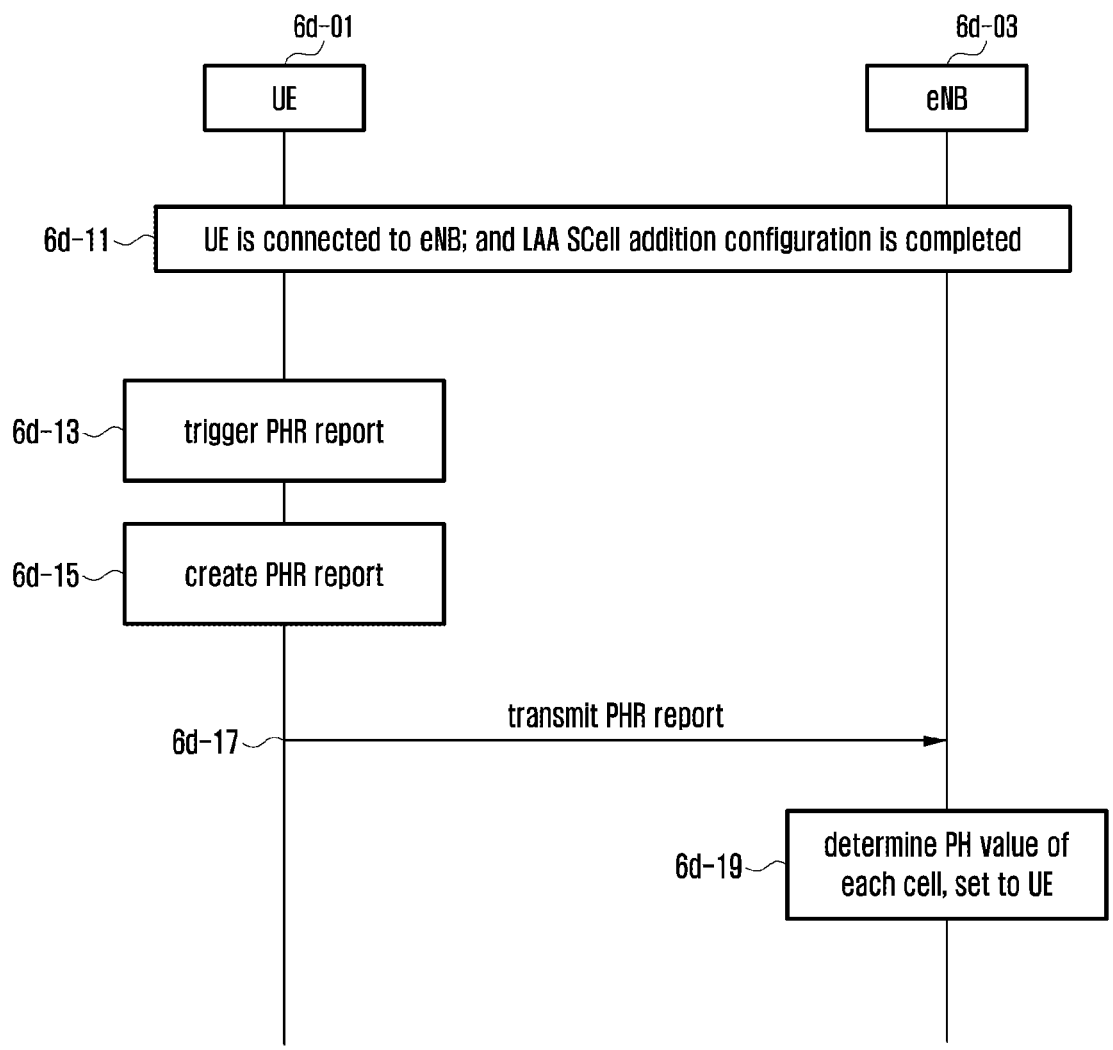
FIG. 6D illustrates a flow diagram of messages flow between a UE and an eNB according to various embodiments of the present disclosure.

FIG. 6D illustrates a flow diagram of messages flow between a UE and eNB in a method of reporting PHR including a PH value for LAA SCell, according to the present disclosure.

In the embodiment, it is assumed that the UE 6d-01 attempts to access an eNB/cell 6d-03 and is in a connected state in operation 6d-11. The connected state is referred to a state where the UE succeeds in accessing a corresponding eNB and can transmit/receive data to/from the eNB. It is also assumed that the eNB additionally configures an LAA SCell to the UE. That is, the eNB configures the measurement of nearby LAA cells to the UE so that the UE measures nearby LAA cells; when the eNB receives the measurement result from the UE, the eNB determines whether the eNB adds an LAA cell as an SCell to a corresponding UE, based on the measurement result; and the eNB adds an LAA SCell to a corresponding UE.

The eNB sets, to the UE, periodicPHR-Timer, prohibitPHR-Timer and dl-PathlossChange value in order to perform the PHR report, via a message of an RRC layer (e.g., RRCConnectionReconfiguration). The set values serve as a triggering condition to inform a timing when the PHR report is performed. A triggering condition for the PHR report is well-known. Therefore, a detailed description is omitted below.

If the PHR report is triggered according to a triggering condition, the UE creates a PHR report message. If an LAA SCell is included and the UE is set to report an extended PHR format described above with reference to FIG. 6C, the UE creates extended PHRs for a PH value of an LAA SCell, using one of the following options.

In option 1: The UE uses only a virtual format for LAA SCell. In a state where Option 1 is not used, if an eNB performs an LAA SCell UL scheduling, but fails to perform PUSCH transmission because of LBT, the eNB calculates Type 1 PH.

In option 2: The UE uses a real format, determine whether PCMAX,c is reported and a reference format is used, according to a condition as to whether PUSCH scheduling, not real transmission of PUSCH, is performed. If PUSCH is scheduled by PDCCH, PH value is calculated and reported, using a real format, regardless of the success or failure of the real PUSCH transmission, (V field is set to '0').

In option 3: The UE uses a real format; but informs that the UE has not performed transmission, using a reserved bit of the extended PHR format, PUSCH is scheduled by PDCCH and real PUSCH transmission succeeds, corresponding reserved bit is set to '0.' PUSCH is scheduled by PDCCH and real PUSCH transmission fails, corresponding reserved bit is set to '1,' informing the eNB that real PHR value has an error.

In option 4: The UE uses a virtual format. When the UE receives a UL grant, the UE prepares for two PHRs, and makes a determination according to whether the transmission of LAA SCell PUSCH succeeds, PUSCH is scheduled by PDCCH and real PUSCH transmission succeeds, a PH value is calculated and reported, using a real format; and PUSCH is scheduled by PDCCH and real PUSCH transmission fails, a PH value is calculated and reported, using a virtual format.

The UE creates an extended PHR via one of the options described above, and reports the extended PHR to the eNB in operation 6e-07, so that the eNB can detect a PH value of each of the cells.

Figure 6E:
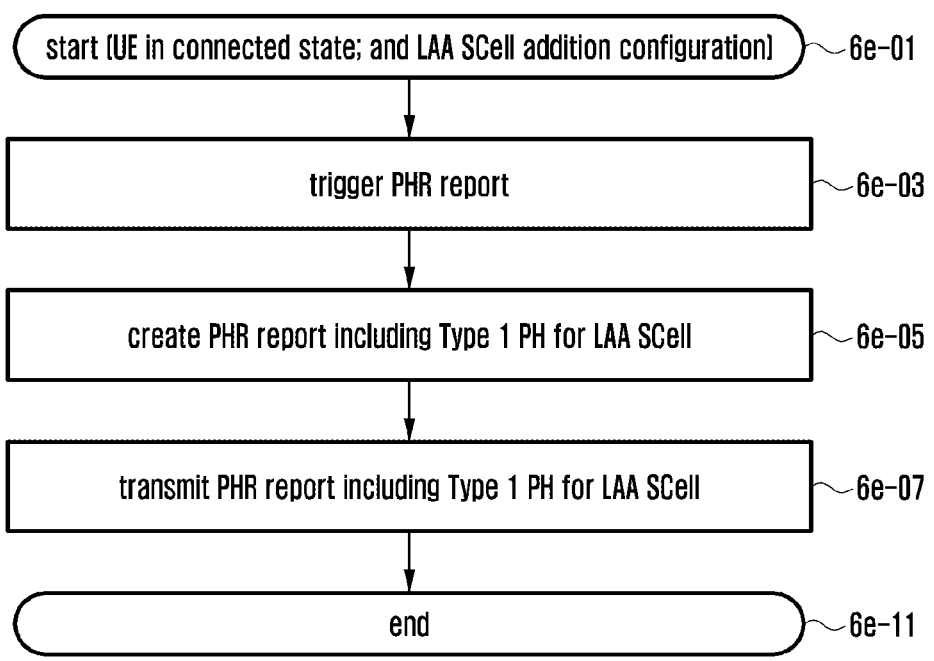
FIG. 6E illustrates a flow diagram of UE operations according to the present invention.
Figure 6F:
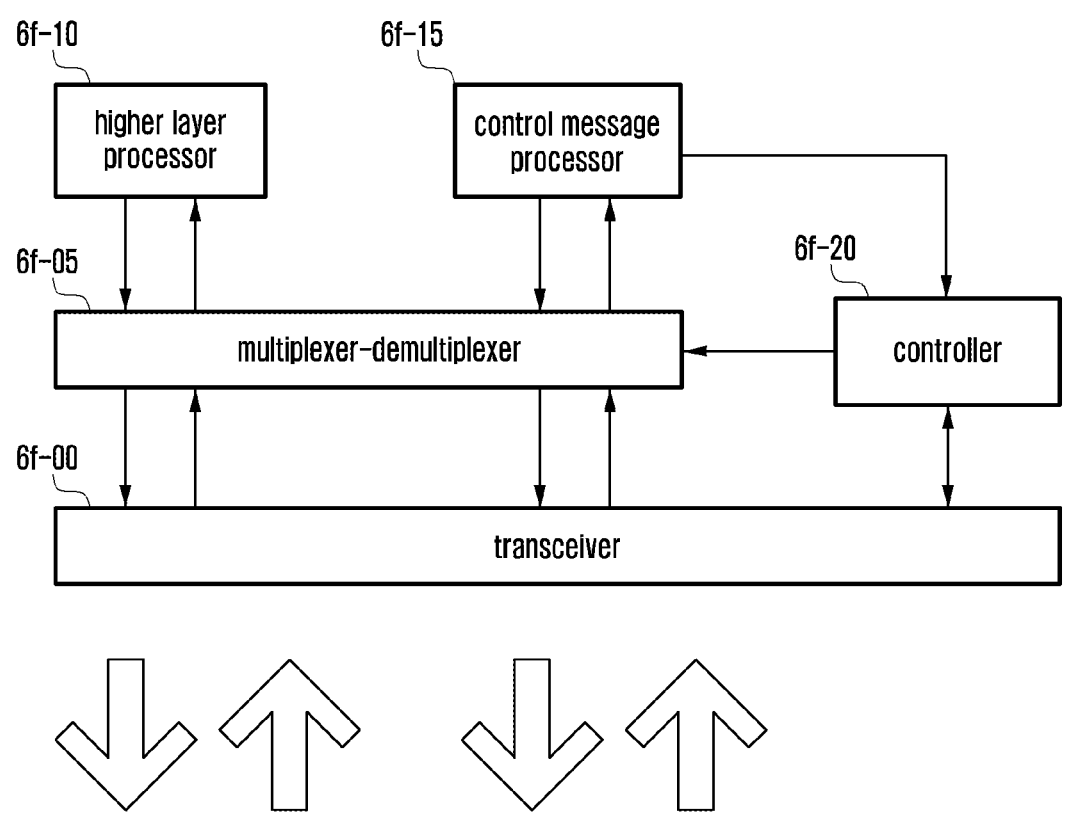
FIG. 6F illustrates an example UE according to various embodiments of the present disclosure.

FIG. 6F illustrates an example UE according to an embodiment of the present disclosure.

The UE transmits/receives data, etc. to/from a higher layer unit 6f-10. The UE performs the transmission/reception of control messages via a control message processor 6f-15. When the UE transmits control signals or data to an eNB, the UE multiplexes the control signals or data via a multiplexer 6f-05 according to the control of the controller 6f-20, and transmits the data to the eNB via the transmitter 6f-00. When the UE performs the reception of signals/data, the UE: receives a physical signal via the receiver 6f-00 according to the control of the controller 6f-20; demultiplexer the received signals via the demultiplexer 6f-05; and transfers the corresponding messages to the higher layer unit 6f-10 or the control message processor 6f-15. For example, the messages of the RRC layer are control messages.

Although the embodiment is implemented in such a way that the UE includes a number of blocks which perform functions that differ from each other, it should be understood that the present disclosure is not limited to the embodiment. For example, the embodiment may be modified in such a way that the controller 6f-20 performs the function of the demultiplexer 6f-05.

When PHR report is triggered, the present disclosure enables the UE to calculate a PH value for an LAA SCell as in the methods with reference to FIGS. 6D and 6E, and transmit the value to the eNB, thereby enabling the eNB to correctly detect the maximum transmission power of the UE.

The methods according to embodiments described in the claims or description can be implemented with hardware, software, and a combination thereof.

When the methods are implemented with software, a computer-readable storage media where one or more programs (software modules) are stored is provided. One or more programs stored in the computer-readable storage media are configured for execution by one or more processors in the electronic devices. One or more programs include instructions for enabling the electronic device to execute the methods according to embodiments described in the claims or in the description.

These programs (software modules and software) are stored in: random access memory (RAM), flash memory, non-volatile memory, read only memory (ROM), electrically erasable programmable read only memory (EEPROM), magnetic disc storage device, compact disc-ROM (CD-ROM), digital versatile discs (DVDs) or other types of optical storage device, magnetic cassette, etc. or a combination thereof. In addition, two or more of the same type of memories form a memory block.

In addition, the programs may also be stored in an attachable storage device accessible through a communication network, such as Internet, Intranet, local area network (LAN), wide area network (WAN), storage area network (SAN) or a combination thereof. This storage device may be connected to the apparatus according to the present disclosure via external ports. In addition, a separate storage device of a communication network may be connected to the apparatus according to the present disclosure.

The terms as used in embodiments of the present disclosure are merely for the purpose of describing particular embodiments and are not intended to limit the present disclosure. Singular forms are intended to include plural forms unless the context clearly indicates otherwise.

Although embodiments of the disclosure have been described in detail hereinabove, it should be understood that many variations and modifications of the basic inventive concept herein described, which may be apparent to those skilled in the art, will still fall within the spirit and scope of the embodiments of the disclosure as defined in the appended claims.

The present disclosure provides a method of reporting power headroom value to an eNB when an unlicensed band is used for an LAA cell performing the transmission using the LTE technology. More specifically, in order to determine whether a PHR value transmitted by the UE is a real value or a virtual value, various embodiments of the present disclosure provide corresponding information to the eNB, thereby enabling the eNB to performing the uplink scheduling based on the correct information.

As described above, according to an embodiment of the present disclosure, the method and system are capable of: transmitting, to the UE, information regarding an MBMS dedicated carrier along with information regarding a normal carrier; and enabling the UE to selectively use the MBMS dedicated carrier or the normal carrier according to a service that the UE needs to receive, thereby increasing the amount of MBMS and supporting the demand increasing in MBMS.

According to another embodiment of the present disclosure, the method, procedure and system are capable of performing a signaling to selectively use two types of sub-carrier spacing and three cyclic prefix lengths in one cell/carrier, thereby supporting the demand increasing in MBMS and thus the enlarged MBMS service area.

According to another embodiment of the present disclosure, the method and apparatus enables a number of service providers to share MBMS with each other, so that the UE can receive an MBMS service via another service provider network, and this allows the service providers to efficiently manage MBMS resources.

According to another embodiment of the present disclosure, the method, apparatus, and system set a timing advance value for uplink transmission in order to apply an LAA technology to the uplink transmission in a wireless communication system, so that the UE can perform uplink transmission at an appropriate timing, and an eNB can successfully perform uplink reception in an unlicensed band.

According to another embodiment of the present disclosure, the method, apparatus, and system are capable of: maintaining LTE communication although LTE technology and wireless LAN (WLAN) technology coexist in an unlicensed band in a wireless communication system; and controlling power to minimize interference in unlicensed band if only LTE technology exists.

According to another embodiment of the present disclosure, the method, apparatus, and system enable an eNB to: detect a PHR value for an LAA SCell reported by the UE in a wireless communication system; and estimate a maximum transmission power with which the UE can actually perform transmission, thereby performing transmission and reception with error.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method by a terminal in a wireless communication system, the method comprising:
receiving first system information, from a base station, the first system information including first information on a multicast broadcast service (MBS) service area identifications (SAIs) of carriers and second information indicating whether each of the carriers is an MBS dedicated carrier or an MBS normal carrier; and
receiving, on the MBS dedicated carrier, second system information for the MBS dedicated carrier, in case that data for the MBS is received on the MBS dedicated carrier according to the first system information,
wherein receiving the second information further comprises:
identifying whether the data for the MBS is to be received on the MB S dedicated carrier based on the first system information, and
receiving the second system information on the MBS dedicated carrier, in case that the data for the MBS is identified as to be received on the MBS dedicated carrier.

2. The method of claim 1, wherein the first system information further includes at least one frequency information for the MBS dedicated carrier or the MBS normal carrier.

3. The method of claim 1, wherein the first system information is received based on a first system information radio network temporary identifier (SI-RNTI), and
wherein the second system information is received based on a second SI-RNTI that is used for the MB S dedicated carrier.

4. The method of claim 1, wherein non-multimedia broadcast multicast service single frequency network (non-MB SFN) subframes is used for the second system information on the MBS dedicated carrier.

5. A terminal in a wireless communication system, the terminal comprising:
a transceiver; and
a controller operably connected to the transceiver, the controller configured to:
receive first system information, from a base station via the transceiver, the first system information including first information on a multicast broadcast service (MBS) service area identifications (SAIs) of carriers and second information indicating whether each of the carriers is an MBS dedicated carrier or an MBS normal carrier,
receive, on the MBS dedicated carrier, second system information for the MBS dedicated carrier, in case that data for the MBS is received on the MB S dedicated carrier according to the first system information,
identify whether the data for the MBS is to be received on the MBS dedicated carrier based on the first system information, and
receive the second system information on the MBS dedicated carrier, in case that the data for the MBS is identified as to be received on the MBS dedicated carrier.

6. The terminal of claim 5, wherein the first system information further includes at least one frequency information for the MB S dedicated carrier or the MBS normal carrier.

7. The terminal of claim 5, wherein the first system information is received based on a first system information radio network temporary identifier (SI-RNTI), and
wherein the second system information is received based on a second SI-RNTI that is used for the MB S dedicated carrier.

8. The terminal of claim 5, wherein non-multimedia broadcast multicast service single frequency network (non-MBSFN) subframes is used for the second system information on the MBS dedicated carrier.

9. A method by a base station in a wireless communication system, the method comprising:
generating first system information, the first system information including first information on a multicast broadcast service (MBS) service area identifications (SAIs) of carriers and second information indicating whether each of the carriers is an MBS dedicated carrier or an MBS normal carrier; and
transmitting, to a terminal, the generated first system information,
wherein second system information for the MBS dedicated carrier is received on the MBS dedicated carrier, by the terminal, in case that data for the MBS is received on the MBS dedicated carrier according to the first system information,
wherein whether the data for the MBS is to be received on the MBS dedicated carrier is identified, by the terminal, based on the first system information, and
wherein the second system information on the MBS dedicated carrier is received, by the terminal, in case that the data for the MBS is identified as to be received on the MBS dedicated carrier.

10. The method of claim 9, wherein the first system information further includes at least one frequency information for the MB S dedicated carrier or the MBS normal carrier.

11. The method of claim 9, wherein the first system information is received, by the terminal, based on a first system information radio network temporary identifier (SI-RNTI), and
wherein the second system information is received, by the terminal, based on a second SI-RNTI that is used for the MBS dedicated carrier.

12. The method of claim 9, wherein non-multimedia broadcast multicast service single frequency network (non- MBSFN) subframes is used for the second system information on the MBS dedicated carrier.

13. A base station in a wireless communication system, the base station comprising:
a transceiver; and
a controller operably connected to the transceiver, the controller configured to:
generate first system information, the first system information including first information on a multicast broadcast service (MBS) service area identifications (SAIs) of carriers and second information indicating whether each of the carriers is an MBS dedicated carrier or an MBS normal carrier, and
transmit, to a terminal via the transceiver, the generated first system information,
wherein second system information for the MBS dedicated carrier is received on the MBS dedicated carrier, by the terminal, in case that data for the MBS is received on the MBS dedicated carrier according to the first system information,
wherein whether the data for the MBS is to be received on the MBS dedicated carrier is identified, by the terminal, based on the first system information, and
wherein the second system information on the MBS dedicated carrier is received, by the terminal, in case that the data for the MBS is identified as to be received on the MBS dedicated carrier.

14. The base station of claim 13, wherein the first system information further includes at least one frequency information for the MB S dedicated carrier or the MBS normal carrier.

15. The base station of claim 13, wherein the first system information is received, by the terminal, based on a first system information radio network temporary identifier (SI-RNTI), and
wherein the second system information is received, by the terminal, based on a second SI-RNTI that is used for the MBS dedicated carrier.

16. The base station of claim 13, wherein non-multimedia broadcast multicast service single frequency network (non-MBSFN) subframes is used for the second system information on the MBS dedicated carrier.

* * * * *